United States Patent [19]
Washisu et al.

[11] Patent Number: 6,163,651
[45] Date of Patent: *Dec. 19, 2000

[54] CONTROL APPARATUS FOR IMAGE BLUR PREVENTION

[75] Inventors: Koichi Washisu, Tokyo; Yasuhiko Shiomi, Kawaguchi, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/563,750

[22] Filed: Nov. 29, 1995

Related U.S. Application Data

[63] Continuation of application No. 08/191,606, Feb. 4, 1994, abandoned.

[30] Foreign Application Priority Data

Feb. 4, 1993 [JP] Japan .................................. 5-039248
Feb. 3, 1994 [JP] Japan .................................. 6-011747

[51] Int. Cl.⁷ .................................................. G03B 17/00
[52] U.S. Cl. ............................................. 396/55; 396/52
[58] Field of Search ................................ 354/70, 410, 430, 354/400, 195.1, 202; 348/208; 250/231.1, 230, 239; 73/653, 655, 517 A, 514.02; 359/554, 557; 396/52, 53, 55

[56] References Cited

U.S. PATENT DOCUMENTS

| | | | |
|---|---|---|---|
| 5,020,369 | 6/1991 | Washisu et al. | 73/517 A |
| 5,175,580 | 12/1992 | Shiomi | 354/410 |
| 5,229,603 | 7/1993 | Shiomi | 250/231.1 |

*Primary Examiner*—Alan A. Mathews
*Attorney, Agent, or Firm*—Fitzpatrick, Cella, Harper & Scinto

[57] ABSTRACT

A control apparatus for image blur prevention, includes a discrimination unit which discriminates an adverse influence on at least one of an image blur detection portion for detecting an image blur, and an image blur prevention portion for preventing an image blur, and performs discrimination irrespective of the state of the image blur detection portion and the state of the image blur prevention portion, and a prevention unit for preventing the adverse influence on at least one of the image blur detection portion and the image blur prevention portion in accordance with the discrimination result of the discrimination unit.

9 Claims, 43 Drawing Sheets

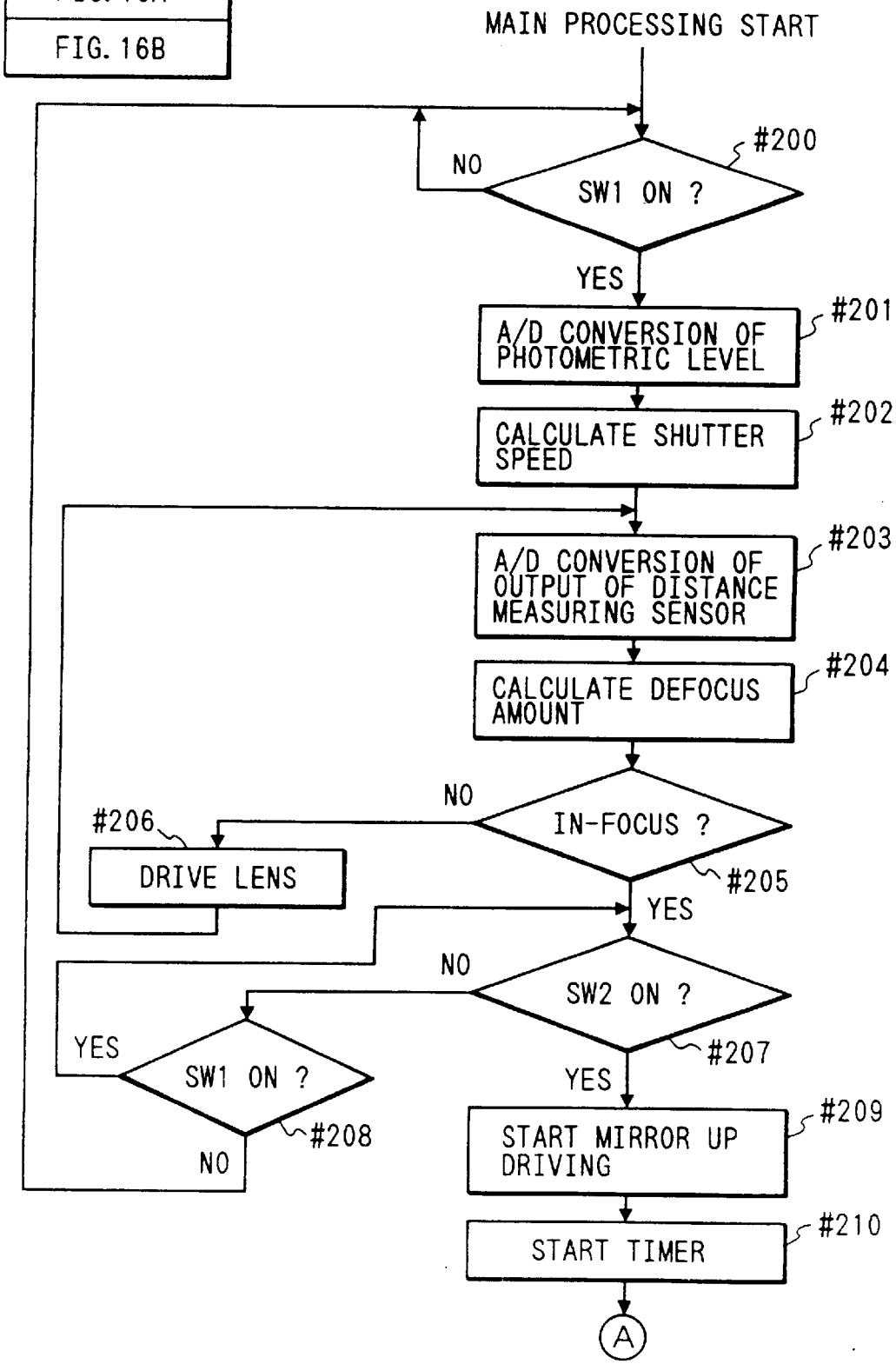

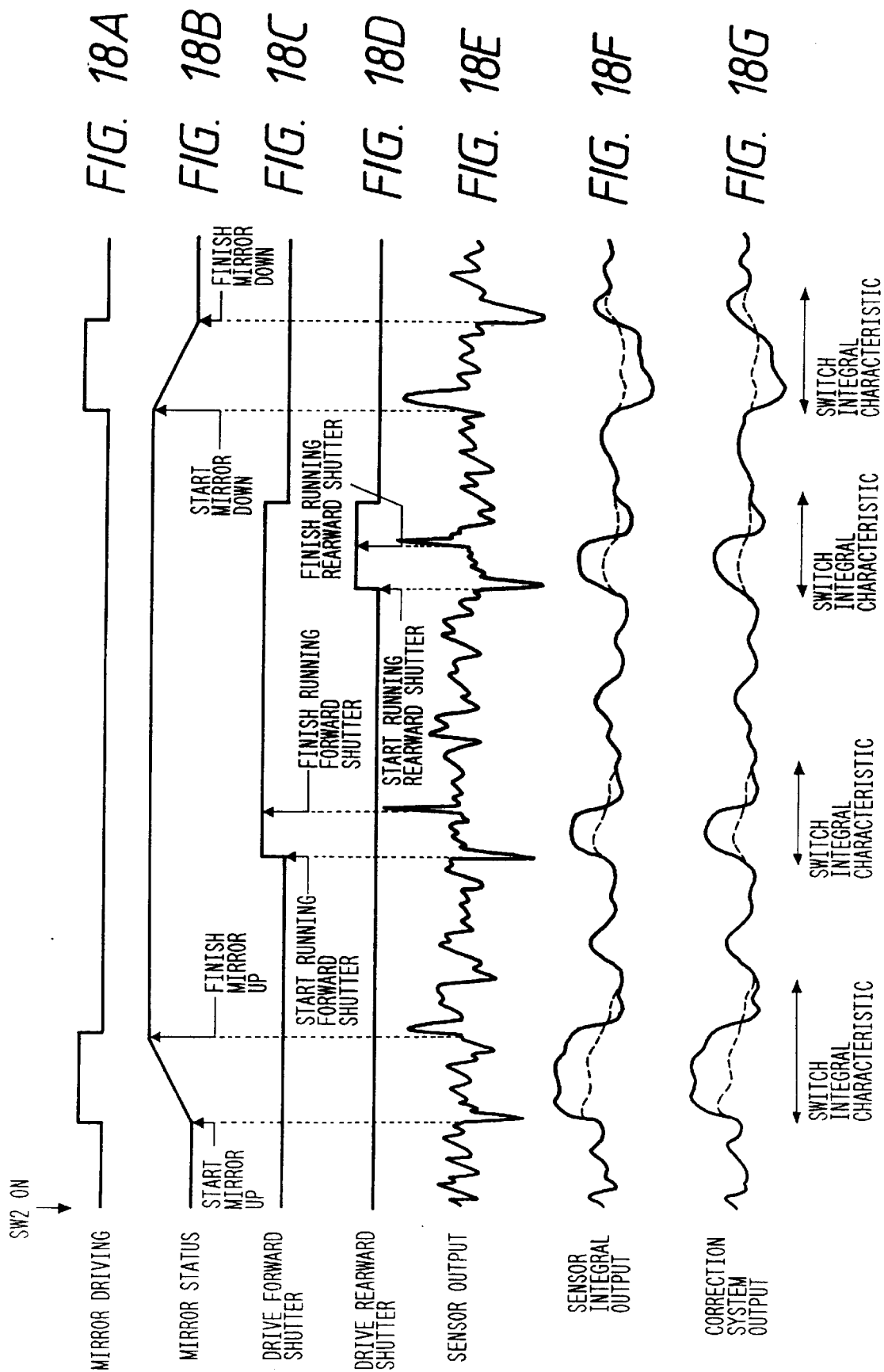

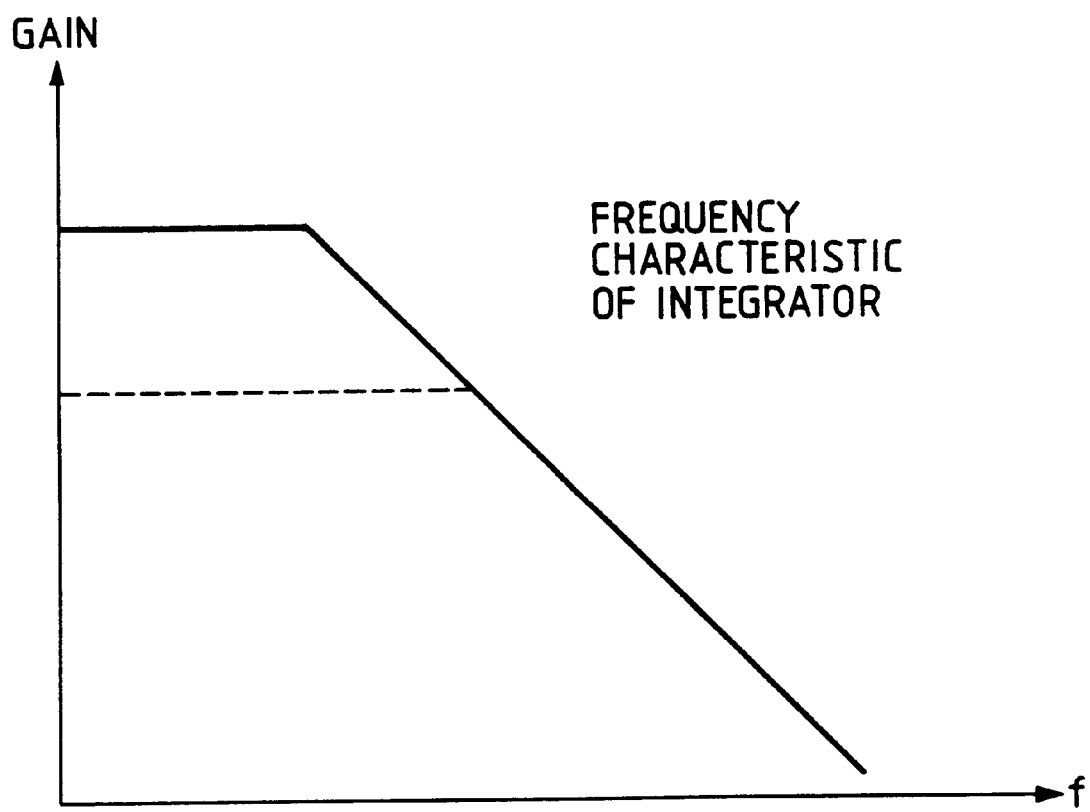

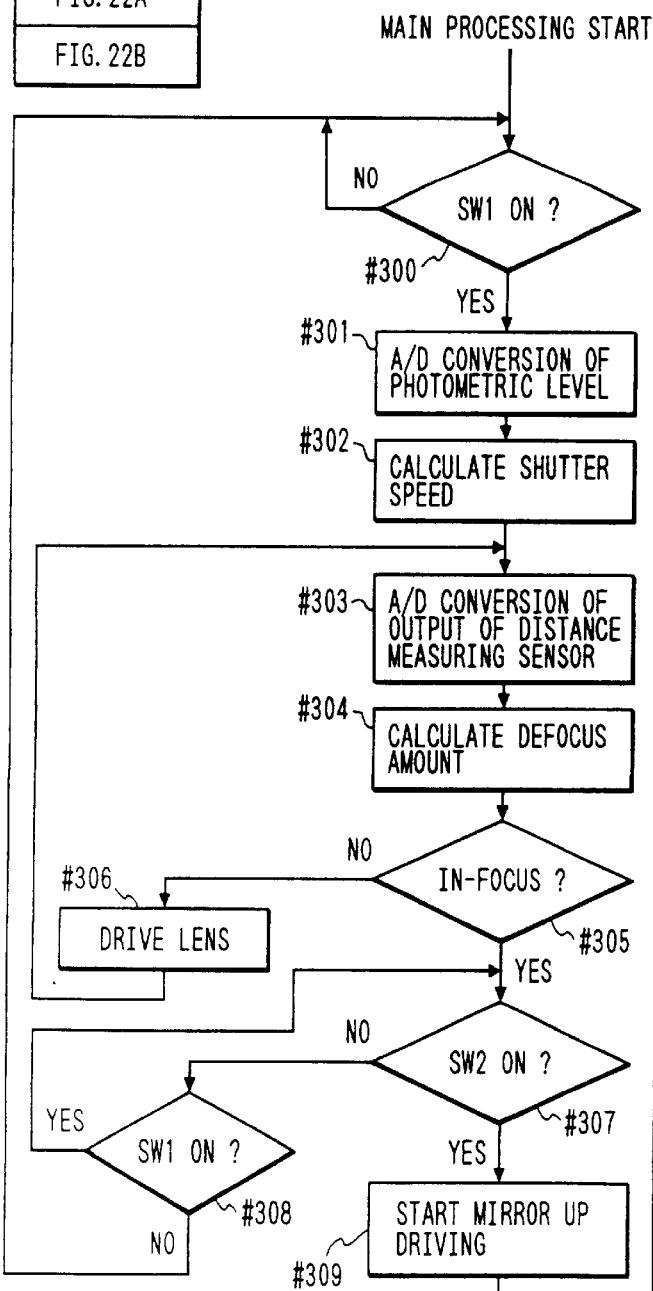

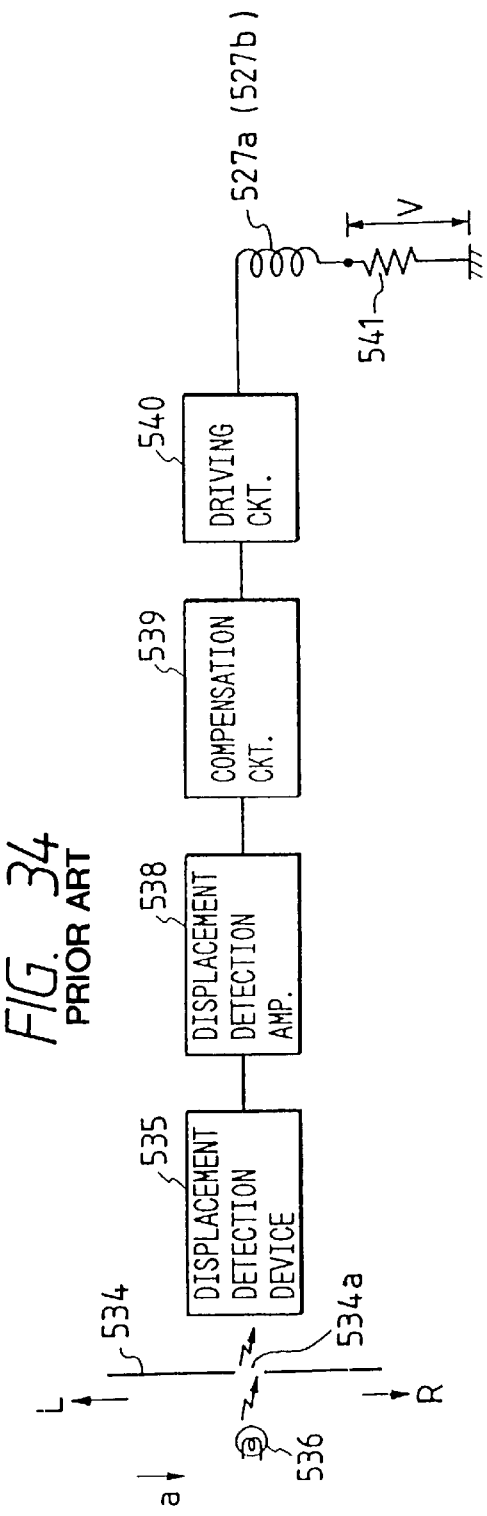
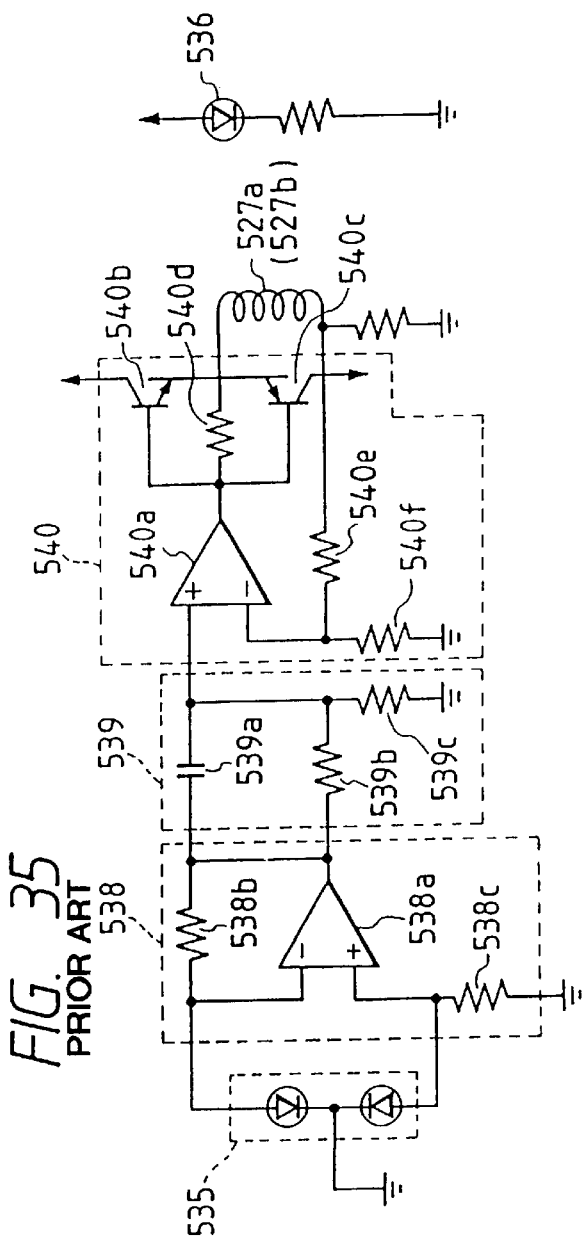
FIG. 34 PRIOR ART
FIG. 35 PRIOR ART

CONTROL APPARATUS FOR IMAGE BLUR PREVENTION

This application is a continuation of application Ser. No. 08/191,606 filed Feb. 4, 1994, now abandoned.

BACKGROUND OF THE INVENTION

1. Field of the Invention

The present invention relates to a control apparatus for image blur prevention, which apparatus executes image blur prevention in accordance with an image blur detection output.

2. Related Background Art

The prior arts as objects of the present invention will be described hereinafter.

In current cameras, since all operations such as exposure determination, focusing, and the like, which are important for a photographing operation, are automated, a user, who is not skilled in camera operations, rarely performs unsuccessful photographing operations. However, it is difficult to automatically prevent an unsuccessful photographing operation caused by a camera fluctuation.

In recent years, cameras, which can prevent an unsuccessful photographing operation caused by a camera fluctuation, have been extensively studied. In particular, cameras, which can prevent an unsuccessful photographing operation caused by a hand vibration of a photographer, have been developed and studied.

The hand vibration of a camera in a photographing operation is normally a fluctuation in a frequency range of 1 Hz to 12 Hz. As a basic concept for allowing to take a picture free from an image blur even when such a hand vibration occurs upon releasing of a shutter, a camera fluctuation caused by the hand vibration must be detected, and a correction lens must be displaced in accordance with the detection value. Therefore, in order to take a picture free from an image blur even when a camera fluctuation occurs, first, the camera fluctuation must be precisely detected, and second, a change in optical axis caused by the hand vibration must be corrected.

Detection of the fluctuation (camera fluctuation) can be realized by arranging, in a camera, a fluctuation sensor for detecting an angular acceleration, an angular velocity, an angular displacement, or the like, and a camera fluctuation detection means for outputting an angular displacement by electrically or mechanically integrating an output signal from the sensor. Then, image blur suppression is attained by driving a correction optical mechanism for decentering a photographing optical axis on the basis of the detected information.

A fluctuation prevention system using an angular displacement detection apparatus will be briefly described below with reference to FIG. 27.

FIG. 27 shows a system for suppressing image blurs caused by a camera vertical fluctuation 41$p$ and a camera horizontal fluctuation 41$y$ in the directions of arrows 41 in FIG. 27.

Referring to FIG. 27, the system includes a lens barrel 42, and angular displacement detection means 43$p$ and 43$y$ for respectively detecting a camera vertical fluctuation angular displacement and a camera horizontal fluctuation angular displacement. The angular displacement detection directions of the means 43$p$ and 43$y$ are respectively represented by 44$p$ and 44$y$. The system also includes a correction optical means 45 (comprising coils 46$p$ and 46$y$ for respectively applying thrusts to the correction optical means 45, and position detection elements 47$p$ and 47$y$ for detecting the positions of the correction optical means 45). The correction optical means 45 has a position control loop (to be described later), and is driven using the outputs from the angular displacement detection means 43$p$ and 43$y$ as target values, thereby assuring stability on an image plane 48.

FIGS. 28 to 31 show the arrangement of an angular displacement detection apparatus as the fluctuation sensor suitable for the above-mentioned object, and the following description will be made with reference to FIGS. 28 to 31.

Referring to FIGS. 28 to 30, components constituting the apparatus are attached to a base plate 51. An outer cylinder 52 has a chamber in which a float 53 and a liquid 54 (to be described below) are sealed. The float 53 is held by a float holding member 55 (to be described later) to be rotatable about a shaft 53$a$, and a slit-like reflection surface is formed on a projection 53$b$. The float 53 consists of a material comprising a permanent magnet, and is magnetized in the direction of the shaft 53$a$. The float 53 is arranged to be rotation-balanced about the shaft 53$a$, and to be buoyancy-balanced.

The float holding member 55 is fixed to the outer cylinder 52 while holding the float 53 via pivot bearings 56 (to be described later). A U-shaped yoke 57 is attached to the base plate 51, and forms a closed magnetic circuit together with the float 53. A winding coil 514 is arranged between the float 53 and the yoke 57 to have a stationary relationship with the outer cylinder 52. A light-emitting element (IRED) 58 for emitting light upon energization is attached to the base plate 51. A position detection element (PSD) 59 whose output changes depending on the light-receiving position is attached to the base plate 51. The light-emitting element 58 and the position detection element 59 constitute an optical angular displacement detection means of a type for transmitting light via the projection (reflection surface) 53$b$ of the float 53.

A mask 510 is arranged on the front surface of the light-emitting element 58, and has a slit hole 510$a$ which allows light to pass therethrough. A stopper member 511 is attached to the outer cylinder 52 to restrict rotation of the float 53 within a predetermined range.

The above-mentioned float 53 is rotatably held as follows. More specifically, pivot shafts 512 with sharp distal ends are inserted under pressure in the upper and lower central portions of the float 53, as shown in FIG. 29 (A—A section of FIG. 28). The pivot bearings 56 are arranged in the distal end portions of U-shaped upper and lower arms of the float holding member 55 to inwardly oppose each other, and the sharp distal ends of the pivot shafts 512 are fitted in the pivot bearings 56, thereby holding the float.

An upper cover 513 of the outer cylinder 52 is seal-adhered by a known technique using, e.g., a silicone adhesive, to seal the liquid 54 in the outer cylinder 52.

In the above-mentioned arrangement, the float 53 has a symmetrical shape about the rotational shaft 53$a$ so as not to generate a rotation moment due to the influence of gravity at any position, and to exert substantially no load on the pivot shafts. In addition, the float 53 consists of a material having the same specific gravity as that of the liquid 54. In practice, it is impossible to attain an unbalance component=0. However, since only a shape error component corresponding to a specific gravity difference acts as an unbalance component, the unbalance component is substantially very small, and the S/N ratio of friction to inertia is very high, as can be seen from the above description.

In this arrangement, even when the outer cylinder 52 is rotated about the rotational shaft 53a, since the internal liquid 54 stands still by inertia with respect to the absolute space, the float 53 in a floating state is not rotated. Therefore, the outer cylinder 52 is rotated relative to the float 53 about the rotational shaft 53a. The relative angular displacement between the outer cylinder 52 and the float 53 can be detected by the optical detection means using the light-emitting element 58 and the position detection element 59.

Light emitted from the light-emitting element 58 passes through the slit hole 510a of the mask 510, and is radiated onto the float 53. The light is reflected by the slit-like reflection surface of the projection 53b, and then reaches the position detection element 59. Upon transmission of the light, the light is converted into substantially parallel light by the slit hole 510a and the slit-like reflection surface, and an image free from blurring is formed on the position detection element 59.

Since the outer cylinder 52, the light-emitting element 58, and the position detection element 59 are fixed to the base plate 51, and move integrally, if a relative angular displacement motion occurs between the outer cylinder 52 and the float 53, a slit image on the position detection element 59 moves by an amount corresponding to the displacement. Therefore, the output from the position detection element 59 as a photoelectric conversion element, whose output changes depending on the light-receiving position, is proportional to the displacement of the position of the slit image, and the angular displacement of the outer cylinder 52 can be detected on the basis of this output as information.

As described above, the float 53 consists of a permanent magnet material having the same specific gravity as that of the liquid 54, and is prepared as follows, for example.

When a fluorine-based inert liquid is used as the liquid 54, a fine powder of a permanent magnet material (e.g., ferrite) is added as a filler in a plastic material as a base, and its content is adjusted. Thus, it is easy to obtain a specific gravity almost equal to a specific gravity "1.8" of the liquid at the volume content of about 8%. After or simultaneously with molding of the float 53 using the above-mentioned materials, the float 53 is magnetized in the direction of the shaft 53a. Thus, the float 53 can have a nature of a permanent magnet.

FIG. 31 is a sectional view showing the relationship among the float 53, the yoke 57, and the winding coil 514, and taken along a line B—B in FIG. 28.

As shown in FIG. 31, the float 53 is magnetized in the direction of the shaft 53a. In FIG. 31, the upper side of the float 53 is magnetized to have an N pole, and its lower side is magnetized to have an S pole. Lines of magnetic force output from the N pole run into the S pole via the U-shaped yoke 57, thus defining a closed magnetic circuit. When a current is supplied to the winding coil 514 arranged in this magnetic circuit from the back side toward the front side of the plane of the drawing of FIG. 31, the winding coil 514 receives a force in the direction of an arrow f according to the Fleming's left-hand rule. However, the winding coil 514 is fixed to the outer cylinder 52, as described above, and cannot move. Therefore, a force acts in the direction of an arrow F as a reaction, and the float 53 is driven by this force. This force is proportional to the current supplied to the winding coil 514, and the direction of the force is reversed if the current is supplied in a direction opposite to the above-mentioned direction, as a matter of course. More specifically, in the above-mentioned arrangement, the float 53 can be freely driven.

Since a spring force acting on the float 53 by this driving force is a force for maintaining the float 53 at a predetermined position with respect to the outer cylinder 52 (i.e., for integrally moving the float 53) in principle, if this spring force is strong, the outer cylinder 52 and the float 53 move together, and no relative angular displacement for an object angular displacement occurs. However, if the driving force (spring force) is sufficiently smaller than the inertia of the float 53, this arrangement can respond even to an angular displacement at a relatively low frequency.

FIG. 32 is a circuit diagram showing an electrical circuit of the above-mentioned angular displacement detection apparatus.

Current-voltage conversion amplifiers 515a and 515b (and resistors R33 to R36) convert photocurrents 517a and 517b generated in the position detection element 59 by reflected light 516 (originally emitted by the light-emitting element 58) into voltages, and a differential amplifier 518 (and resistors R37 to R40) obtains an output difference between the current-voltage conversion amplifiers 515a and 515b, i.e., an angular displacement (a relative angular displacement motion between the outer cylinder 52 and the float 53). The output from the amplifier 518 is divided by resistors 519a and 519b to obtain a very small output, and this output is input to a driving amplifier 520 (and a resistor R41, and transistors TR11 and TR12), which supplies a current to the winding coil 514 so as to attain negative feedback (the wiring pattern of the winding coil 514 and the magnetization direction of the float 53 are set, so that the float 53 is returned to the center in response to an output from the differential amplifier 518). Thus, as described above, a spring force (driving force) sufficiently smaller than the inertia of the liquid 54 is generated.

An addition amplifier 521 (and resistors R42 to R45) calculates the sum of the outputs from the amplifiers 515a and 515b (the total sum of the light-receiving amounts of the reflected light 516 originally emitted by the light-emitting element 58 and received by the position detection element 59), and supplies its output to a driving amplifier 522 (and resistors R47 and R48, a transistor TR13, and a capacitor C11) for driving the light-emitting element 58.

The light-emitting amount of the light-emitting element 58 changes very unstably in the presence of a temperature difference. However, as described above, when the light-emitting element 58 is driven by the total sum of the light-receiving amounts, the total sum of photocurrents output from the position detection element 59 becomes always constant, and the angular displacement detection sensitivity of the differential amplifier 518 is very stable.

FIG. 33 shows the structure of a servo angular acceleration detection apparatus as another vibration sensor.

Referring to FIG. 33, a support portion 524 is integrally fixed to an outer frame bottom portion 523. Two ends of a shaft 526 are supported by the support portion 524, and bearings 525a and 525b such as ball bearings which suffer less friction. The shaft 526 swingably supports a seesaw 528 to which coils 527a and 527b are attached.

Magnetic circuit boards 530a and 530b as lid portions, and permanent magnets 531a, 531b, 532a, and 532b are arranged above and below the coils 527a and 527b and the seesaw 528 to oppose each other and to be vertically separated from the coils 527a and 527b and the seesaw 528. The magnetic circuit boards 520a and 530b also serve as the lid portions of an outer frame, as described above. The permanent magnets 531a, 531b, 532a, and 532b are mounted on magnetic circuit back plates 533a and 533b fixed to the bottom portion of the outer frame bottom portion 523.

A slit plate 534 formed with a slit 534*a* which extends in the direction of thickness is arranged on the coil 527*a* of the seesaw 528. A photoelectric displacement measuring device 535 such as an SPC (separate Photo Diode) is arranged on the magnetic circuit board 530*a*, which is located above the slit 534*a*, and also serves as the lid portion of the outer frame, and a light-emitting element 536 such as an infrared light-emitting diode is arranged on the magnetic circuit back plate 533*a* below the slit 534*a*.

In the above-mentioned direction, assuming that an angular acceleration a acts on the outer frame in FIG. 33, as indicated by an arrow 537, the seesaw 528 is relatively inclined in a direction opposite to the angular acceleration a, and this fluctuation angle can be detected by the position of the beam emitted from the light-emitting element 536 on the displacement measuring device 535 via the slit 534*a*.

Magnetic fluxes from the permanent magnets 531*a* and 531*b* pass through the permanent magnets 531*a* and 531*b*→the coils 527*a* and 527*b*→the magnetic circuit boards 530*a* and 530*b*→the coils 527*a* and 527*b*→the permanent magnets 532*a* and 532*b*, and on the other hand, magnetic fluxes from the permanent magnets 532*a* and 532*b* pass through the permanent magnets 532*a* and 532*b* the magnetic circuit back plates 533*a* and 533*b*→the permanent magnets 532*a* and 532*b*, thus forming a closed magnetic circuit as a whole, and forming magnetic fluxes in a direction perpendicular to the coils 527*a* and 527*b*. When a control current is supplied to the coils 527*a* and 527*b*, the seesaw 528 can be moved to the two sides along the fluctuation direction of the angular acceleration a according to the Fleming's rule.

FIG. 34 shows the arrangement of an angular acceleration detection circuit arranged in the servo angular acceleration detection apparatus with the above-mentioned arrangement.

This circuit is constituted by serially connecting a displacement detection amplifier 538 for amplifying the output from the displacement detection device (measuring device) 535, a compensation circuit 539 for stabilizing this feedback circuit system, a driving circuit 540 for further current-amplifying the amplified output from the displacement detection amplifier 538, and energizing the amplified output to the coils 527*a* and 527*b*, and the coils 527*a* and 527*b*.

In this arrangement, the winding directions of the coils 527*a* and 527*b*, and the polarities of the permanent magnets 531*a*, 531*b*, 532*a*, and 532*b* are set to generate a force in a direction opposite to the fluctuation direction of the seesaw 528 by the external angular acceleration a when the coils 527*a* and 527*b* are energized.

The operation principle of the servo angular acceleration detection apparatus with the above-mentioned arrangement will be described below. Assuming that an angular acceleration a externally acts on the angular acceleration sensor with the above arrangement, as shown in FIG. 34, the seesaw 528 fluctuates relative to the outer frame in the opposite rotational direction by the inertia, and hence, the slit 534*a* provided to the seesaw 528 moves in the direction of an arrow L. For this reason, the center of a light beam radiated from the light-emitting element 536 onto the displacement detection device 535 is displaced, and the displacement detection device 535 generates an output proportional to the displacement amount.

This output is amplified by the displacement detection amplifier 538, as described above, is further current-amplified by the driving circuit 540 via the compensation circuit 539, and is supplied to the coils 537*a* and 527*b*.

When a control current is supplied to the coils 527*a* and 527*b*, as described above, a force is generated in the seesaw 528 in the direction of an arrow R opposite to the direction of the arrow L of the external angular acceleration a, and an adjusted control current is generated, so that the light beam incident on the displacement detection device 535 is returned to an initial position in a non-application state of the external angular acceleration a.

Note that the value of the control current flowing through the coils 527*a* and 527*b* is proportional to the rotational force acting on the seesaw 528, and the rotational force acting on the seesaw 528 is proportional to the force required to return the seesaw 528 to its initial position, i.e., the magnitude of the external angular acceleration a. For this reason, when the current is read as a voltage V via a resistor 541, the magnitude of the angular acceleration a as control information necessary for, e.g., an image blur prevention system of a camera, can be obtained.

The obtained angular acceleration output is second-order-integrated by a known analog or digital integral circuit to obtain a hand vibration output.

FIG. 35 shows in more detail the angular acceleration detection circuit in FIG. 34.

Referring to FIG. 35, an amplifier 538*a*, and resistors 538*b* and 538*c* correspond to the position detection amplifier 538 in FIG. 34, and photoelectrically convert and amplify a photocurrent from the displacement detection device 535 to attain position detection. A capacitor 539*a*, and resistors 539*b* and 539*c* correspond to the compensation circuit 539, and a driving amplifier 540*a*, transistors 540*b* and 540*c*, and resistors 540*d*, 540*e*, and 540*f* correspond to the driving circuit 540 for driving the coils 527*a* and 527*b*.

FIG. 36 shows the structure of a vibration gyro as an angular velocity sensor suitable for the above-mentioned object.

The vibration gyro is constituted by a fluctuation mechanism 61, a support mechanism 62 for supporting the fluctuation mechanism 61 with respect to a base, and a control circuit unit 63 connected to the fluctuation mechanism 61.

The fluctuation mechanism 61 is formed by a fluctuation driving portion 64 formed to have a tuning fork shape, and a pair of fluctuation segments 65*a* and 65*b* which extend from the distal ends of the fluctuation driving portion 64 so as to weaken the rigidity in a direction perpendicular to the fluctuation surface.

A first piezoelectric conversion element 66 for fluctuation driving and a second piezoelectric conversion element 67 (not shown) for fluctuation driving detection are fixed to the fluctuation driving portion 64. In response to a fluctuation application signal input from the control circuit unit 63 to the first piezoelectric conversion element 66, the fluctuation driving portion 64 and the fluctuation segments 65*a* and 65*b* formed integrally with the portion 64 fluctuate in opposite directions, as indicated by arrows 68*a* and 68*b*. The second piezoelectric conversion element 67 detects a fluctuation, and outputs it to the control circuit unit 63.

Concentrated mass portions 69*a* and 69*b* are respectively formed at the distal end portions of the fluctuation segments 65*a* and 65*b*, and have an alternate velocity upon fluctuation of the fluctuation driving portion 64. In this state, when an angular velocity Ω acts about an axis 610 extending along the fluctuation mechanism 61, Coriolis' forces Fc each defined by a product of the concentrated mass, the alternate velocity, and the input angular velocity act in the directions of arrows 611*a* and 611*b*. The reason why the directions of the arrows 611*a* and 611*b* are opposite to each other is that the pair of fluctuation segments 65*a* and 65*b* fluctuate in opposite directions.

Since the alternate velocity is always maintained by the control circuit unit 63 (to be described later) to have a predetermined amplitude, and the concentrated masses do not change, the Coriolis' force Fc changes in proportion to the input angular velocity.

The fluctuation segments 65a and 65b are distorted by the Coriolis' forces Fc, and the distortions are detected by third piezoelectric conversion elements 612a and 612b which are fixed to detect the distortion directions of the fluctuation segments 65a and 65b. The outputs from the elements 612a and 612b are processed by the control circuit unit 63, thus obtaining an angular velocity.

Terminal outputs from the second and third piezoelectric conversion elements 67, and 612a and 612b are grounded at resistors 613 and 614, and are then input to non-inverting amplifiers 615 and 616, thereby generating amplified detected voltages.

A phase shifter circuit 617 generates a phase-shifted voltage by shifting the phase of the amplified detected voltage by 90° in response to the amplified detected voltage from the non-inverting amplifier 615. The role of the phase shifter circuit 617 will be described below.

The fluctuation mechanism 64 fluctuates in response to a fluctuation application signal input to the first piezoelectric conversion element 66. The most efficient fluctuation amplitude with respect to the fluctuation application signal is obtained at the resonance frequency of the fluctuation mechanism 64. However, in the resonance state, the phase of an actual fluctuation is delayed by 90° from that of the fluctuation application signal input to the first piezoelectric conversion element 66. For this reason, the phase of the amplified detected voltage from the non-inverting amplifier 615 via the second piezoelectric conversion element 67 is delayed by 90° from that of the fluctuation application signal, and is advanced by 90° by the phase shifter circuit 617 to be in phase with that of the fluctuation application signal.

When the in-phase signal is input to the first piezoelectric conversion element 66 to constitute a so-called positive feedback circuit, and the amplified detected voltage from the non-inverting amplifier 615 is increased to be higher than an input signal voltage, the fluctuation mechanism 64 begins to fluctuate.

A rectification circuit 619 generates a rectified voltage by rectifying the phase-shifted voltage in response to the phase-shifted voltage from the phase shifter circuit 617. A fiducial signal generator 620 generates a fiducial voltage for controlling the fluctuation application signal to the first piezoelectric conversion element 66 so as to obtain a constant amplified detected signal from the non-inverting amplifier 615.

A differential amplifier 621 generates a differentially amplified voltage by amplifying the difference between the rectified voltage from the rectification circuit 619 and the fiducial voltage from the fiducial signal generator 620. A multiple circuit 622 multiplies the differentially amplified voltage from the differential amplifier 621 with the phase-shifted voltage from the phase shifter circuit 617, and outputs the product as a feedback voltage corresponding to the fluctuation application signal to the first piezoelectric element 66.

As described above, when the amplified detected voltage from the non-inverting amplifier 615 is set to be higher than the fluctuation application signal voltage, the fluctuation mechanism 64 begins to fluctuate. In this state, however, since the fluctuation gradually increases, and is finally limited by a power supply voltage, an unstable fluctuation with a distorted waveform is obtained.

However, when the amplified detected voltage from the non-inverting amplifier 615 is rectified by the rectification circuit 619, and the difference between the rectified voltage and the fiducial voltage from the fiducial signal generator 620 is multiplied in positive feedback, the product from the multiple circuit 622 decreases as the fluctuation increases and the rectified voltage increases to be close to the fiducial voltage. As a result, the ratio between the fluctuation application signal voltage and the amplified voltage from the non-inverting amplifier 615 decreases. More specifically, the gain of the positive feedback circuit is controlled by the fluctuation amplitude and the fiducial signal, and the fluctuation mechanism 64 stably fluctuates at a constant amplitude.

The output from the non-inverting amplifier 616 is input to a band-pass circuit 623 which allows only a fluctuation frequency component to pass therethrough, thereby removing a disturbance signal (for example, an acceleration signal obtained when the fluctuation segments 65a and 65b are distorted by a gravitational acceleration, and the distortions are detected by the third piezoelectric conversion elements 612a and 612b) in a frequency range considerably lower than the fluctuation frequency.

A synchronous detecter circuit 624 synchronously detects the band-pass amplified detected voltage from the band-pass circuit 623 in response to and in association with the phase-shifted voltage from the phase shifter circuit 617, and generates the synchronously detected result as a synchronously detected voltage.

FIG. 37A is a graph for explaining a synchronous detection state. As indicated by an alternate long and short dashed curve 626, the phase of the alternate velocity advances by 90° from that of a fluctuation 625 of the fluctuation mechanism portion 64 indicated by a solid curve.

The outputs from the third piezoelectric conversion elements 612a and 612b upon application of the angular velocity Ω are in phase with the alternate velocity, as indicated by an alternate long and two short dashed curve 627. A broken curve represents an output 628 from the second piezoelectric conversion element 67 for detecting a fluctuation of the fluctuation mechanism portion 64, and the outputs from the third piezoelectric conversion elements 612a and 612b are synchronously detected by a phase-shifted voltage obtained by advancing the output 628 by 90° by the phase shifter circuit 617.

FIG. 37B shows the obtained synchronously detected voltage. An angular velocity voltage representing the angular velocity Ω is obtained by integrating hatched areas by a smoothing circuit 629.

A hand vibration amount (hand vibration angular displacement) can be obtained by integrating the obtained angular velocity output by a known analog or digital integral circuit.

FIG. 38 is an exploded perspective view showing the structure of a correction optical means suitably used for the above-mentioned object.

A bearing 73y is press-fitted in a support frame 72 to which a lens 71 is caulked. A support shaft 74y is supported by the bearing 73y to be slidable in the axial direction. A recess portion 74ya of the support shaft 74y is locked with to pawls 75a of a support arm 75. A bearing 73p is press-fitted in the support arm 75 as well, and a support shaft 74p is supported by the bearing 73p to be slidable in the axial direction.

Note that FIG. 38 also illustrates a rear view of the support arm 75, and a partial front view for clearly showing the pawls 75a.

Light-emitting elements 76p and 76y such as IREDs are adhered to light-emitting element mounting holes 72pa and 72ya of the support frame 72, and their terminals are soldered to lids 77p and 77y (adhered to the support frame 72) which also serve as adhesive boards. The support frame 72 has slits 72pb and 72yb, and light beams emitted from the light-emitting elements 76p and 76y are incident on PSDs 78p and 78y (to be described later) via the slits 72pb and 72yb. Coils 79p and 79y are also adhered to the support frame 72, and their terminals are soldered to the lids 77p and 77y.

Support balls 711 are fitted (at three positions) in a lens barrel 710, which has a pawl portion 710a to which a recess portion 74pa of the support shaft 74p is locked.

Yokes $712p_1$, $712p_2$, and $712p_3$, and magnets 713p are stacked and adhered to each other, and similarly, yokes $712y_1$, $712y_2$, and $712y_3$, and magnets 713y are stacked and adhered to each other. Note that the magnets are arranged to have polarities indicated by arrows 713pa and 713ya.

The yokes $712p_2$ and $712y_2$ are respectively fixed by screws to recess portions 710pb and 710yb of the lens barrel 710.

Position detection elements 78p and 78y such as PSDs are adhered to sensor bases 714p and 714y (714y is not shown), and are respectively covered by sensor masks 715p and 715y. The terminals of the position detection elements 78p and 78y are soldered to a flexible board 716. Projecting portions 714pa and 714ya (714ya is not shown) of the sensor bases 714p and 714y are fitted in mounting holes 710pc and 710yc of the lens barrel 710, and the flexible board 716 is fixed by screws to the lens barrel 710 via a flexible stay 717. Ear portions 716pa and 716ya of the flexible board 716 respectively extend through holes 710pd and 710yd of the lens barrel 710, and are fixed by screws onto the yokes $712p_1$ and $712y_1$. The coil terminals and the light-emitting element terminals on the lids 77p and 77y are connected to land portions 716pb and 716yb of the ear portions 716pa and 716ya and to polyurethane-coated copper lines (three-stranded lines).

A plunger 719 is fixed by screws to a mechanical lock chassis 718, is fitted in a mechanical lock arm 721 with a charged spring 720, and is rotatably fixed to the mechanical lock chassis 718 by an axial screw 722.

The mechanical lock chassis 718 is fixed by screws to the lens barrel 710, and the terminal of the plunger 719 is soldered to a land portion 716b of the flexible board 716.

Adjustment screws (three screws) 723 with spherical distal ends are screwed in a yoke 712p and the mechanical lock chassis 718 to extend therethrough, and the adjustment screws 723 and the support balls 711 sandwich the sliding surface (a hatched portion 72c) of the support frame 72 therebetween. The adjustment screws 723 are screwed and adjusted to oppose the sliding surface with a small clearance.

A cover 724 is adhered to the lens barrel 710 to cover the above-mentioned correction optical means.

FIG. 39 is a view for explaining driving control of the correction optical means shown in FIG. 38.

When the outputs from the position detection elements 78p and 78y are amplified by amplification circuits 727p and 727y, and the amplified outputs are input to the coils 79p and 79y, the support frame 72 is driven, and the outputs from the position detection elements 78p and 78y change. When the driving directions (polarities) of the coils 79p and 79y are set in directions to decrease the outputs from the position detection elements 78p and 78y (negative feedback), the support frame 72 is stabilized by the driving forces from the coils 79p and 79y at a position where the outputs from the position detection elements 78p and 78y become almost zero. Note that addition circuits 731p and 731y are circuits for adding the outputs from the position detection elements 78p and 78y and external command signals 730p and 730y, compensation circuits 728p and 728y are circuits for more stabilizing a control system, and driving circuits 729p and 729y are circuits for compensating for currents to be applied to the coils 79p and 79y.

When the external command signals 730p and 730y are supplied to the system shown in FIG. 39 via the addition circuits 731p and 731y, the support frame 72 is very faithfully driven by the command signals 730p and 730y.

A technique for controlling the coils by negatively feeding back the position detection outputs like in the control system shown in FIG. 39 is called a position control technique, and when a hand vibration amount is input as the command signals 730p and 730y, the support frame 72 is driven in proportion to the hand vibration amount.

FIG. 40 is a circuit diagram showing in detail the driving control system of the correction optical means shown in FIG. 39. In the following description, only a circuit for a pitch direction 725p will be explained (the same applies to a yaw direction 725y).

Current-voltage conversion amplifiers 727a and 727b convert photocurrents $727i_1$ and $727i_2$ generated in the position detection element 78p (comprising resistors R1 and R2) by light emitted from the light-emitting element 76p into voltages. A differential amplifier 727c obtains a difference (an output proportional to the position, in the pitch direction 725p, of the support frame 72) between the outputs from the current-voltage conversion amplifiers 727a and 727b. The current-voltage conversion amplifiers 727a and 727b, the differential amplifier 727c, and resistors R3 to R10 constitute the amplification circuit 727p shown in FIG. 39.

A command amplifier 731a adds the external command signal 730p to the difference signal from the differential amplifier 727c, and constitutes the addition circuit 731p in FIG. 39 together with resistors R11 to R14.

Resistors R15 and R16, and a capacitor C1 constitute a known phase advance circuit, which corresponds to the compensation circuit 728p in FIG. 39.

The output from the addition circuit 731p is input to a driving amplifier 729a via the compensation circuit 728p. The driving amplifier 729a generates a driving signal for the pitch coil 79p, and the correction optical means is displaced. The driving amplifier 729a, a resistor R17, and transistors TR1 and TR2 constitute the driving circuit 729p in FIG. 39.

An addition amplifier 732a calculates a sum (a total sum of light-receiving amounts of the position detection element 78p) of the outputs from the current-voltage conversion amplifiers 727a and 727b, and, hence, a driving amplifier 732b, which receives the sum signal, drives the light-emitting element 76p. The addition amplifier 732a, the driving amplifier 732b, resistors R18 to R22, and a capacitor C2 constitute a driving circuit (not shown in FIG. 39) for the light-emitting element 76p.

The light-emitting amount of the light-emitting element 76p changes very unstably depending on, e.g., the temperature, and the position sensitivity of the differential amplifier 727c changes accordingly. However, when the light-emitting element 76p is controlled by the above-mentioned driving circuit to make the total sum of the light-receiving amounts constant, a change in position sensitivity can be prevented.

In the above-mentioned fluctuation prevention system, a drawback common to the angular displacement detection means, the angular acceleration sensor, and the vibration gyro to be used as the fluctuation sensor (fluctuation detection means) is susceptible to a disturbance shock fluctuation input. This drawback will be described below.

1) When Angular Displacement Detection Means is Used

The float 53 shown in FIG. 29 is supported by the pivot shafts 512 and the pivot bearings 56, and a small clearance is assured between each pair of the pivot shafts 512 and the pivot bearings 56, so that the float 53 can rotate in a resistance-free state with respect to the base plate 51.

Due to this clearance, the float 53 clutters, and when a shock fluctuation is input, the angular displacement output includes an error corresponding to cluttering of the float 53.

A time required until the cluttering converges is closely related to the time constant of the angular displacement detection means.

The time constant of the angular displacement detection means will be described below.

The float 53 has a nature to return to its original position (a zero output position of the position detection element 59) by the spring force of the winding coil 514. When the spring force is very weak, a time required until the float 53 returns to its original position is prolonged, and this state is referred to as "the angular displacement detection means with a large time constant". Conversely, a state wherein the spring force is strong, and a time required until the float 53 returns to its original position is short is referred to as "the angular displacement detection means with a small time constant".

FIGS. 41A and 41B are board graphs showing the ratio of the relative displacement between the base plate 51 and the float 53 with respect to the fluctuation input to the base plate 51 (the output from the position detection element 59) as a function of the input fluctuation frequency. FIG. 41A is a board graph when the time constant is large (the spring force is weak), and FIG. 41B is a board graph when the time constant is small (the spring force is strong).

When the time constant is large, as shown in FIG. 41A, the ratio of the output from the position detection element 59 to the input fluctuation is flat within a hand vibration (frequency) band, and a hand vibration can be detected with high precision. However, since the spring force is weak, the time required until the cluttering converges is prolonged.

When the time constant is decreased (the spring force is increased), the cluttering converges earlier, but detection precision at the low-frequency side (the lower frequency side than $f_{o2}$) of the hand vibration band is impaired, as shown in FIG. 41B.

Note that the time constant can be increased/decreased by adjusting the circuit shown in FIG. 32. For example, in FIG. 32, when the resistance of the resistor 519a is increased, and the resistance of the resistor 519b is decreased, the spring force is decreased (the time constant is increased); conversely, when the resistance of the resistor 519a is decreased, and the resistance of the resistor 519b is increased, the spring force is decreased (the time constant is increased).

As described above, when a large time constant (weak spring force) is set to improve hand vibration detection precision, the time required until the cluttering converges is prolonged. For example, when a shock fluctuation is input before exposure onto a film, and exposure is performed before cluttering converges (a hand vibration detection state with poor precision), the correction optical means is driven by an error output component corresponding to the cluttering as well, and a good picture cannot be obtained.

2) When Angular Acceleration Sensor is Used

In the servo angular acceleration sensor shown in FIG. 33, the seesaw 528 is supported by the bearings 525a and 525b, and a shaft. In this case, a frictional force between these components poses the following problem.

When a shock fluctuation is input, the seesaw 528 swings largely. As described above, when the seesaw 528 is rotated, an adjusted control current is generated to return the seesaw 528 to the initial position. In this case, the seesaw 528 cannot be perfectly returned to an initial state due to the frictional force of the bearings 525a and 525b.

When a normal hand vibration angular acceleration is input, the rotational displacement of the seesaw 528 caused by this acceleration is very small, and the frictional force is negligible. However, when the seesaw 528 swings largely like in the input state of a shock fluctuation, the influence of the frictional force cannot be ignored.

An actual phenomenon will be described below. In a normal state, hand vibration angular acceleration detection of ±1 V is performed to have the output=0 V of the angular acceleration sensor as the center. However, after a shock fluctuation is input, hand vibration angular acceleration detection is performed to have +5 mV as the center. More specifically, a constant DC bias voltage of 5 mV is superposed on the hand vibration angular acceleration detection.

As described above, the output from the angular acceleration sensor is second-order-integrated by a second-order integral circuit to obtain a hand vibration amount (hand vibration angular displacement). However, when the sensor output is kept integrated including an error, this results in a large hand vibration angular displacement error even if the error is as small as 5 mV. In order to avoid this problem, a known DC cut filter is inserted between the output from the angular acceleration sensor and the integral circuit to cut a DC component (5 mV) from the output from the angular acceleration sensor, and thereafter, the output is integrated.

The DC cut filter may cut not only a DC component but also a hand vibration frequency band if its time constant is small, as in the above-mentioned angular displacement detection means. For this reason, the time constant of the DC cut filter must be set to be large. However, when the time constant is set to be large, the time required for cutting a DC component is prolonged.

FIG. 42A is a board graph showing the characteristic of the DC cut filter with a large time constant. In FIG. 42A, the frequency of an input signal (an output from an angular accelerometer) is plotted along the abscissa, and the gain (attenuation factor) of the input signal by the DC cut filter is plotted along the ordinate.

As can be seen from FIG. 42A, the DC cut filter has a characteristic of attenuating frequency components, below a frequency $f_0$, of the input signal.

In the characteristic shown in FIG. 42A, since the DC cut filter does not attenuate frequency components in a hand vibration frequency band, it functions as a satisfactory DC cut filter (which can cut frequency components below the frequency $f_0$), but requires a long time until a DC component is cut. This is because if $f_0$ in FIG. 42A is set to be 0.1 Hz, the DC cut filter cuts signal components from a DC component to 0.1 Hz. In this case, in order to sufficiently cut a component of 0.1 Hz, 10 seconds (wavelength: 10 seconds) are required In order to shorten the DC cut time, when a small time constant is set, as shown in FIG. 42B, the DC cut filter cuts frequency components below a frequency fl. In this case, if $f_1 > f_0$, and $f_1$ is set to be 5 Hz, a DC component can be cut in 0.2 seconds. However, since the filter undesirably cuts components from a DC component to a component of 5 Hz, low-frequency components of a signal in a hand vibration frequency range (1 to 12 Hz) are also attenuated, thus disturbing hand vibration detection with high precision.

Therefore, since the DC cut filter with a large time constant, which requires a long time until a DC component is cut, is used, if a shock fluctuation is input before exposure, and exposure is performed before a DC variation caused by the fluctuation is sufficiently removed, the correction optical means is driven by a signal including an error. As a result, a good photographing operation cannot be performed.

FIG. 43A is a board graph of the second-order integral circuit used in the angular acceleration sensor. This circuit has a characteristic of integrating frequency components, higher than a frequency $f_0$, of an input signal. FIG. 43B is a board graph obtained when the time constant of the integral circuit is decreased to attain a characteristic of integrating frequency components higher than a frequency $f_1$ ($f_1 > f_0$). In FIG. 43B, the gain (the amplification factor of an input signal) at the lower frequency side than the frequency $f_1$ becomes smaller than that of the characteristic in FIG. 43A (which is also illustrated by an alternate long and shot dashed line in FIG. 43B). This indicates that a low-frequency error (e.g., a DC component) can be reduced. However, since a hand vibration band cannot be sufficiently integrated by the characteristic shown in FIG. 43B, hand vibration detection with high precision cannot be realized.

Therefore, the integral circuit having the characteristic in FIG. 43A with a large time constant must be used although low-frequency errors cannot be reduced.

Note that the time constant of the fluctuation sensor when the angular acceleration sensor is used represents the time constants of the DC cut filter and the integral circuit.

3) When Vibration Gyro is Used

In FIG. 36, if the fluctuation driving portion 64 and the fluctuation segments 65a and 65b are mounted with high orthogonality, the fluctuation segments 65a and 65b fluctuate in only the directions of the arrows 68a and 68b. However, if the mounting orthogonality is poor, the fluctuation segments 65a and 65b begin to fluctuate in the directions of arrows 611a and 611b or in directions opposite thereto.

If a given fluctuation is generated in the directions of the arrows 611a and 611b, a given angular velocity (DC output) is undesirably detected even when no angular velocity is input.

In order to cut such a DC output, the output from the vibration gyro (to be referred to as an angular velocity sensor hereinafter) is filtered through a DC cut filter, and thereafter, a hand vibration angular displacement is calculated.

FIG. 44A is a board graph of a DC cut filter with a large time constant. In FIG. 44A, the abscissa represents the frequency of an input signal, and the ordinate represents the attenuation of the input signal (output from the angular velocity sensor) by the DC cut filter.

As can be seen from FIG. 44A, the DC cut filter attenuates low frequency components below a frequency $f_0$, and the band components from a DC component to $f_0$ of the output from the angular velocity sensor is cut by the DC cut filter. More specifically, a given angular velocity, which causes an error, is cut, and a hand vibration frequency band is not attenuated. However, the DC cut filter with the above-mentioned characteristic requires a long time until a DC component is cut. This is because if a DC component is to be cut without influencing the hand vibration frequency band (1 to 12 Hz), $f_0$ must be set near 0.1 Hz, and in order to sufficiently cut a signal component of 0.1 Hz, 10 seconds as a reciprocal number (wavelength) of the frequency are required.

Thus, when $f_0$ is set at the high frequency side to attain a characteristic with a small time constant, as shown in FIG. 44B ($f_1 = 2$ Hz), only 0.5 seconds are required until a DC component is cut, but the hand vibration band is also attenuated, thus deteriorating image blur prevention precision.

A DC cut filter with a large time constant must be used. For example, if a shock fluctuation is input before exposure, the fluctuation mechanism 61 is slightly distorted by this shock, and the fluctuation amount of the vibration segments 65a and 65b in the directions of the arrows 611a and 611b by the fluctuation driving portion 64 (leak fluctuation) changes. For this reason, a DC component also changes, and as a result, a long time is required to remove the DC component.

Therefore, if exposure is performed before removal of the DC component, a satisfactory photographing operation is cannot be performed.

FIG. 45A is a board graph showing the characteristic of an integral circuit for integrating the output from a DC cut filter. The integral circuit has a characteristic of integrating frequency components above a frequency $f_0$. FIG. 45B is a board graph when the time constant of the integral circuit is decreased to attain a characteristic of integrating frequency components higher than a frequency $f_1$ ($f_1 > f_0$). In FIG. 45B, the gain (amplification factor of an input signal) at the lower frequency side than the frequency $f_1$ becomes smaller than that of the characteristic (also illustrated in FIG. 45B by an alternate long and short dashed line) in FIG. 45A. This indicates that a low-frequency error (e.g., a DC component) is reduced. However, since the hand vibration frequency band cannot be sufficiently integrated by the characteristic shown in FIG. 45B, hand vibration detection with high precision cannot be realized.

Therefore, the integral circuit having the characteristic in FIG. 45B with a large time constant must be used although a low-frequency error cannot be reduced.

Note that the time constant of the fluctuation sensor when the angular velocity sensor is used represents the time constants of the DC cut filter and the integral circuit.

SUMMARY OF THE INVENTION

One aspect of the invention is to provide a control apparatus for image blur prevention, comprising: discrimination means for discriminating an adverse influence on at least one of an image blur detection portion for detecting an image blur, and an image blur prevention portion for preventing an image blur, and performing discrimination irrespective of a state of the image blur detection portion and a state of the image blur prevention portion; and prevention means for preventing the adverse influence on at least one of the image blur detection portion and the image blur prevention portion in accordance with the discrimination result of the discrimination means. With this arrangement, even when a cause for adversely influencing an image blur prevention operation, e.g., a shock generated upon an operation of a shutter mechanism or upon a film feed operation, is generated, an image blur prevention operation can be stably performed with high precision.

BRIEF DESCRIPTION OF THE DRAWINGS

FIGS. 18A to 18G are timing charts showing an operation of the image blur prevention apparatus of FIG. 13;

FIG. 19 is a graph showing an integral characteristic of the integral means of FIG. 14;

FIG. 34 is a block diagram showing the arrangement of the angular acceleration sensor shown in FIG. 33;

FIG. 35 is a circuit diagram showing in detail the electrical arrangement in FIG. 34;

DETAILED DESCRIPTION OF THE PREFERRED EMBODIMENTS (First Embodiment)

The present invention will now be described in detail with reference to the illustrated embodiments.

Figure 1:
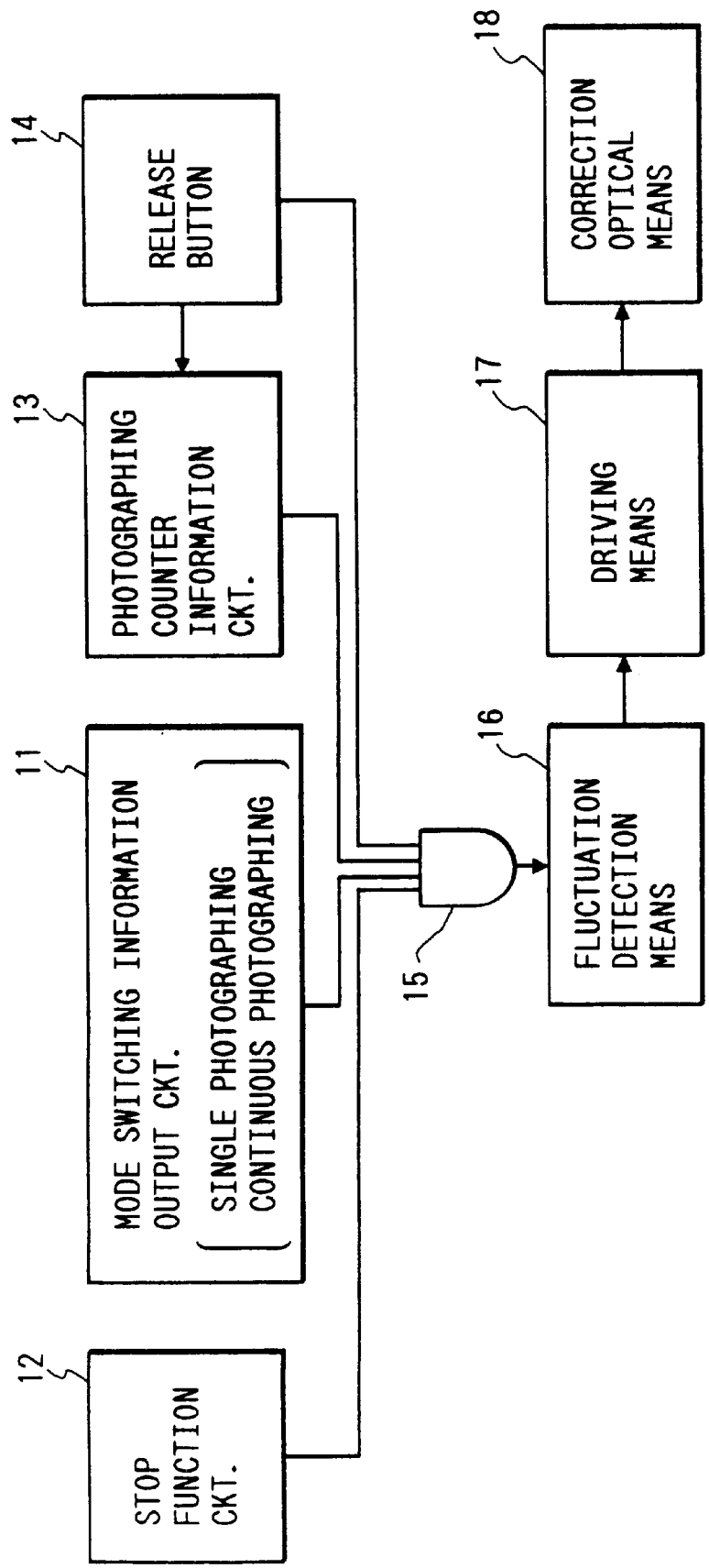
FIG. 1 is a block diagram showing the arrangement of main part of a camera according to the first embodiment of the present invention.

FIG. 1 is a block diagram showing the arrangement of main part of a camera according to the first embodiment of the present invention. Referring to FIG. 1, a mode switching information output circuit 11 detects the state of a switch (an external operation switch or a camera automatic selection switch) for switching between a continuous photographing mode (which allows a plurality of number of times of photographing operations when a release button is kept depressed) and a single photographing mode (which allows only one photographing operation even when the release button is kept depressed), and outputs photographing mode switching information. When the continuous photographing mode is selected, the circuit 11 outputs "1". A stop function circuit 12 detects the state of a switch (not shown) for forcibly stopping a hand vibration detection function. The circuit 12 normally outputs "1", and when the above-mentioned switch is operated to forcibly stop the hand vibration detection function, the circuit 12 outputs "0". A photographing counter information circuit 13 detects the content of a counter which is incremented every time a photographing operation is performed upon depression of a release button 14, and outputs "1" when the content of the counter is equal to or larger than "1", i.e., when a photographing operation is performed on a film even by one frame.

The camera also includes a fluctuation detection means 16, a driving means 17 for a correction optical means, and a correction optical means 18, which respectively have the arrangements described above.

As one of shock fluctuations acting on a camera, a fluctuation caused by a film feed operation is known. Fluctuation components generated when a film feed motor begins to rotate, feeds a film by one frame, and stops include a considerably large fluctuation component. The vibration detection means 16 comprising the above-mentioned angular displacement detection means may generate an error output due to this fluctuation component.

For this reason, when the next photographing operation is performed immediately after a film feed operation (in the continuous photographing mode), a satisfactory picture cannot often be obtained in the photographing operation. A technique for decreasing the time constant of the fluctuation detection means, as described above, by way of precaution against such a shock fluctuation, to suppress generation of an error output, will be examined below.

Referring to FIG. 1, when the continuous photographing mode is selected by the switch (not shown), the mode switching information output circuit 11 outputs "1".

Since the switch (not shown) for forcibly stopping the hand vibration detection function is not operated, the stop function circuit 12 outputs "1", and since no frame is photographed yet, the photographing counter information circuit 13 outputs "0". Therefore, an AND gate 15 outputs "0" at this time.

When the release button 14 is depressed, and a photographing operation on one frame is executed, the photographing counter information circuit 13 outputs "1", and the AND gate 15 supplies an output signal "1" to the fluctuation detection means 16.

The role of the output signal from the AND gate 15 on the fluctuation detection means 16 will be described below with reference to FIGS. 2 to 3D.

Figure 2:
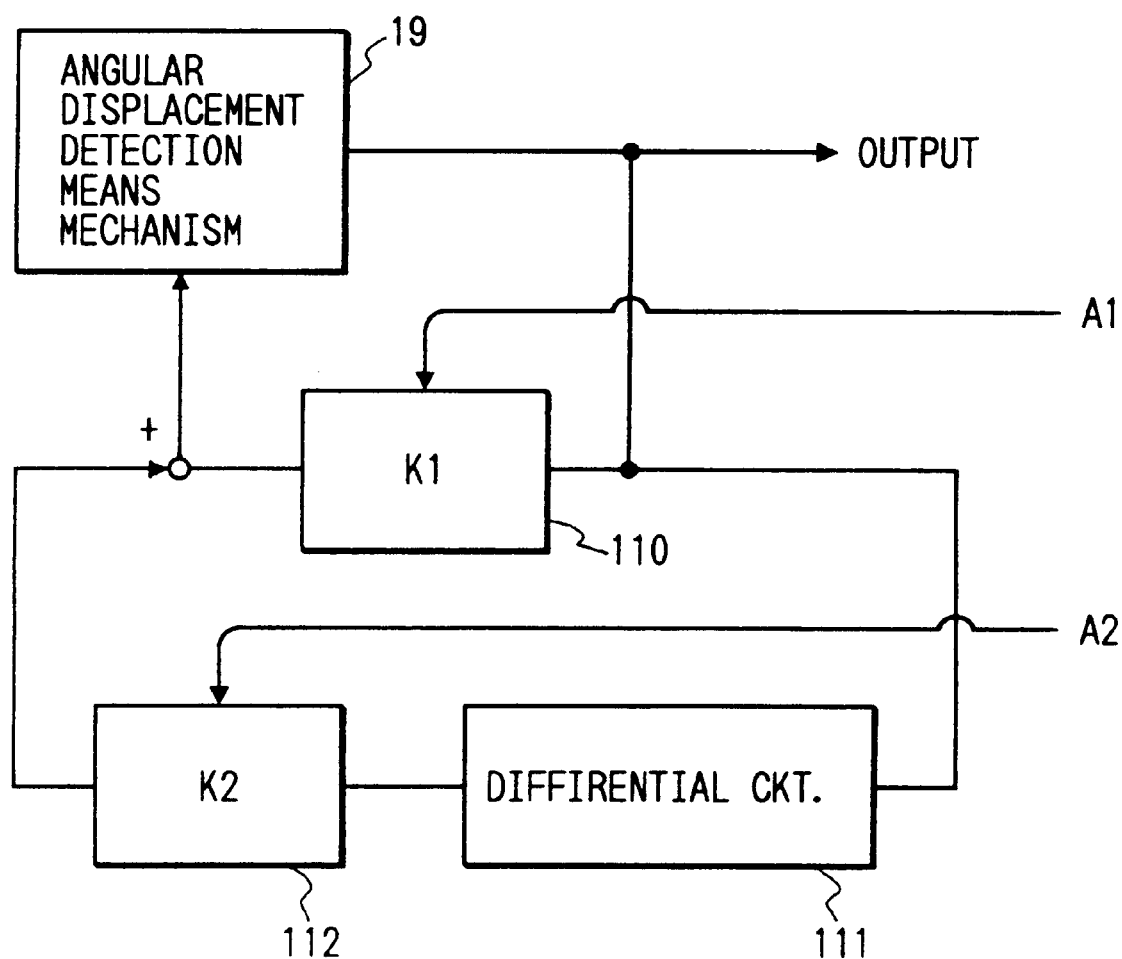
FIG. 2 is a block diagram showing an arrangement associated with a change in characteristic when an angular displacement detection means is used as a fluctuation detection means in FIG. 1.
Figure 28:
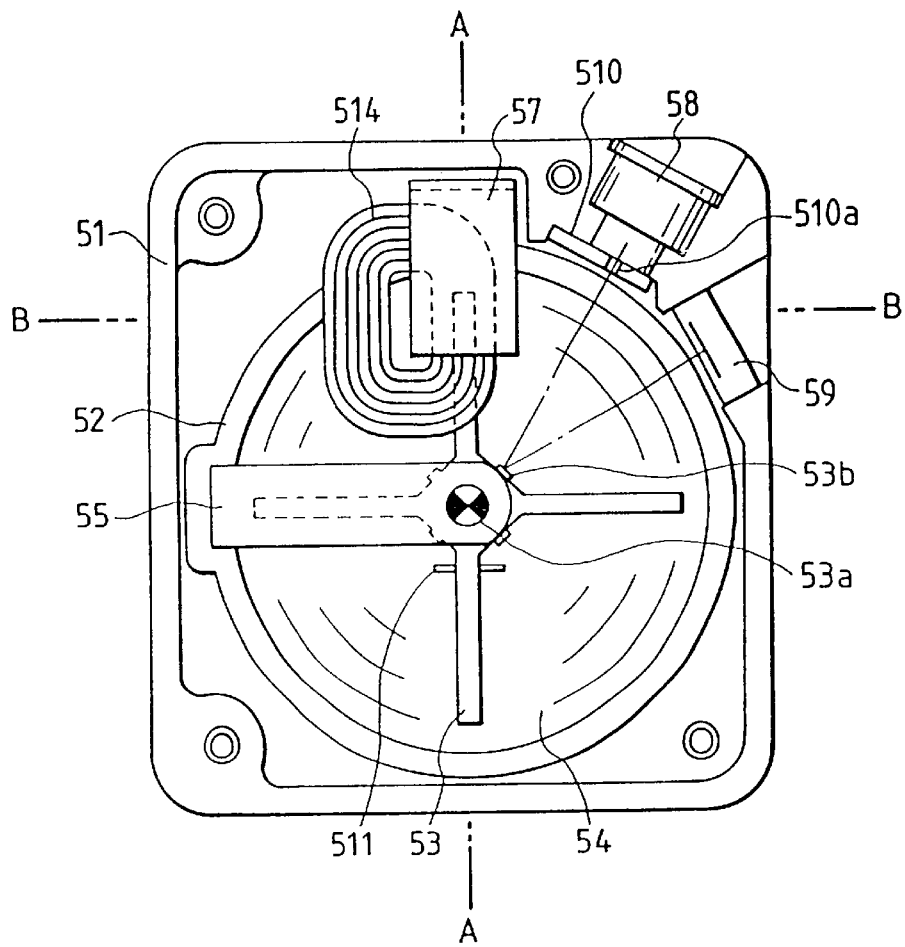
FIG. 28 is a plan view showing an angular displacement detection means as one of conventional fluctuation detection means.
Figure 29:
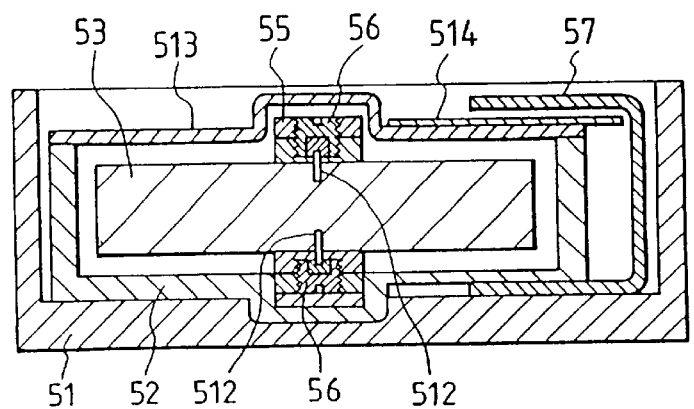
FIG. 29 is a sectional view taken along a line A—A in FIG. 28.
Figure 30:
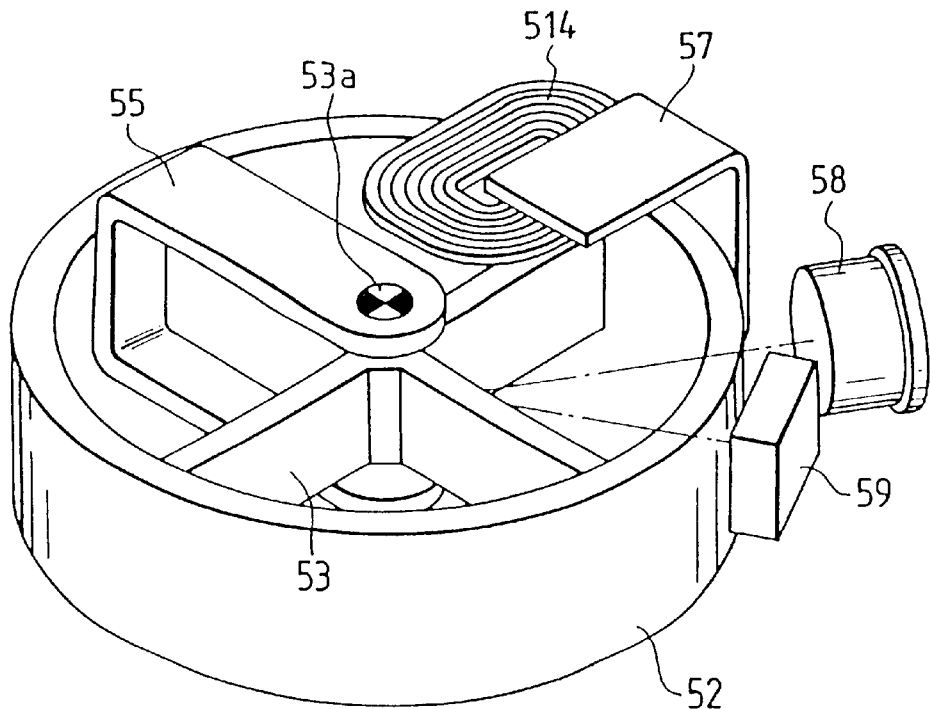
FIG. 30 is a perspective view of the angular displacement detection means shown in FIG. 28.
Figure 31:
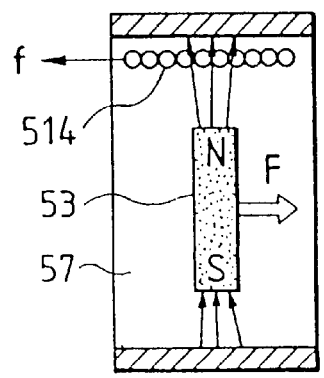
FIG. 31 is a sectional view taken along a line B—B in FIG. 28.
Figure 32:
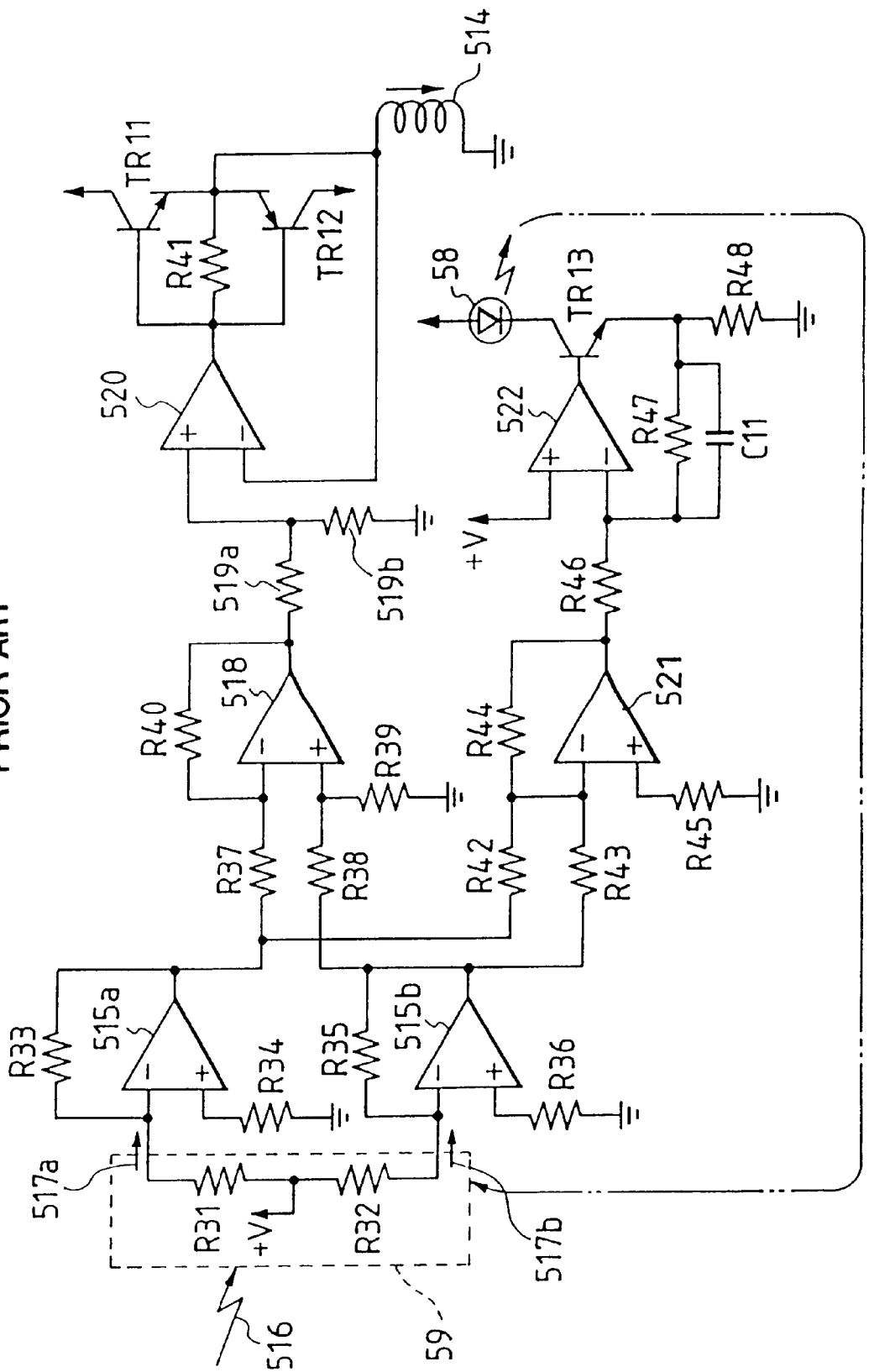
FIG. 32 is a circuit diagram showing the arrangement of the angular displacement detection means shown in FIG. 28.

A circuit shown in FIG. 2 includes an angular displacement detection means mechanism 19, a first gain generator 110 for generating a gain $k_1$ corresponding to the spring force to the float 53 shown in, e.g., FIG. 28, a known differential circuit 111 for calculating the rotational angular velocity of the float 53 by differentiating the output from the light-receiving element 59 shown in, e.g., FIG. 28, and a second gain generator 112 for generating a gain $k_2$ for determining the strength of damping to be given to the float 53 by negatively feeding back the angular velocity of the float 53 to the winding coil 514 (In general, when the velocity of a portion to be driven is negatively fed back to its driving force, if a negative feedback gain is increased, or a negative feedback driving force based on the velocity is strengthened, the damping and viscosity of the portion to be driven are increased).

Figure 3A:
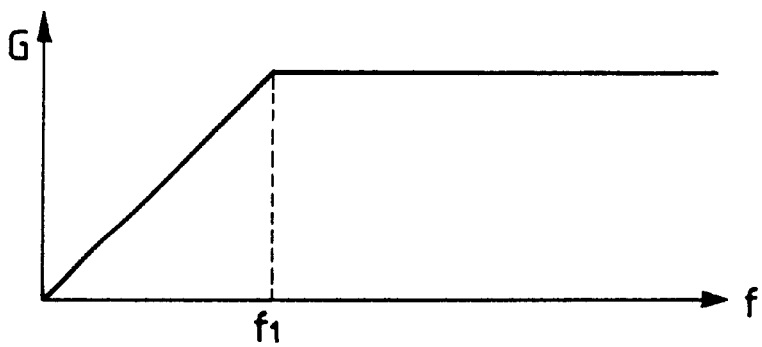
FIGS. 3A to 3D are graphs for explaining the change in characteristic when the angular displacement detection means is used as the fluctuation detection means in FIG. 1.
Figure 3B:
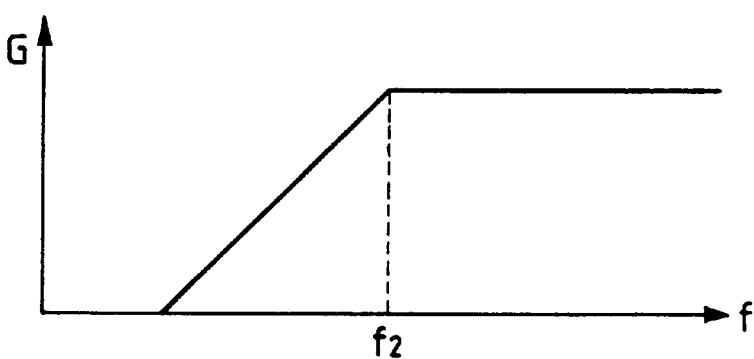

In the above-mentioned arrangement, when a signal $A_1$ increases the gain $k_1$ in response to the output "1" from the AND gate 15, the characteristic of the fluctuation detection means 16 changes from the one shown in FIG. 3A to the one shown in FIG. 3B, and cluttering of the float 53 converges earlier.

Figure 3C:
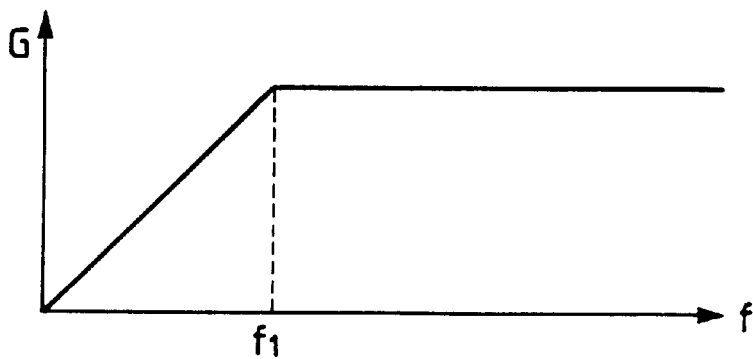
Figure 3D:
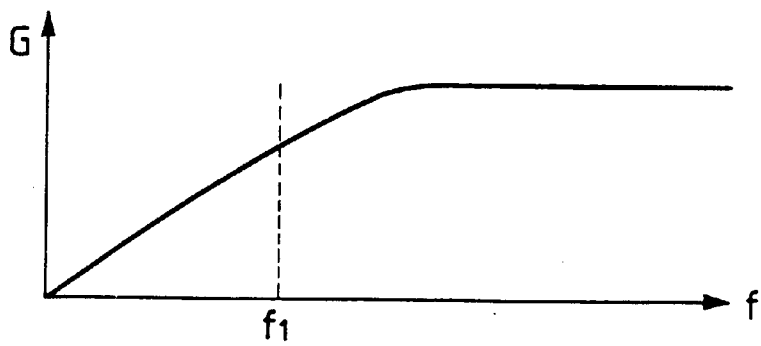

In another method, the gain $k_2$ is increased by a signal $A_2$ to provide a characteristic shown in FIG. 3D to the fluctuation detection means 16 with a characteristic shown in FIG. 3C so as to suppress cluttering by increasing the damping coefficient of the float 53. Thus, cluttering of the float 53 also converges earlier.

Therefore, even when exposure is performed immediately after a shock fluctuation is input by the film feed operation, a photographed image suffers less degradation.

As described above, with the characteristics shown in FIGS. 3B and 3D, the low-frequency components of the hand vibration frequency band are impaired. However, a high shutter speed is normally selected in the continuous photographing mode, and the low-frequency components of the hand vibration do not so degrade a photographed image at a high shutter speed (a slow hand vibration does not have a large amount if a picture is taken at a high shutter speed). Therefore, no problem is posed.

Other embodiments of the same change in characteristic as in FIG. 2 and FIGS. 3A and 3B using an angular acceleration sensor and an angular velocity sensor as the fluctuation detection means 16 will be described hereinafter with reference to FIGS. 4A to 7B.

Figure 33:
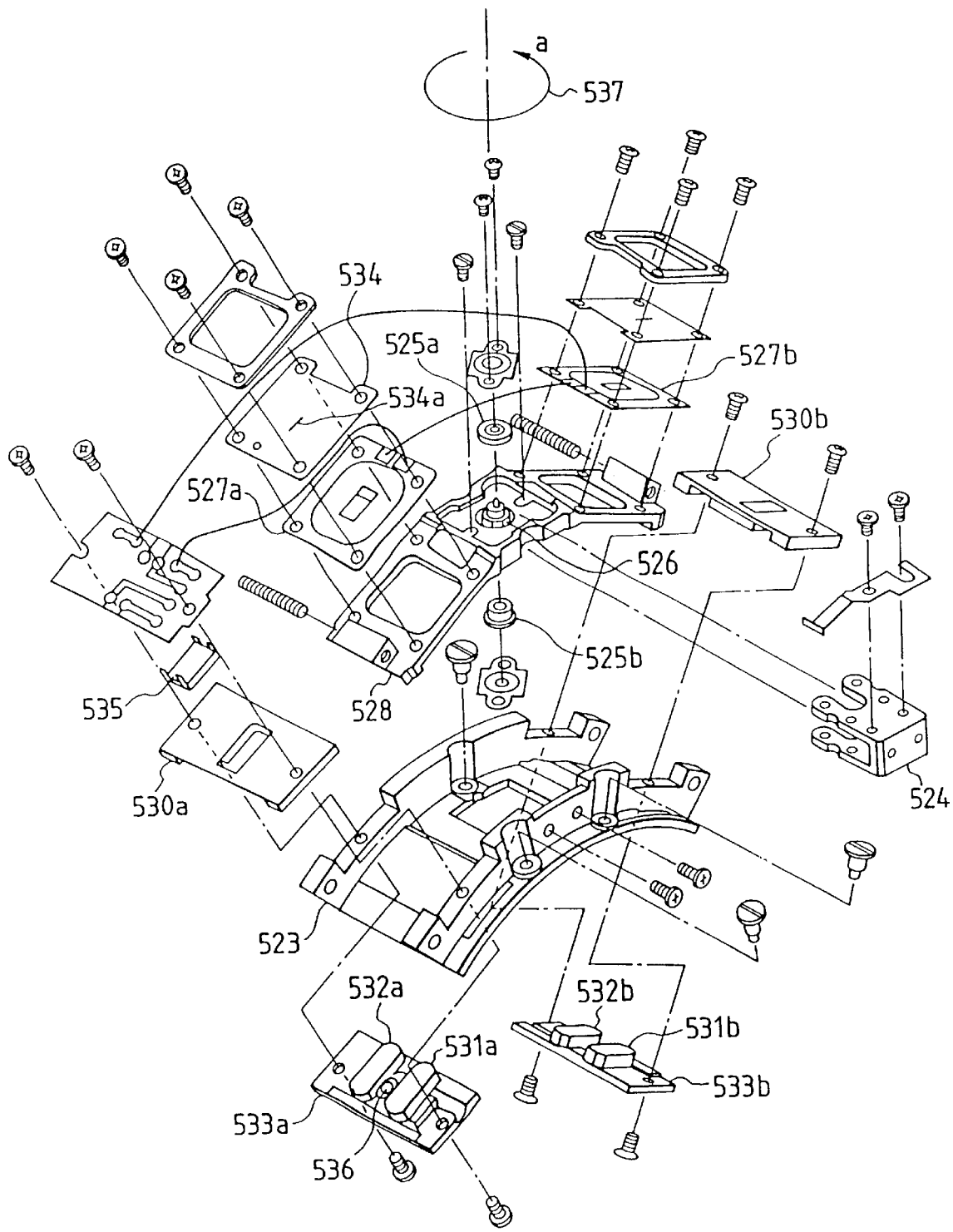
FIG. 33 is an exploded perspective view showing the arrangement of an angular acceleration sensor as one of the conventional fluctuation detection means.

A case will be described below with reference to FIGS. 4A to 7B wherein the angular acceleration sensor described above with reference to FIG. 33 is used as the fluctuation detection means 16.

Figure 4A:
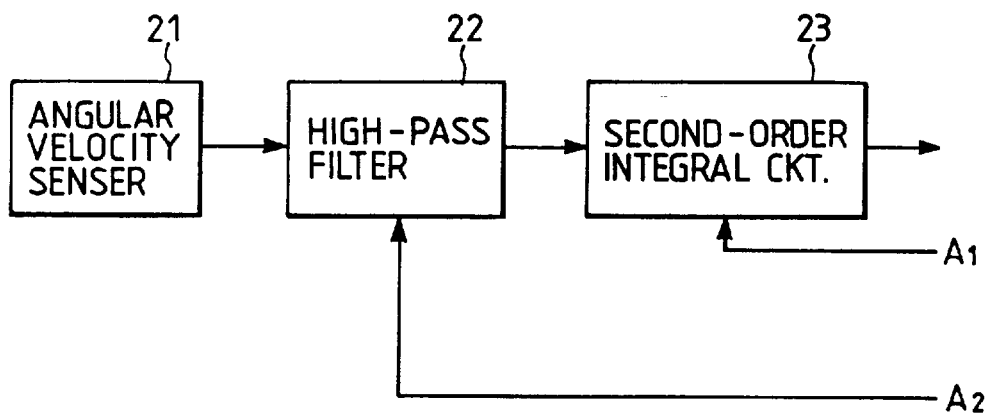
FIGS. 4A and 4B are diagrams showing circuits associated with a change in characteristic when an angular acceleration sensor is used as the fluctuation detection means in FIG. 1.

When an angular acceleration sensor 21 is used as the fluctuation detection means 16, since the seesaw 528 cannot be perfectly returned to an initial state due to the influence of a frictional force of the bearings 525a and 525b of the seesaw 528 even when control is made to return the seesaw 528 to the initial position, a high-pass filter 22 is arranged at the output side of the sensor 21, and a second-order integral circuit 23 for converting an output from the filter into a displacement signal is arranged at the output side of the filter 22, as shown in FIG. 4A. Note that the high-pass filter 22 and the second-order integral circuit 23 are arranged as components of the arrangement of the fluctuation detection means 16.

Figure 4B:
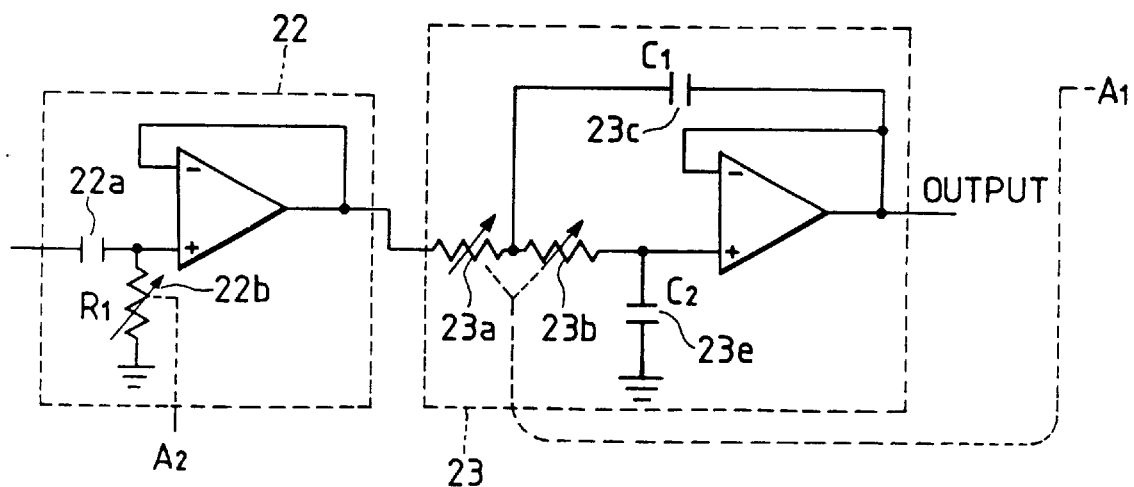
Figure 42A:
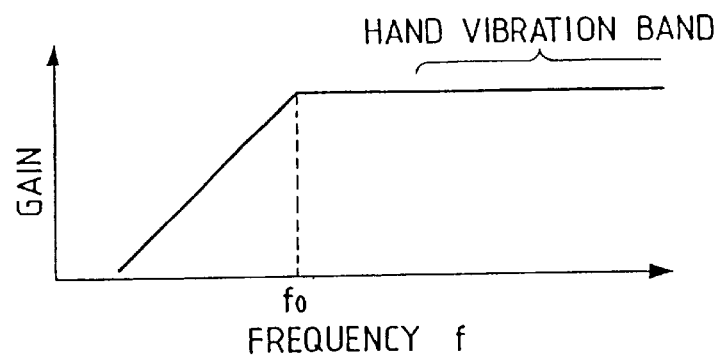
FIGS. 42A and 42B are board graphs of a DC cut filter arranged in the angular acceleration sensor shown in FIG. 33.
Figure 42B:
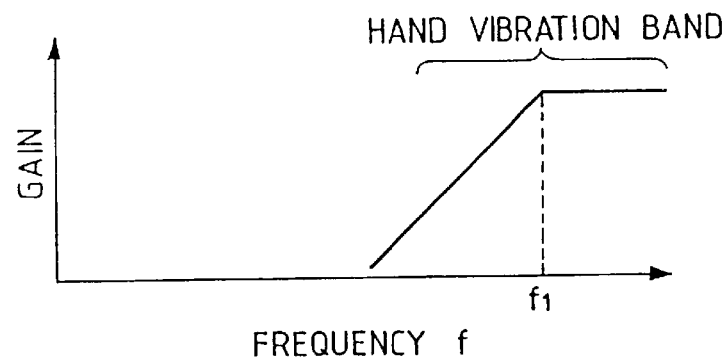

FIG. 4B shows the circuit arrangements of the high-pass filter 22 and the second-order integral circuit 23. Of a capacitor 22a and a resistor 22b constituting the high-pass filter 22, when the resistance of the resistor 22b is decreased by a signal $A_1$, the characteristic of the high-pass filter 22 changes from the one shown in FIG. 42A to the one shown in FIG. 42B.

Figure 43A:
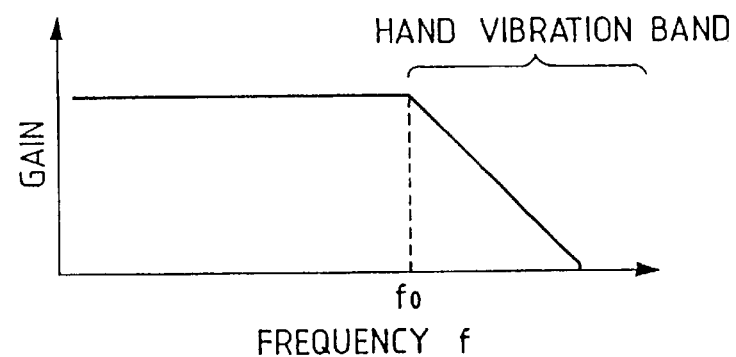
FIGS. 43A and 43B are board graphs of a second-order integral circuit arranged in the angular acceleration sensor shown in FIG. 33.
Figure 43B:
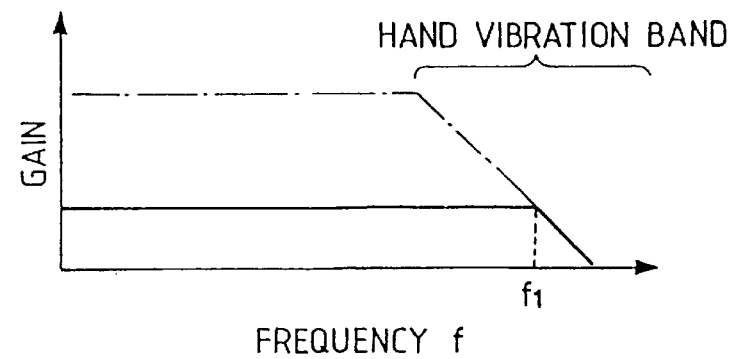

Of resistors 23a and 23b (having the same resistance) and capacitors 23c and 23e (having the same capacitance) constituting the second-order integral circuit 23, when the resistances of the resistors 23a and 23b are decreased by a signal $A_2$, the characteristic of the second-order integral circuit 23 changes from the one shown in FIG. 43A to the one shown in FIG. 43B.

Figure 5A:
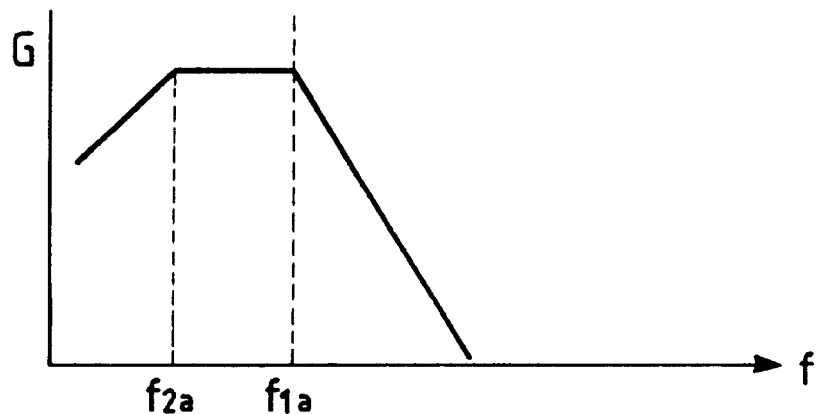
FIGS. 5A and 5B are graphs for explaining the change in characteristic when the angular acceleration sensor shown in FIGS. 4A and 4B is used.
Figure 5B:
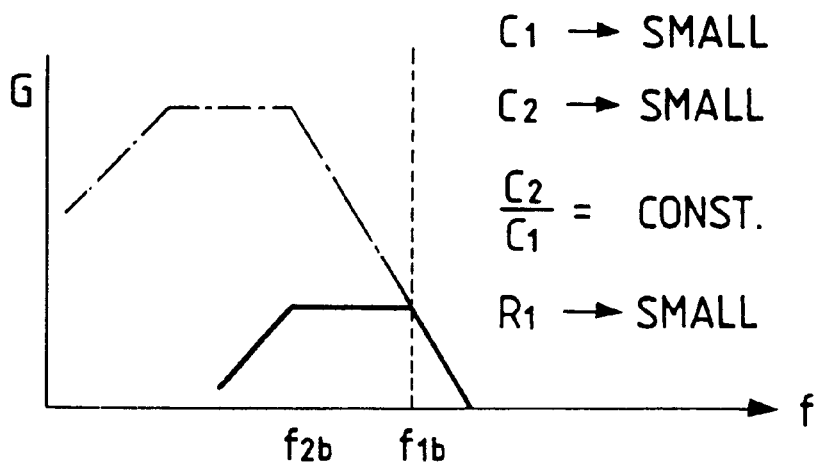

FIG. 5A shows the synthesized characteristic of the high-pass filter 22 and the second-order integral circuit 23 obtained when the time constant is large. When the resistances of the resistors 22b, 23a, and 23b are decreased to decrease the time constant, the synthesized characteristic of these circuits is changed to the one shown in FIG. 5B. With this characteristic, a DC component can be removed earlier, and an error caused by low-frequency components can be reduced as compared to the characteristic for a large time constant, which is indicated by an alternate long and short dashed curve.

More specifically, an error caused by a shock signal input no longer influences the photographing operation. Of course, with the characteristic shown in FIG. 5B, since low-frequency components of a hand vibration are also impaired, image blur precision deteriorates. However, such deterioration is negligible at a high shutter speed like in the continuous photographing mode.

Figure 36:
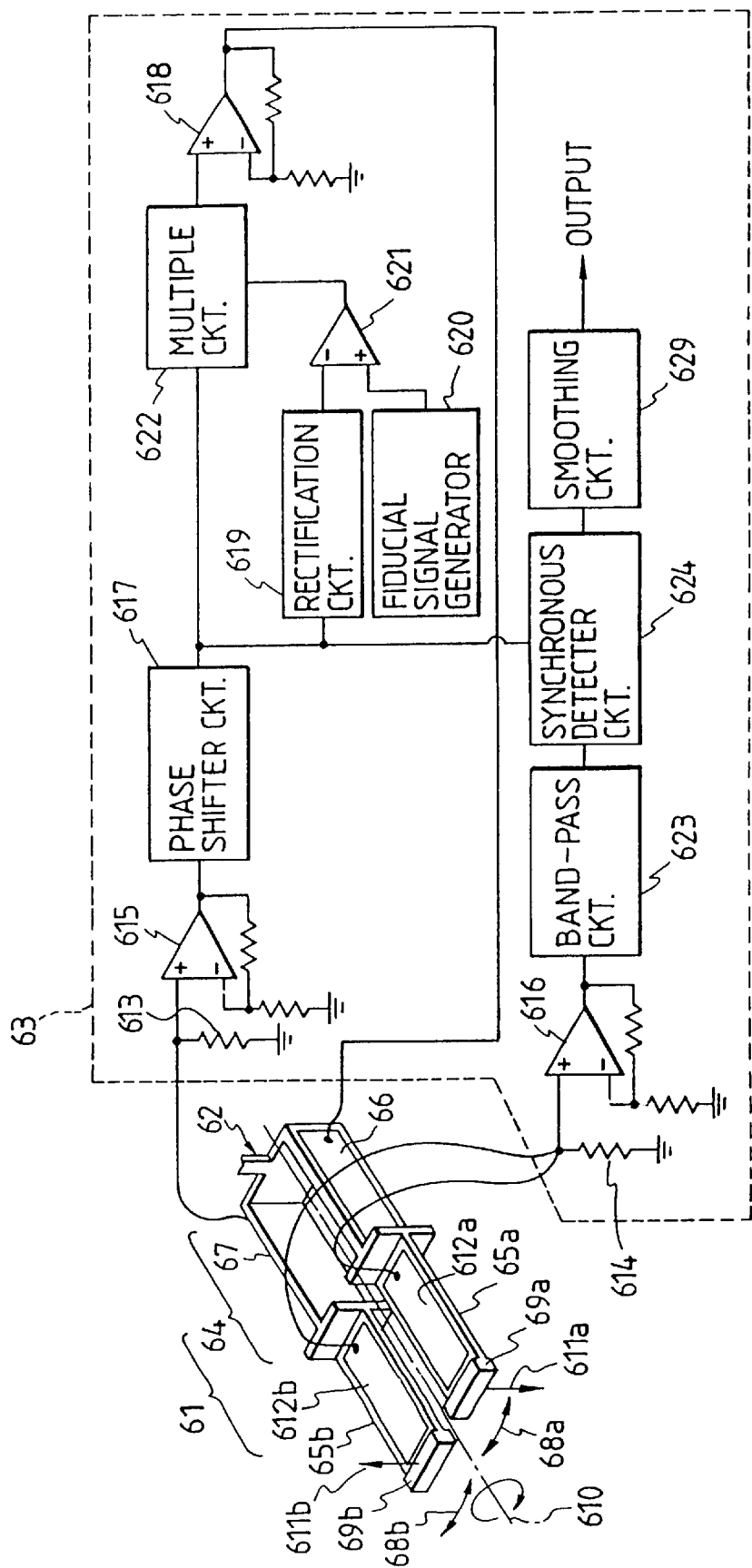
FIG. 36 is a diagram showing a vibration gyro as an angular velocity sensor as one of the conventional fluctuation detection means.
Figure 37A:
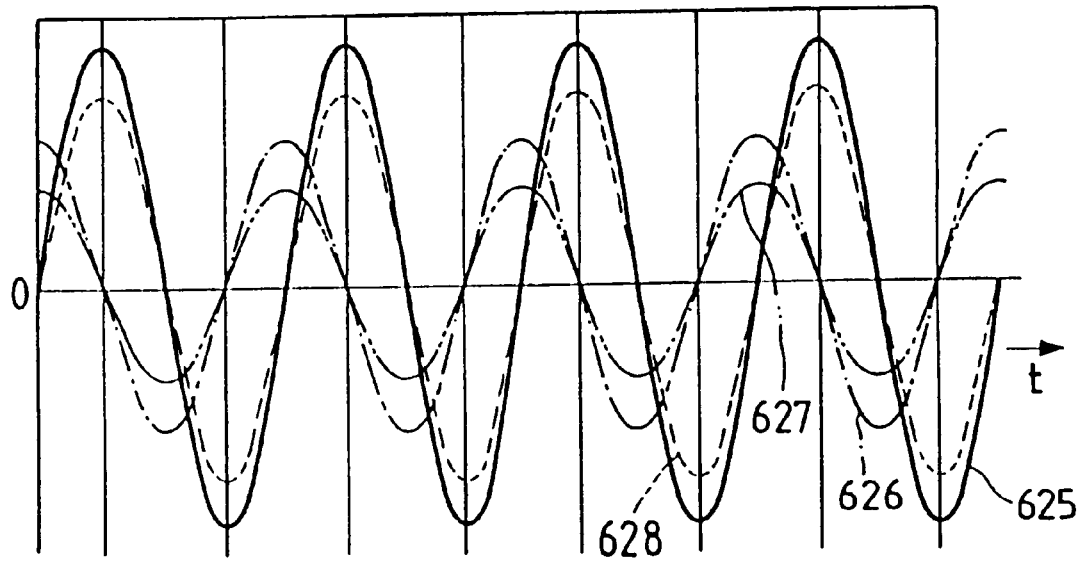
FIGS. 37A and 37B are graphs showing output waveforms of the respective units of the vibration gyro shown in FIG. 36.
Figure 37B:
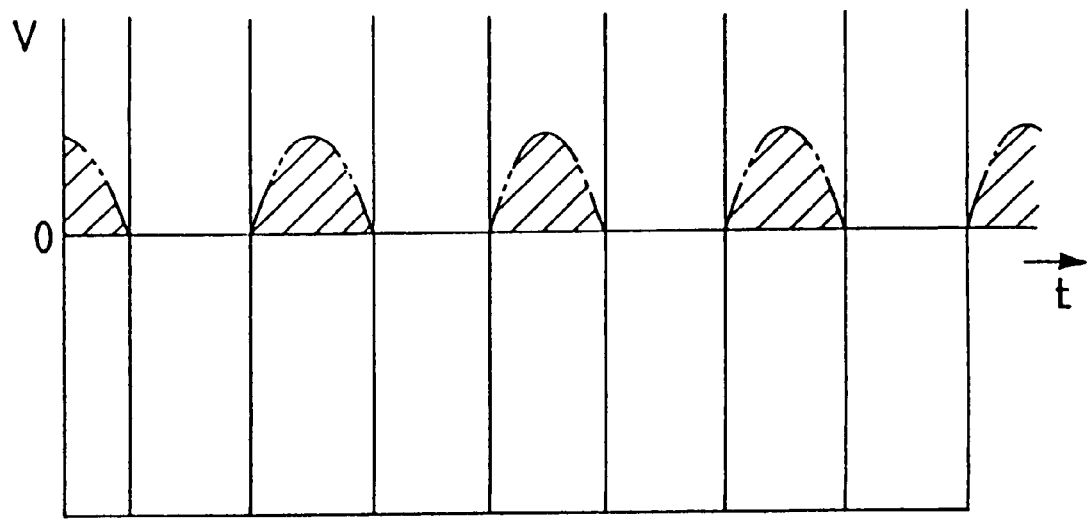
Figure 38:
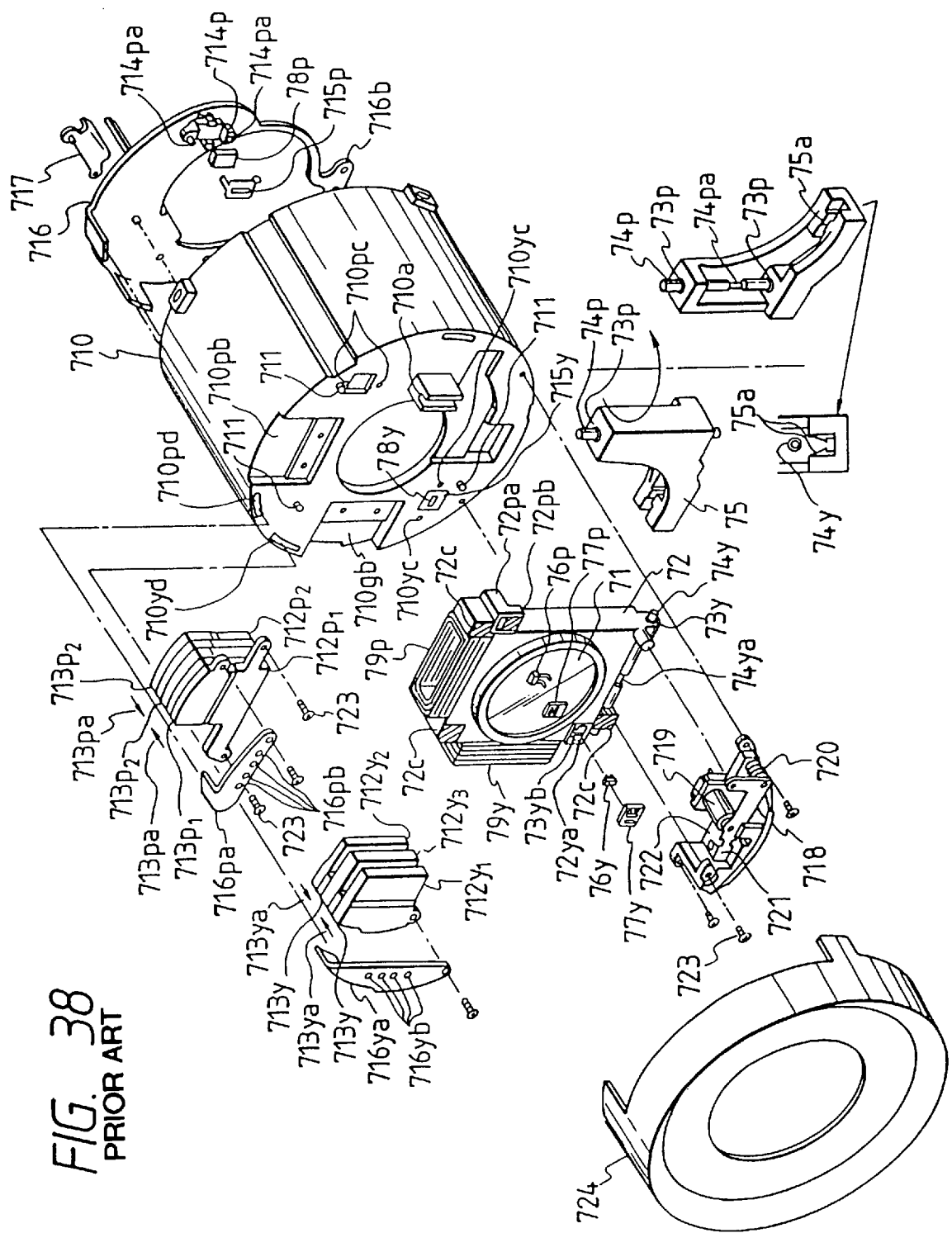
FIG. 38 is an exploded perspective view showing the arrangement of a conventional correction optical means.
Figure 39:
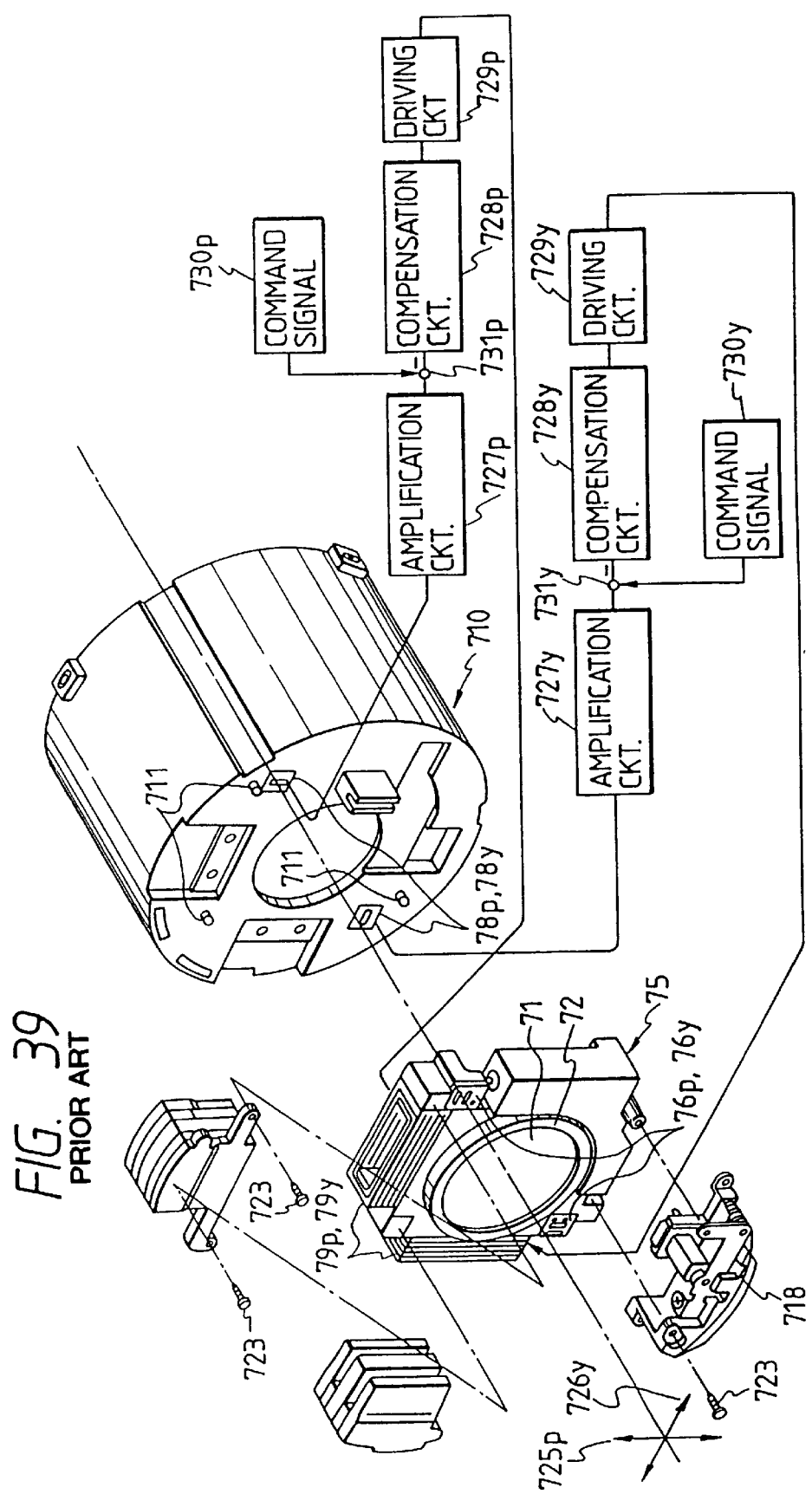
FIG. 39 is a diagram showing the arrangement of the conventional correction optical means and its driving means.
Figure 40:
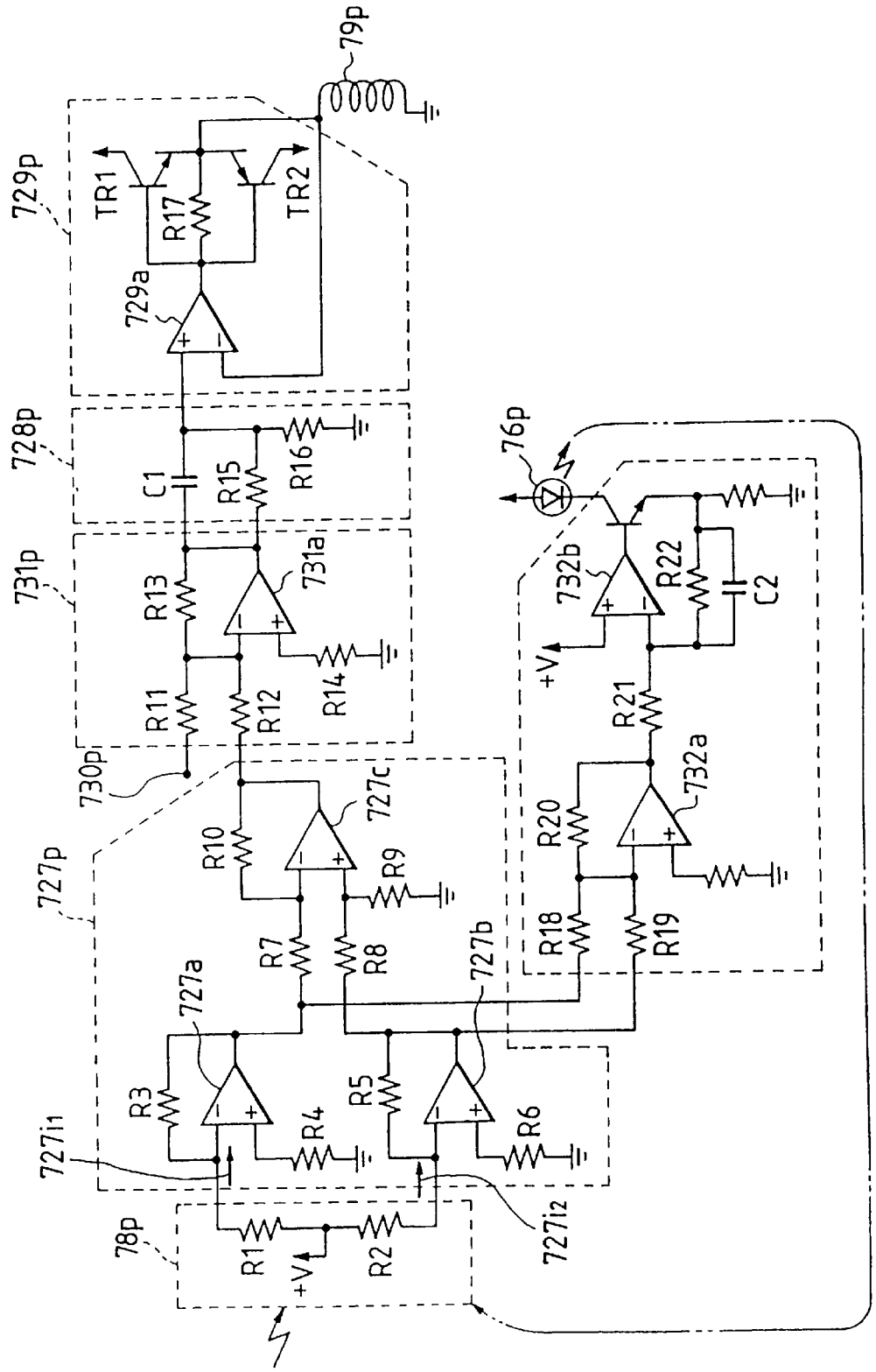
FIG. 40 is a circuit diagram showing in detail the electrical arrangement of the driving means and the like shown in FIG. 39.
Figure 41A:
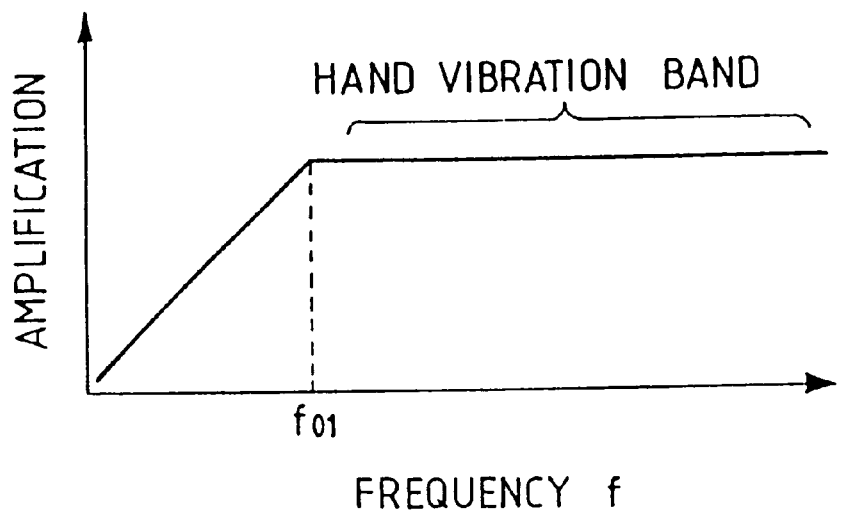
FIGS. 41A and 41B are board graphs when the angular displacement detection means shown in FIG. 28 has large and small time constants, respectively.
Figure 41B:
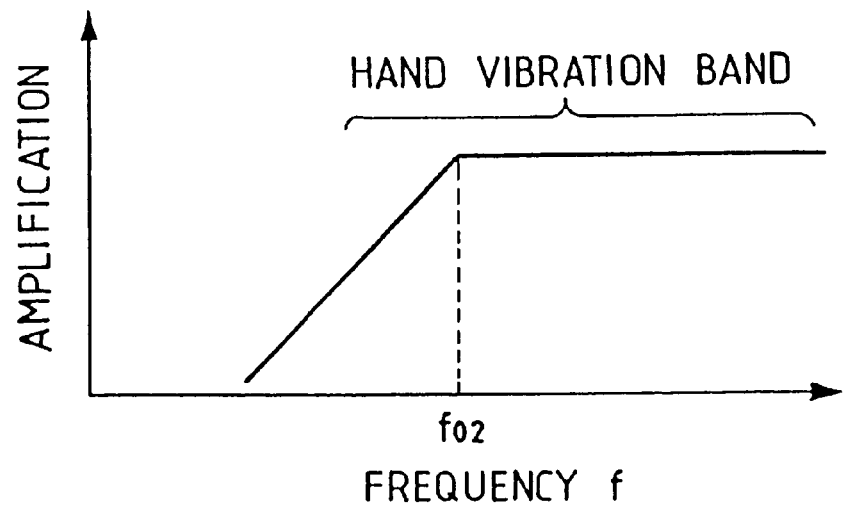

A case will be described below with reference to FIGS. 6A to 7B wherein an angular velocity sensor such as the vibration gyro described above with reference to FIG. 36 is used as the fluctuation detection means 16.

Figure 6A:
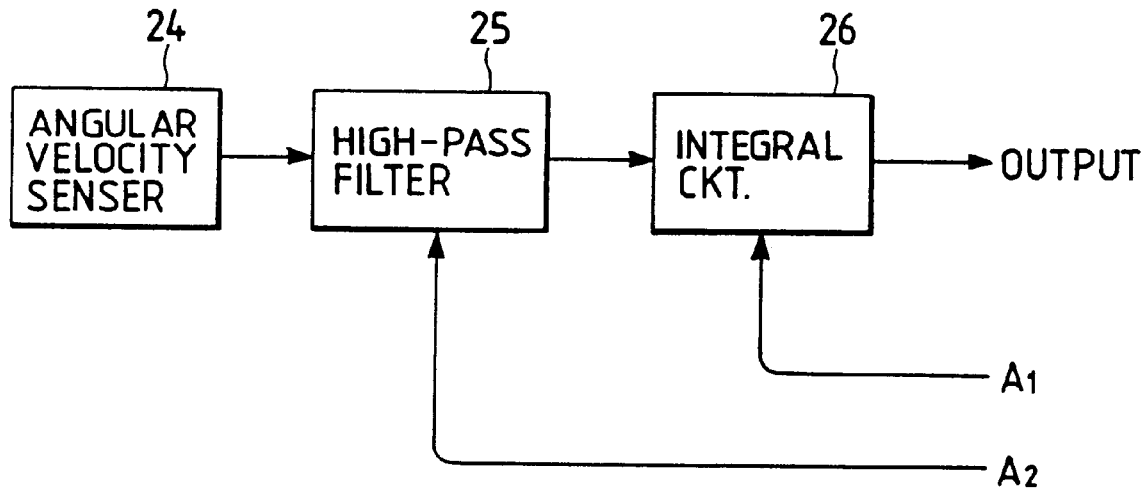
FIGS. 6A and 6B are diagrams showing circuit arrangements associated with a change in characteristic when an angular velocity sensor is used as the fluctuation detection means in FIG. 1.

When an angular velocity sensor 24 is used as the fluctuation detection means 16, a high-pass filter 25 is arranged at the output side of the sensor 24 so as to cut a DC component, and an integral circuit 26 for converting the output from the filter into a displacement signal is arranged at the output side of the filter 25, as shown in FIG. 6A. Note that the high-pass filter 25 and the integral circuit 26 are arranged as components of the arrangement of the fluctuation detection means 16.

Figure 6B:
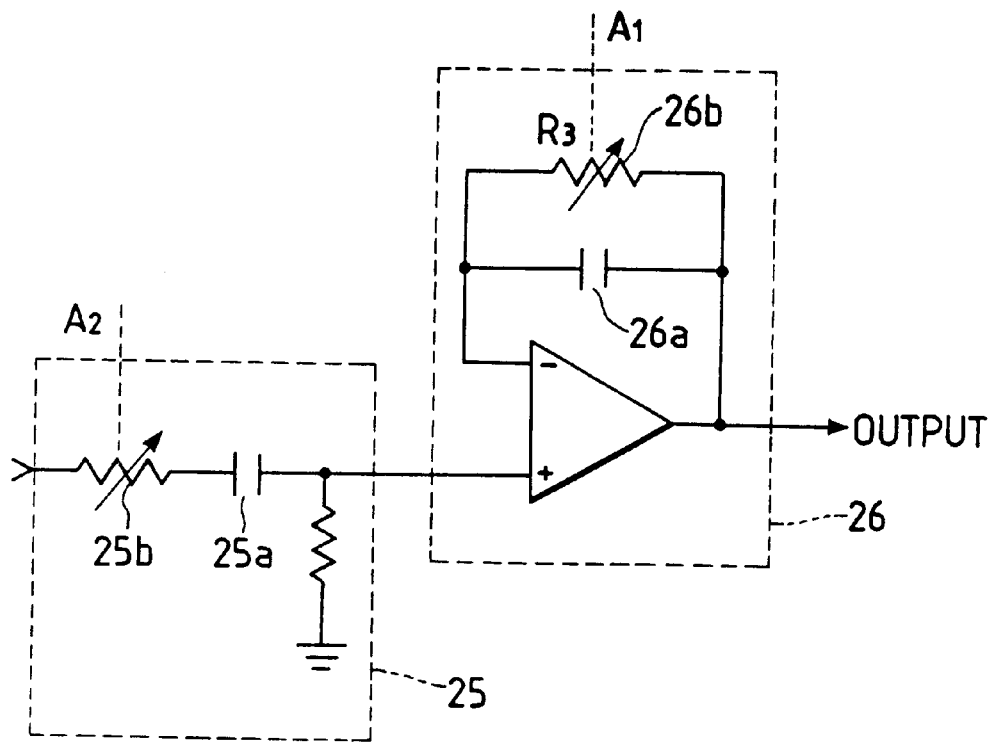
Figure 44A:
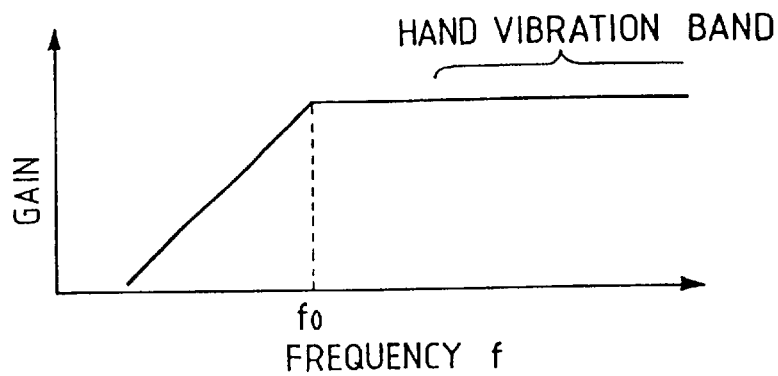
FIGS. 44A and 44B are board graphs of a DC cut filter arranged in the vibration gyro shown in FIG. 36.
Figure 44B:
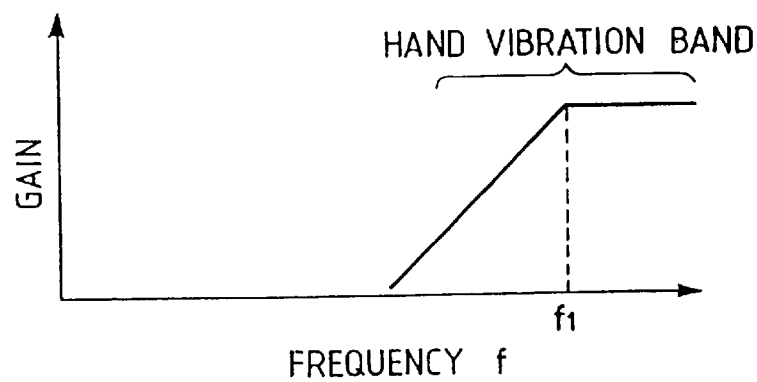

FIG. 6B shows the circuit arrangements of the high-pass filter 25 and the integral circuit 26. Of a capacitor 25a and a resistor 25b constituting the high-pass filter 25, when the resistance of the resistor 25b is decreased by a signal $A_2$, the characteristic of the high-pass filter 25 changes from the one shown in FIG. 44A to the one shown in FIG. 44B.

Figure 45A:
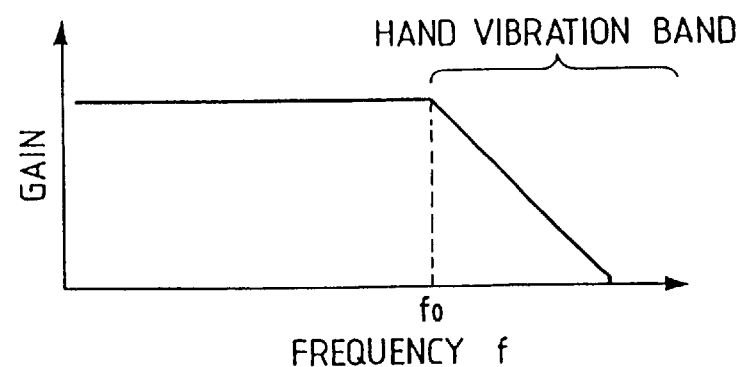
FIGS. 45A and 45B are board graphs of an integral circuit arranged in the vibration gyro shown in FIG. 36.
Figure 45B:
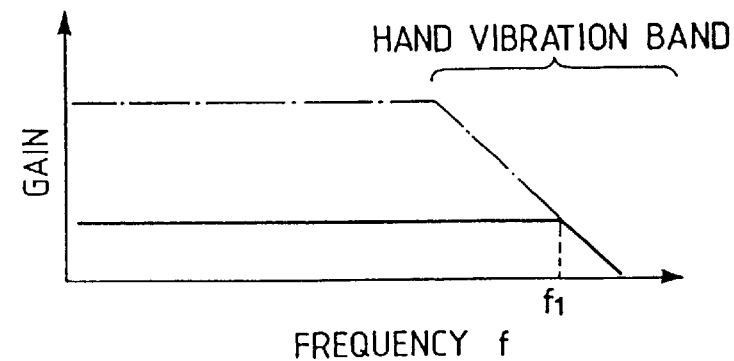

Of a resistor 26b and a capacitor 26a constituting the integral circuit 26, when the resistance of the resistor 26b is decreased by a signal $A_1$, the characteristic of the integral circuit 26 changes from the one shown in FIG. 45A to the one shown in FIG. 45B.

Figure 7A:
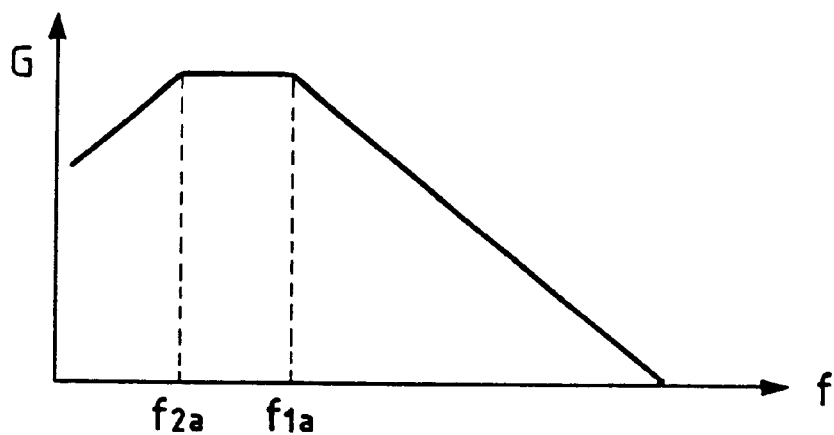
FIGS. 7A and 7B are graphs for explaining the change in characteristic when the angular velocity sensor shown in FIGS. 6A and 6B is used.
Figure 7B:
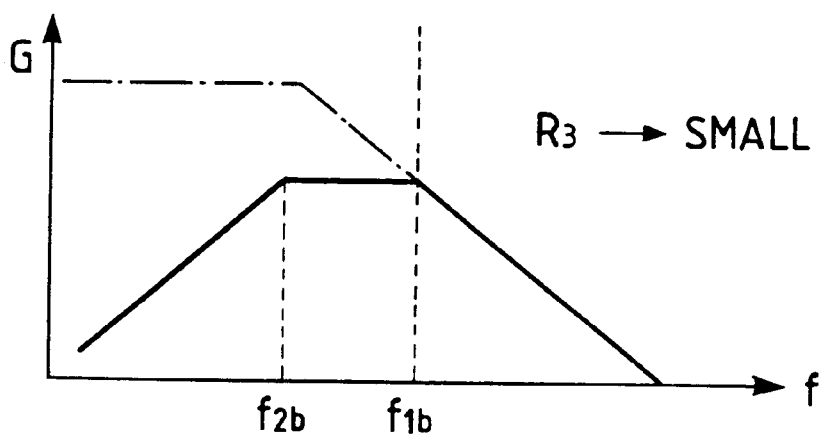

FIG. 7A shows the synthesized characteristic of the high-pass filter 25 and the integral circuit 26 obtained when the time constant is large. When the resistances of the resistors 25b and 26b are decreased to decrease the time constant, the synthesized characteristic of these circuits is changed to the one shown in FIG. 7B. With this characteristic, a DC component can be removed earlier, and an error caused by low-frequency components can be reduced as compared to the characteristic for a large time constant, which is indicated by an alternate long and short dashed curve.

More specifically, an error caused by a shock signal input no longer influences the photographing operation. Of course, with the characteristic shown in FIG. 7B, since low-frequency components of a hand vibration are also impaired, image blur precision deteriorates. However, such deterioration is negligible at a high shutter speed like in the continuous photographing mode.

Therefore, when the signals $A_1$ and $A_2$ decrease the resistances of the resistors 22b, 23a, and 23b (FIGS. 4A and 4B) or the resistors 25b and 26b (FIGS. 6A and 6B) in response to the output from the AND gate 15 so as to decrease the time constants of the high-pass filter 22 and the second-order integral circuit 23 or the high-pass filter 25 and the integral circuit 26, the error output amount of the fluctuation detection means 16 caused by a shock fluctuation input is reduced, and a satisfactory photographing operation can be attained.

In FIG. 1, the output from the release button 14 is also input to the AND gate 15. For this reason, only when the release button 14 is depressed (output "1"), the time constant of the fluctuation detection means 16 is decreased. When the depression operation of the release button 14 is released after the end of a photographing operation, the fluctuation detection means 16 is restored to an original characteristic with a large time constant to prepare for the next continuous photographing operation (the time constant of the fluctuation detection means is large until the first frame is photographed).

When the switch (not shown) for forcibly stopping the hand vibration detection function is operated (it is operated when a user does not want deterioration of hand vibration detection precision), since the output from the stop function circuit 12 is inverted from "1" to "0", the output from the AND gate 15 is inverted to "0" irrespective of the state of the release button 14, and the characteristic of the fluctuation detection means 16 remains the same (the characteristic shown in FIG. 3A or 3C).

(Second Embodiment)

Figure 8:
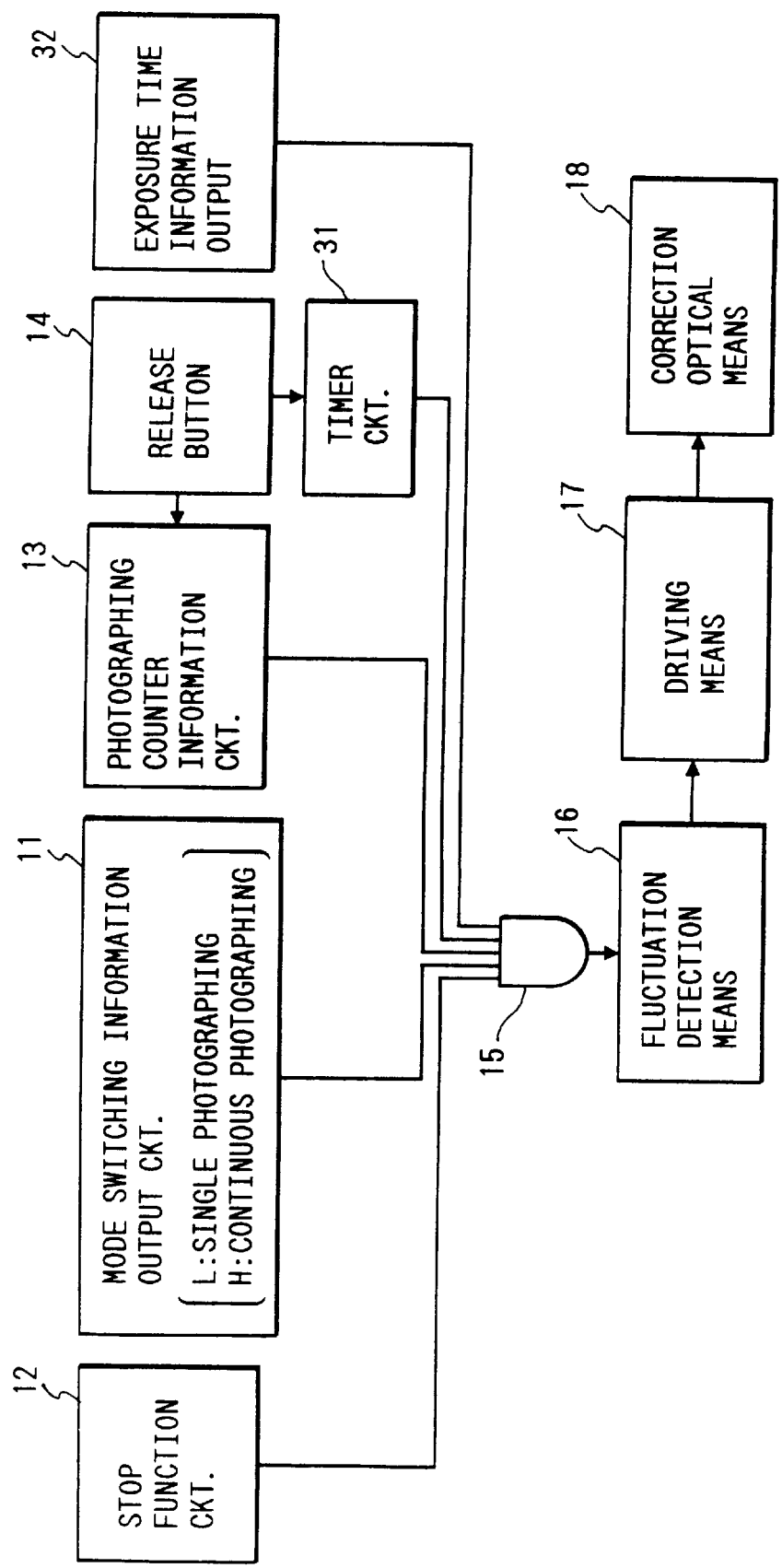
FIG. 8 is a block diagram showing the arrangement of main part of a camera according to the second embodiment of the present invention.

FIG. 8 is a block diagram showing an arrangement of main part of a camera according to the second embodiment of the present invention, and the same reference numerals in FIG. 8 denote the same parts as in FIG. 1.

Differences from the arrangement in FIG. 1 are that the output from the release button 14 is input to the AND gate 15 via a timer circuit 31, and an output from an exposure time information output circuit 32 for outputting information corresponding to an exposure time to a film is input to the AND gate 15.

The timer circuit 31 outputs "1" to the AND gate 15 in response to the depression of the release button 14, and outputs "0" a predetermined period of time after the depression operation of the release button 14 is released. The exposure time information output circuit 32 outputs "0" to the AND gate 15 when the exposure time is equal to or longer than a predetermined time (the exposure time can be detected in advance by an automatic exposure mechanism or an operation of a shutter speed setting dial), and otherwise, outputs "1".

In this embodiment, the continuous photographing mode includes a low-speed continuous photographing mode of 1 frame per second, and a high-speed continuous photographing mode of 5 frames per second. Only when the high-speed continuous photographing mode is selected, the mode switching information output circuit 11 outputs "1" to the AND gate 15.

In the above arrangement, when the exposure time is equal to or longer than a predetermined time (e.g., 1/15 msec), since the exposure time information output circuit 32 outputs "0" to the AND gate 15, the AND gate 15 also outputs "0", and even when the high-speed continuous photographing mode is selected, the characteristic of the fluctuation detection means 16 is not changed.

As described above, when the time constant of the fluctuation detection means 16 is decreased, hand vibration detection precision is impaired. However, in the high-speed continuous photographing mode, since the shutter speed is high, and a decrease in image blur prevention precision caused by an error output of the fluctuation detection means 16 due to a shock input is larger than a decrease in image blur prevention precision caused by a decrease in hand vibration detection precision, the time constant of the fluctuation detection means 16 is decreased.

However, when the exposure time becomes long, a decrease in image blur prevention precision caused by a decrease in hand vibration detection precision may become larger than a decease in image blur prevention precision caused by an error output.

In this embodiment, as described above, since the output from the exposure time information output circuit 32 for outputting information corresponding to an exposure time is set to be "0" in such a state, the output from the AND gate 15 is also set to be "0" so as to inhibit a change in characteristic of the fluctuation detection means 16, and the time constant remains large.

In this embodiment, the following modification is also made.

In FIG. 1, when the depression operation of the release button 14 is released, the time constant of the fluctuation detection means 16 is increased (restored to the original value). However, even when the depression operation of the release button 14 is released, the film feed operation may continue, and the fluctuation detection means 16 may generate an error output due to a shock fluctuation input of the film feed operation. Since no photographing operation is performed after the film feed operation, no problem is posed even if a shock fluctuation is input after the film feed operation.

Thus, in FIG. 8, the output from the timer circuit 31 is not changed to "0" until the timer circuit 31 counts a predetermined period of time after the depression operation of the release button 14 is released, thereby inhibiting the time constant of the fluctuation detection means 16 from being restored. Therefore, a shock fluctuation input by the film feed operation does not seriously influence the fluctuation detection means 16.

With this arrangement, the camera can prepare for the next photographing operation immediately after continuous photographing operations.

(Third Embodiment)

FIGS. 9A to 10B show the arrangement of main part of a camera according to the third embodiment of the present invention, and the like, and the same reference numerals in this embodiment denote the same parts as in the first and second embodiments.

In the first and second embodiments, a countermeasure against a shock fluctuation input caused by a film feed operation is taken for the fluctuation detection means 16. However, a shock fluctuation input is not limited to the film feed operation. For example, a shock upon driving of a shutter or a shock upon driving of a quick return mirror in a single-lens reflex camera adversely influences the fluctuation detection means 16.

Figure 9A:
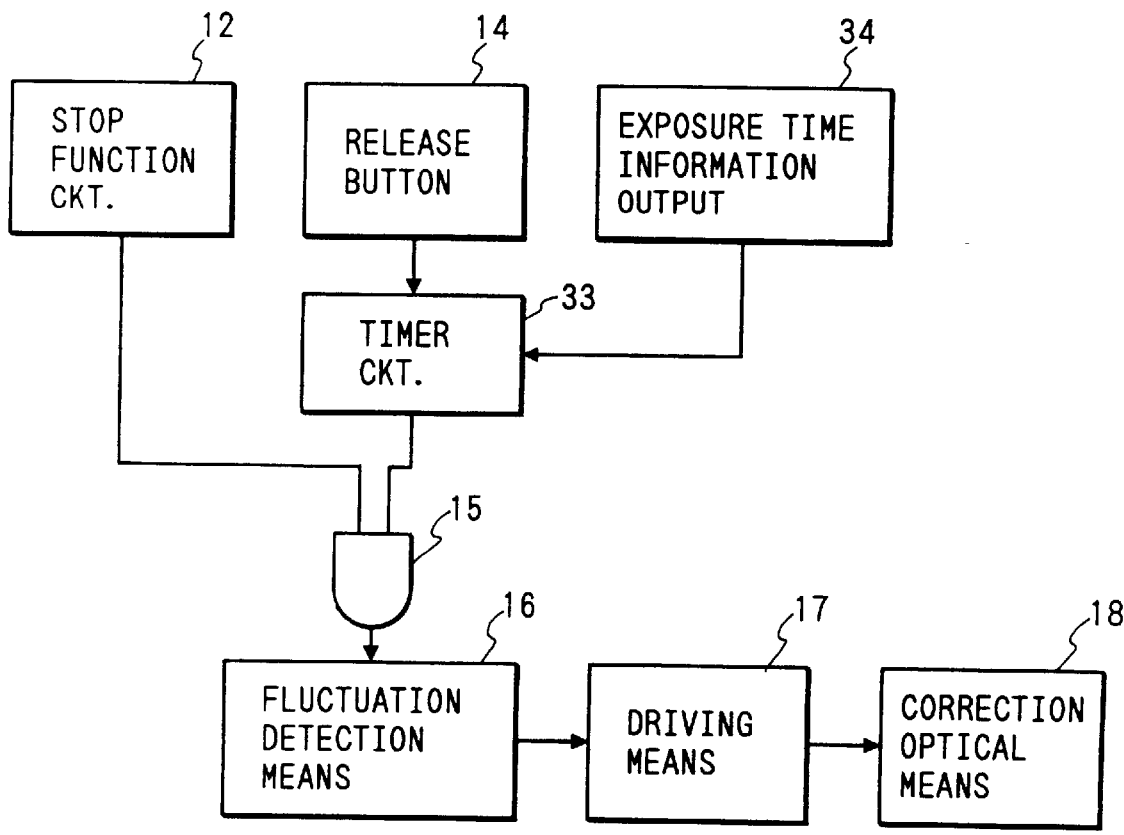
FIGS. 9A and 9B are respectively a block diagram and a graph for explaining circuit blocks of main part of a camera according to the third embodiment of the present invention, and its change in characteristic.

Thus, in the third embodiment, a countermeasure against a shock input is taken not only in the continuous photographing mode but also in the single photographing mode to allow a more satisfactory photographing operation. FIG. 9A shows a circuit arrangement for changing the characteristic of the fluctuation detection means 16 by predicting a shock input upon driving of a quick return mirror or upon driving of a shutter in response to the depression operation of the release button 14.

Figure 9B:
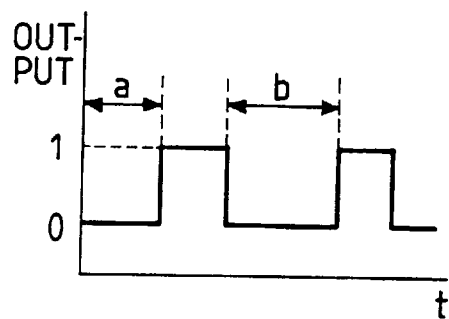

Referring to FIG. 9A, a timer circuit 33 generates an output shown in FIG. 9B in response to the depression operation of the release button 14, and exposure time information from an exposure time information output circuit 34. More specifically, the timer circuit 33 outputs "1" to the AND gate 15 for a predetermined time after an elapse of a delay time a from the depression operation of the release button 14 (after an output "1" is input to the timer circuit), and thereafter, outputs "1" to the AND gate 15 for a predetermined period of time again after an elapse of a delay time b (exposure time+shutter traveling time).

The delay times of the timer circuit 33 will be described below with reference to FIGS. 10A and 10B.

Figure 10A:
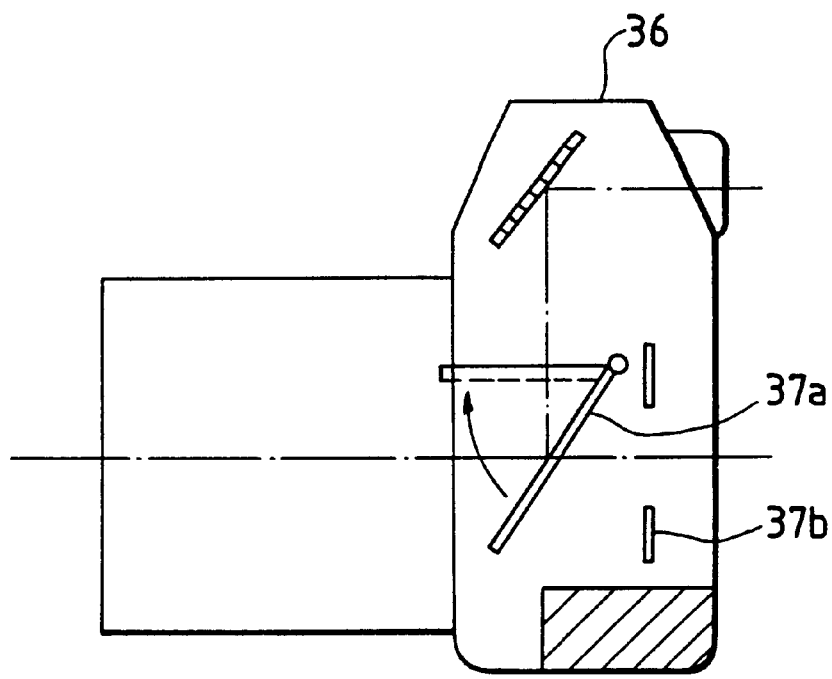
FIGS. 10A and 10B are respectively a sectional view and a graph for explaining a section of main part of the camera according to the third embodiment of the present invention, and its change in characteristic.

In a sectional view of a camera body 36 in FIG. 10A, when the release button (not shown in FIG. 10A) is depressed, a quick return mirror 37a is flipped up, and then, a forward shutter travels.

Figure 10B:
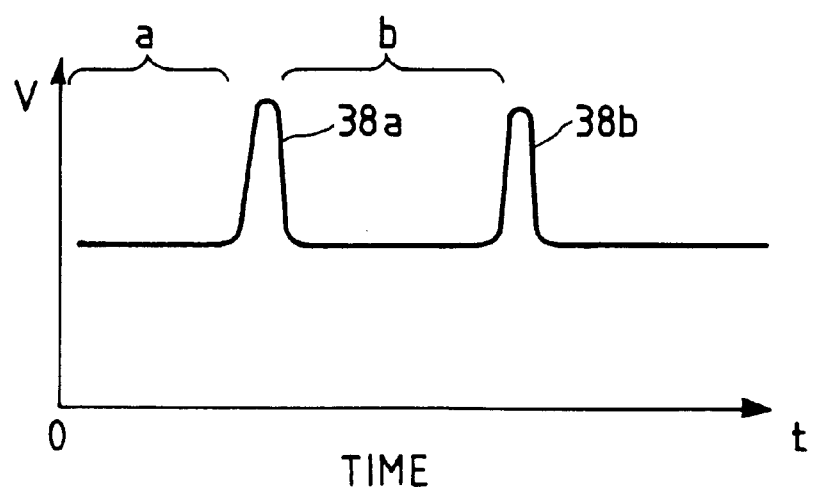

A shock fluctuation 38a in FIG. 10B, which is input at that time, is generated by traveling of the forward shutter after an elapse of a delay time a (mainly including an aperture driving time, and a shutter traveling time) from the depression operation (time 0) of the release button 14. After the end of exposure, a rearward shutter travels, and the quick return mirror 37a is returned to an initial position. A shock fluctuation 38b in FIG. 10B, which is input at that time, is generated by traveling of the rearward shutter after an elapse of a delay time b (mainly including an exposure time and a traveling time of the quick return mirror 37a) after convergence of the first shock fluctuation input (38a).

The timer circuit 33 outputs "1" to the AND gate 15 only for a generation time of the shock fluctuation 38a after an elapse of the delay time a which includes an expected aperture driving time and an expected traveling time of the quick return mirror 37a, and also outputs "1" to the AND gate 15 again only for a generation time of the shock fluctuation 38b after an elapse of the delay time b which can be calculated based on exposure time information from the exposure time information output circuit 34 and a shutter traveling time which is a known value.

Therefore, since the time constant of the fluctuation detection means 16 is decreased only for the generation times of a shock generated upon flipping of the quick return mirror and a shock generated upon traveling of a shutter, an error is reduced or is controlled to converge earlier, and a satisfactory photographing operation can be attained.

During the exposure time, since the time constant of the fluctuation detection means 16 is large, the hand vibration detection precision is high, and a more satisfactory photographing operation can be attained.

(Fourth Embodiment)

In the third embodiment, a shock fluctuation input is predicted in response to an operation of the release button. However, the present invention is not limited to this. For example, the operation status of a quick return mirror may be discriminated by a means (switch) for detecting the operation of the quick return mirror, and a camera may prepare for a shock fluctuation input on the basis of the detection result. This arrangement will be described below as the fourth embodiment of the present invention.

Figure 11A:
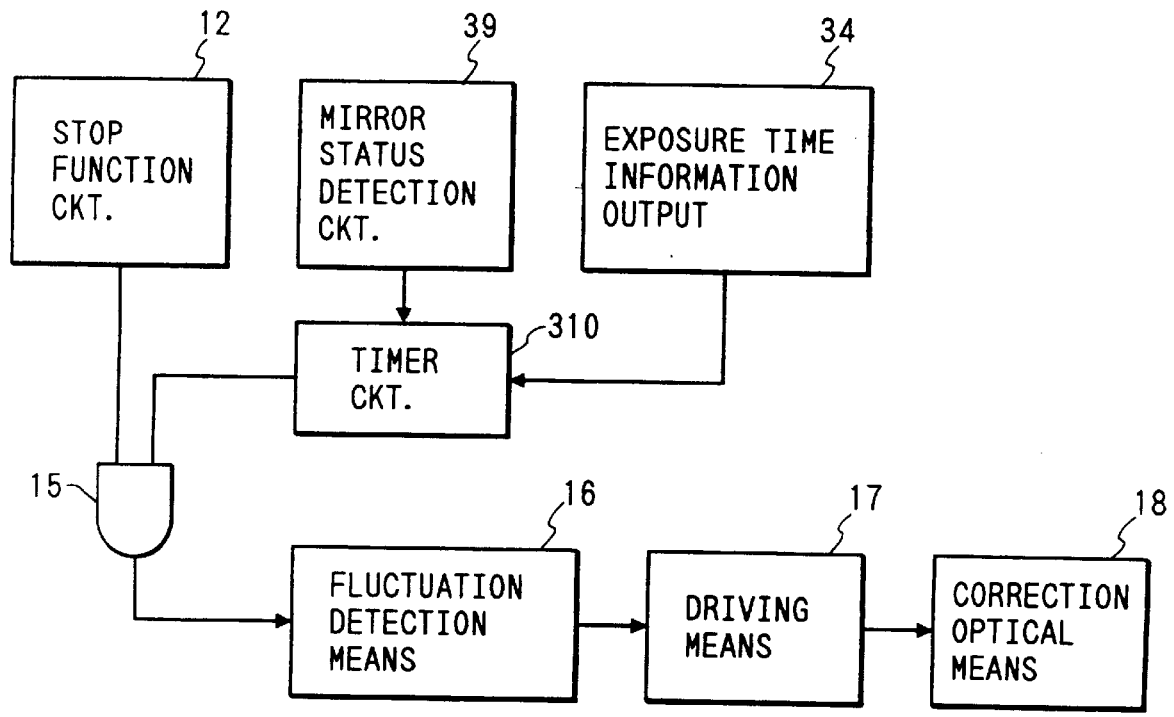
FIGS. 11A and 11B are respectively a block diagram and a graph for explaining circuit blocks of main part of a camera according to the fourth embodiment of the present invention, and its change in characteristic.
Figure 11B:
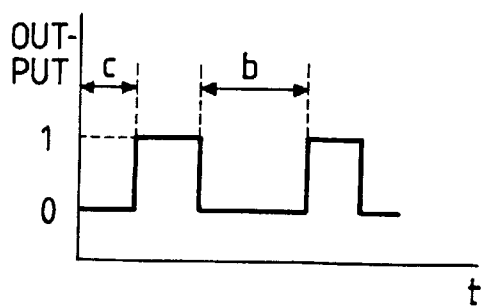

FIGS. 11A and 11B show the arrangement of main part of a camera according to the fourth embodiment of the present invention, and the like, and the same reference numerals in FIGS. 11A and 11B denote the same parts as in FIGS. 9A and 9B.

A difference between FIG. 11A and FIGS. 9A and 9B is that an output from a mirror status detection circuit 39 for detecting the operation status of a quick return mirror is input to a timer circuit 310.

The mirror status detection circuit 39 outputs "1" when the quick return mirror begins to operate. Upon reception of this output "1", the timer circuit 310 outputs "1" to the AND gate 15 for a predetermined period of time after an elapse of a delay time c, and outputs "1" to the AND gate 15 for a predetermined period of time again after an elapse of a delay time b (exposure time+shutter traveling time), as shown in FIG. 11B.

Since a delay time c of the timer circuit 310 includes only the mirror operation time of the quick return mirror, it is shorter than the delay time a in FIGS. 9A and 9B.

With this arrangement, since an indefinite time for aperture driving (the driving time varies depending on the stop-down amount of an aperture) is not included unlike in the delay time a in FIGS. 9A and 9B, shock prediction can be realized with high precision.

(Fifth Embodiment)

In each of the first to fourth embodiments described above, the time constant of the fluctuation detection means is changed by way of precaution for against a shock fluctuation input. However, since the mechanism portion (the angular displacement detection means mechanism, angular acceleration sensor, or angular velocity sensor) of the fluctuation detection means causes an error not simultaneously with a shock fluctuation input but after a slight delay time, and the time constant can be changed within a very short period of time, generation of an error may be suppressed by changing the time constant immediately after the shock fluctuation input. Thus, the time constant may be changed by extracting an output component caused by a shock fluctuation input from the output components from the fluctuation detection means. This arrangement will be described below as the fifth embodiment of the present invention.

Figure 12:
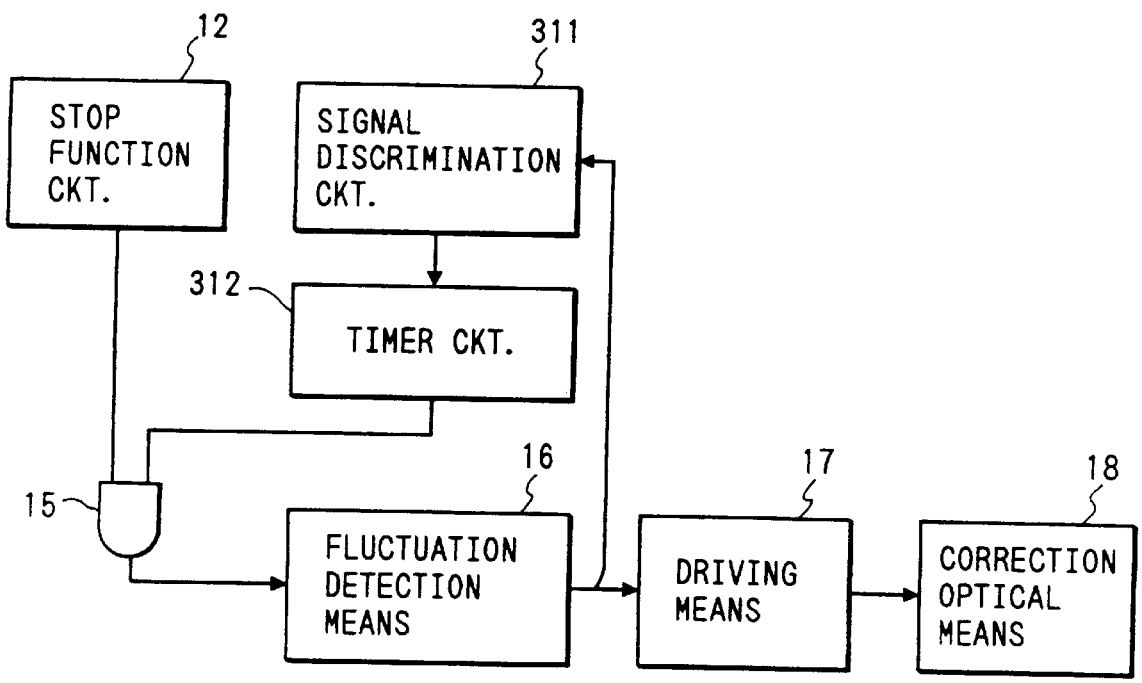
FIG. 12 is a block diagram showing the arrangement of main part of a camera according to the fifth embodiment of the present invention.

FIG. 12 is a block diagram showing the arrangement of main part of a camera according to the fifth embodiment of the present invention, and the same reference numerals in FIG. 12 denote the same parts as in FIGS. 9A and 9B and FIGS. 11A and 11B.

Referring to FIG. 12, a signal discrimination circuit 311 has a discrimination function for discriminating a shock fluctuation output component from the output from the fluctuation detection means 16, and comprises a known low-frequency high pass filter (which attenuates a low-frequency output including a hand vibration band, and allows a high-frequency output such as a shock fluctuation to pass therethrough). The signal discrimination circuit 311 outputs "1" to a timer circuit 312 when a high-frequency output is generated. Upon reception of this output "1", the timer circuit 312 outputs "1" to the AND gate 15. When the output from the signal discrimination circuit 311 is inverted to "0", the timer circuit 312 stops the output "1" to the AND gate 15 after an elapse of a short delay time (buffer).

With this arrangement, even when an unexpected shock fluctuation is input, the output from the fluctuation detection means 16 can be stabilized.

According to each of the first to fifth embodiments, since a shock fluctuation (an operation of a quick return mirror, traveling of forward and rearward shutters, or a film feed operation) input (generated) to a camera can be predicted in advance on the basis of an operation member such as a release button which is provided to the camera or an operation of a camera mechanism portion such as a mirror driving lever, the characteristic of the fluctuation detection means is changed (the time constant is decreased or the spring force (viscosity) is increased) during a shock fluctuation input period or immediately by detecting the operation of the operation member or the camera mechanism portion such as the mirror driving lever. For this reason, an error generated by the fluctuation detection means due to the shock fluctuation input can be prevented from remaining until an exposure operation is performed, and a satisfactory photographing operation free from a decrease in fluctuation prevention precision can be attained.

As described above, according to each of the embodiments of the present invention, a camera comprises a characteristic control means for, when generation of a shock fluctuation in a camera is expected, changing the characteristic of the fluctuation detection means.

Thus, since a shock fluctuation generated in a camera can be predicted from, e.g., an operation start timing of an operation member such as a release button, when generation of the shock fluctuation is expected, the characteristic of the fluctuation detection means is changed by changing the time constant or viscosity of the fluctuation detection means.

Also, a camera comprises a characteristic control means for changing the fluctuation detection means upon detection of generation of a shock fluctuation.

Thus, when it is detected that a shock fluctuation is generated in the camera upon operation of, e.g., a quick return mirror, the characteristic of the fluctuation detection means is changed by changing the time constant or viscosity of the fluctuation detection means.

Therefore, an output error generated by the fluctuation detection means upon generation of a shock fluctuation can be prevented from remaining until an exposure operation is performed, and image blur prevention precision in the exposure operation can be improved.

(Sixth Embodiment)

Figure 13:
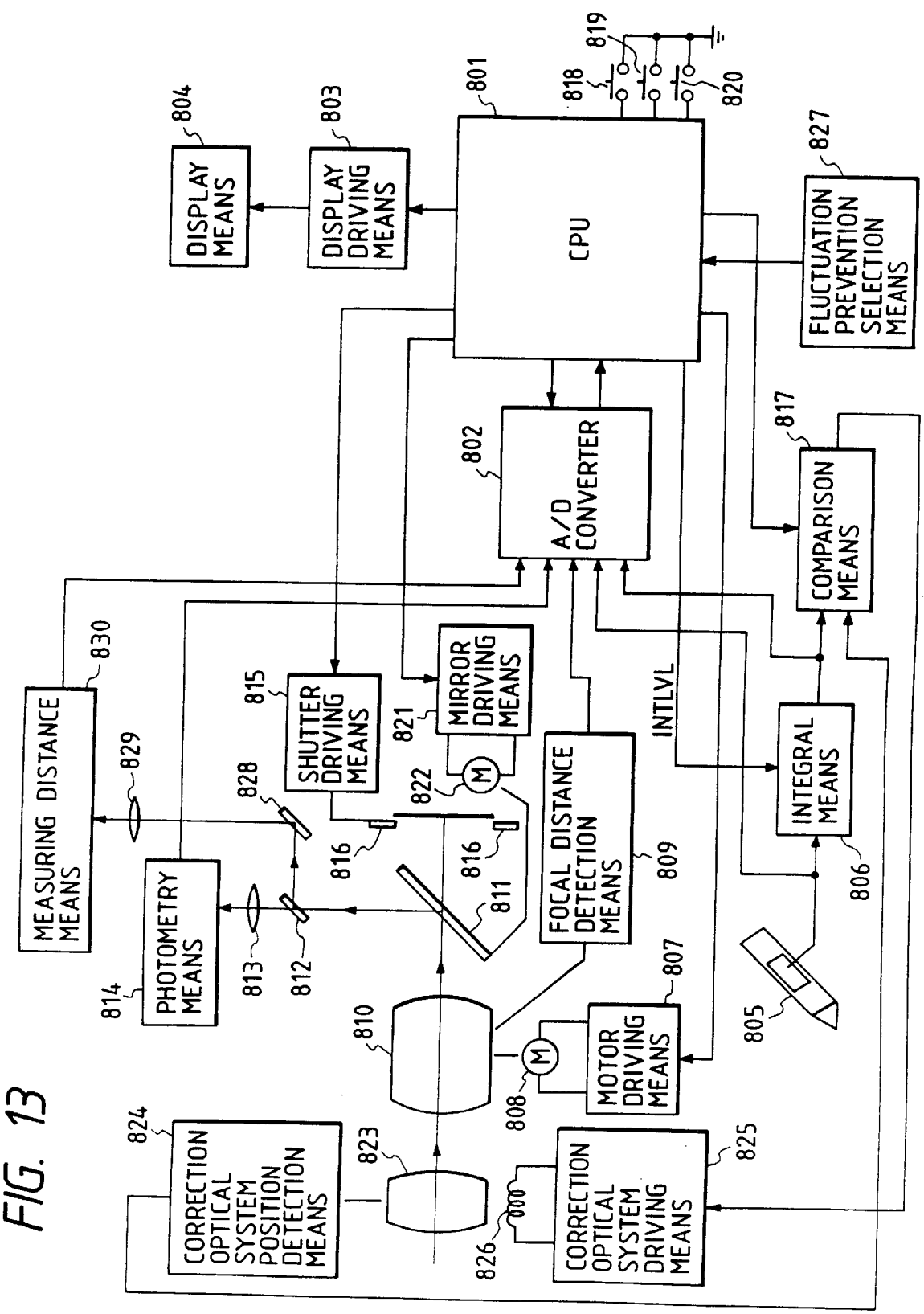
FIG. 13 is a block diagram showing the total arrangement of an image blur prevention apparatus according to the sixth embodiment of the present invention.
Figure 14:
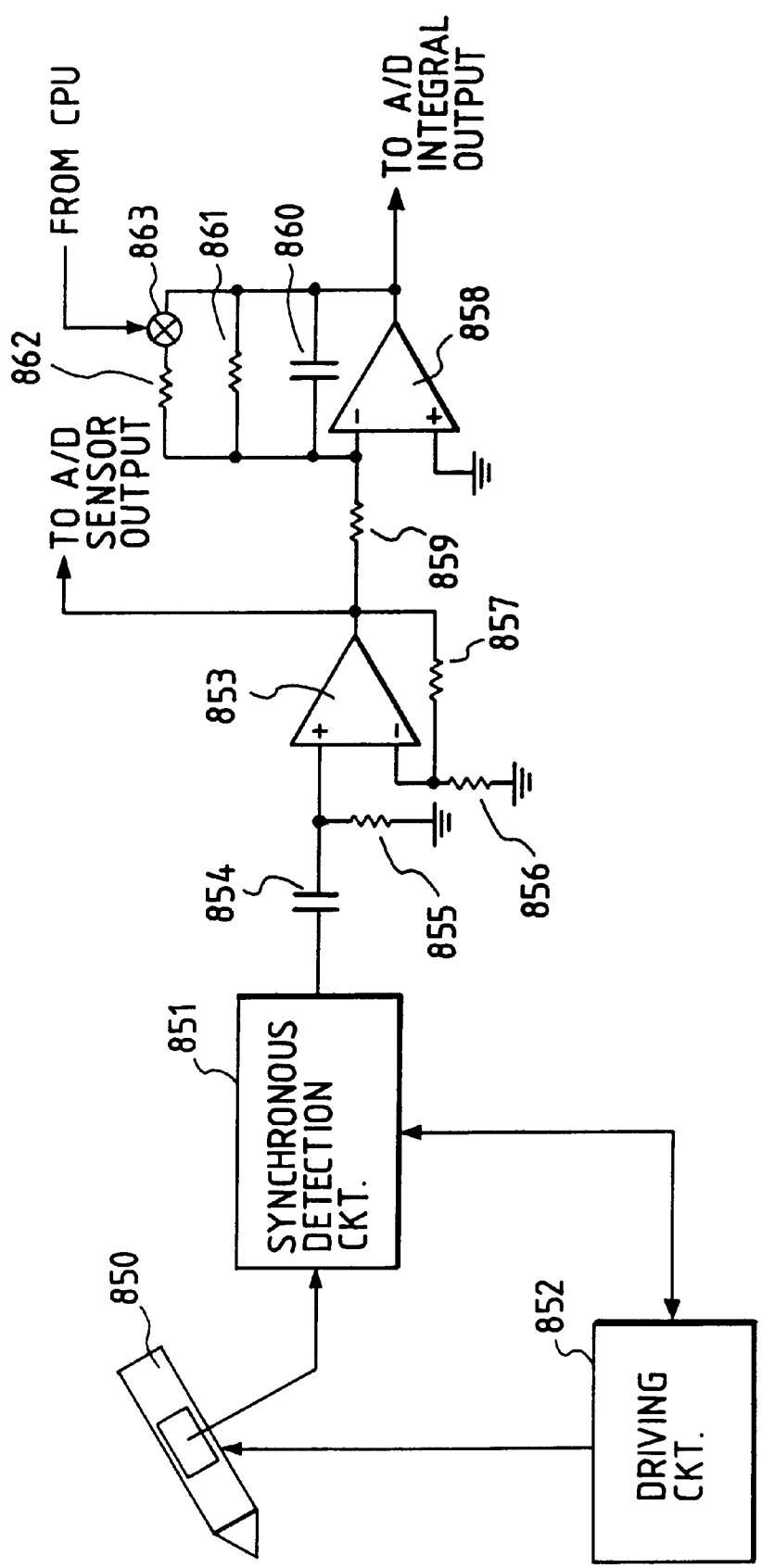
FIG. 14 is a graph for explaining the arrangement of the sensor and integral means in FIG. 13.

FIG. 13 is a block diagram showing the overall arrangement of an image blur prevention apparatus according to the sixth embodiment of the present invention. Referring to FIG. 13, a CPU 801 is a control circuit comprising, e.g., a microcomputer for simultaneously executing control of the overall camera, and control of a fluctuation prevention system. An output from a fluctuation sensor 805 for detecting a fluctuation of the entire camera is directly input to an A/D converter 802, and an integral calculation result from an integral means 806 is similarly input to the A/D converter 802. FIG. 14 shows the detailed arrangement of the sensor 805 and the integral means 806. As the fluctuation sensor, a vibration gyro utilizing a Coriolis' force, or the like is used. Referring to FIG. 14, a vibration member 850 is resonance-driven by a driving circuit 852, and its output is converted by a synchronous detection circuit 851 into a signal level proportional to the angular velocity. Since the output signal from the synchronous detection circuit 851 includes a DC component independently of a normal fluctuation signal, a high-pass filter comprising an OP amplifier 853, a capacitor 854, and resistors 855, 856, and 857 is arranged so as to remove the DC component. Therefore, the output from the OP amplifier 853 is input to the A/D converter 802 in FIG. 13, as shown in FIG. 14. The output from the OP amplifier 853 is input to an integral circuit comprising an OP amplifier 858, resistors 859 and 861, and a capacitor 860, and is converted from the angular velocity into an angular displacement. The output from the integral circuit is input to the A/D converter 802 shown in FIG. 13. In this manner, the output from the fluctuation sensor 805 and its conversion output are converted into digital data by the A/D converter 802, and the digital data are fetched by the CPU 801 to execute a predetermined calculation.

Referring back to FIG. 13, the actual moving amount of a correction optical system 823 attached to a portion of, in front of, or the like of a photographing lens (photographing optical system) 810 is detected by a correction optical system position detection means 824. The output from the means 824 is compared with the output from the above-mentioned integral means 806 by a comparison means 817, and a differential output between the fluctuation amount detected by the fluctuation sensor 805 and the displacement of the correction optical system 823 is amplified. The differentially amplified result output from the comparison means 817 is input to a correction optical system driving means 825. Then, the correction optical system driving means 825 supplies driving power to a correction optical system driving coil 826 to eliminate the above-mentioned difference, and the correction optical system 823 is driven by an electromagnetic force generated by the driving coil 826. In this case, if the output per unit angle detected by the fluctuation sensor is set to be equal to the output per unit correction angle of the correction optical system, a satisfactory image blur prevention operation for a hand vibration can be realized. Note that a focal distance detection means 809 detects the focal distance of an optical system by a known method, and a fluctuation prevention selection means 827 selects whether or not an image blur prevention function is enabled.

Figure 15:
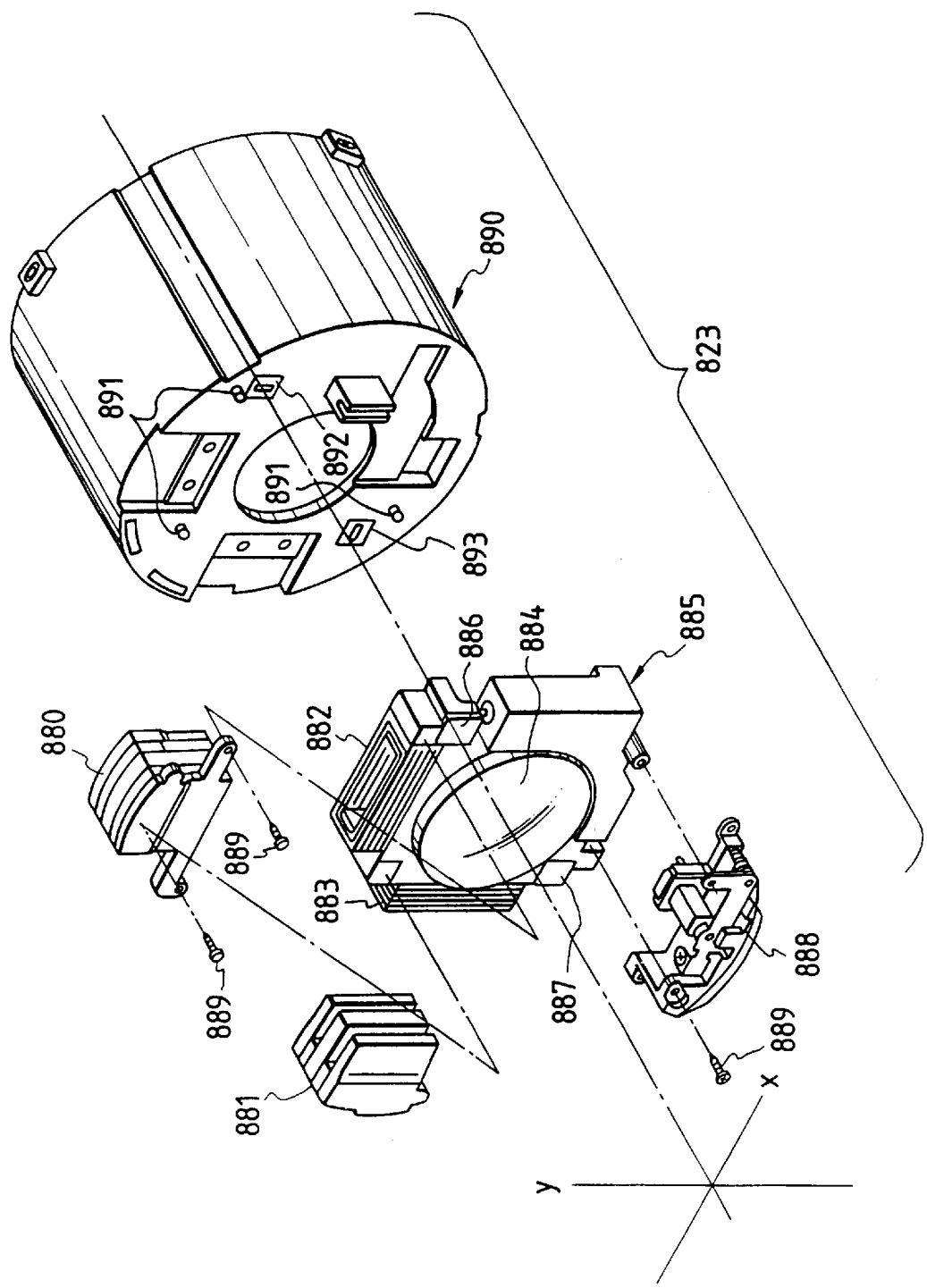
FIG. 15 is a schematic perspective view showing the arrangement of an correction optical system in FIG. 13.

FIG. 15 shows the detailed arrangement of the correction optical system 823. The correction optical system 823 shown in FIG. 15 adopts a so-called shift optical system arrangement for decentering the optical path of light incident on a photographing optical system of the camera by translating a lens in the x-and y-axis directions perpendicular to the optical axis. Referring to FIG. 15, yoke portions 880 and 881 constitute magnetic circuit units serving as driving sources in the x- and y-axis directions for generating electromagnetic driving forces together with coils 882 and 883, respectively. Thus, when electric power is supplied from the above-mentioned correction optical system driving means 825 to these coil portions, a lens 884 as a portion of the photographing lens is decentered in the x- and y-axis directions in FIG. 15. Furthermore, a support frame/support arm 885 is used for fixing the lens 884. An actual movement of this shift lens is detected in a non-contact manner by combinations of iREDs 886 and 887 which are moved together with the lens, and PSDs 892 and 893 attached to a lens barrel portion 890 for holding the entire shift lens system. The optical system shown in FIG. 15 also includes a mechanical lock mechanism 888 for holding the lens at substantially the central position of the optical path when energization to this shift system is stopped, charge pins 889, and support balls 891 serving as tilt & shift locks for regulating the inclination direction of the shift system.

The operation control state of the CPU 801 of this embodiment will be described below with reference to the flow charts in FIGS. 16A to 17 and the timing charts in FIGS. 18A to 18G. It is checked in #200 if a switch SW1 (818 in FIG. 13) is turned on by a release operation of the camera. If Y (YES) in #200, the flow advances to #201. In this state, object light incident via the correction optical system 823 and the photographing optical system 810 is reflected by a main mirror 811, and is then incident on a photometry sensor in a photometry means 814 via a sub mirror 812 and a photometry optical system 813. Thereafter, since an output corresponding to the incident light amount level is output via a photometry circuit in the photometry means, the CPU 801 fetches this output as photometry data via the A/D converter 802. In #202, the CPU 801 performs a predetermined calculation for determining a predetermined shutter speed and aperture value on the basis of the photometry data, and stores the calculation results in its internal RAM. In #203, object light incident via the correction optical system 823 and the photographing optical system 810 is incident on a sensor of a measuring distance means 830 via the main mirror 811, the sub mirror 812, a sub mirror 828, and an AF optical system 829, and is amplified to a predetermined level by an amplification circuit in the measuring distance means. Thereafter, the CPU 801 sequentially fetches the output from the measuring distance means 830 via the A/D converter 802. In #204, the CPU 801 calculates a defocus amount on the basis of the result from the measuring distance means 830, and the like. It is then checked in #205 if an in-focus state is reached. If N (NO) in #205, the flow advances to #206, and a focus lens (included in the photographing lens 810) is driven on the basis of the above-mentioned defocus amount by driving a motor driving means 807 and a focus driving motor 808. As described above, the operations in #203 to #206 are repetitively executed until an in-focus state is reached, and if an in-focus state is determined in #205, the flow advances to #207. In #207, it is checked if a switch SW2 (a switch 819 in FIG. 13) with which a photographer starts an actual release operation is ON. If N in #207, it is checked in #208 again if the switch SW1 is ON. If N in #208, the camera operation is immediately stopped, and the flow returns to #200. However, if Y in #208, the flow returns to #207 to discriminate the state of the switch SW2. If it is determined in #207 that the switch SW2 is ON, the flow advances to #209 to energize a mirror driving motor 822 via a mirror driving means 821 in accordance with a control signal from the CPU 801, thereby starting a mirror up operation of the mirror 811. In #210, an internal timer circuit of the CPU 801 is started. FIGS. 18A to 18G are timing charts of this operation. When the mirror up driving operation is started, since the mirror begins to move, a signal having a higher frequency and a larger amplitude than those of a normal hand vibration component appears in the sensor output due to the mechanical movement of the mirror, as shown in FIG. 18E. Since this signal includes a signal component representing a fluctuation of a camera main body caused by the above-mentioned hand vibration or the like, and a signal component of the sensor itself generated by a shock or the like, a waveform obtained by integrating this signal by the actual integral means 806 appears with a shape indicated by a solid curve in FIG. 18F. As described above, since the correction optical system 823 is driven in accordance with this output, the correction system output from the correction optical system position detection means 824 also has a waveform indicated by a solid curve in FIG. 18G, resulting in excessive correction as compared to an original fluctuation. In order to prevent this operation, in #211, a control output INTLVL from the CPU 801 is immediately set at H level, and as a result, since an analog switch 863 arranged in a feedback section of the integral circuit shown in FIG. 14 is turned on, a resistor 862 connected in series with the analog switch 863 is in the circuit. Therefore, finally, since the capacitor 860, and the resistors 861 and 862 are connected in parallel with each other, the time constant of the integrator (integral circuit) changes, and the frequency characteristic of this integrator is shifted to a characteristic for decreasing the low-frequency side gain, as indicated by a dotted curve in FIG. 19. Upon switching of the time constant of the integrator, an actual integral output result changes, as indicated by a dotted curve in FIG. 18F, and of course, the output displacement from the correction system changes, as indicated by a dotted curve. For this reason, the influence of a sensor error caused by a mirror up shock or the like can be minimized. In the state wherein the time constant has changed, whether or not the above-mentioned mirror up driving operation is completed is discriminated in #212 by checking if the content of the internal timer circuit of the CPU 801 reaches a predetermined time $T_M$. If it is detected that the mirror up driving operation has been completed, energization to the mirror up driving system is stopped in #213, and the CPU 801 sets the output INTLVL at L level in #214. As a result, the analog switch 863 in FIG. 14 is turned off, and the frequency characteristic of the integrator is restored to an original one. Further, a predetermined time $T_M$ is set as a time which is considered to need so as to come into a state such as an influence of mirror up does not effect. After an elapse of a predetermined period of time, the forward shutter is started in turn via a shutter driving means 815 in #215. Since a high-frequency waveform shown in FIG. 18E also appears due to the driving operation of the forward shutter, in order to prevent this, the output INTLVL is set at H level again in #216, thereby shifting the frequency characteristic of the integrator to the high-frequency side in the same manner as in the above-mentioned case. In #217, the internal timer circuit of the CPU 801 is temporarily reset, and it is checked in #218 if the content of the internal timer circuit reaches a predetermined time $T_{SF}$. Further, a predetermined time $T_{SF}$ is set as a time which is considered to need so as to come into a state such as an influence of the running of forward shutter curtain does not effect. If Y in #218, the output INTLVL is set at L level in #219, thereby temporarily restoring the frequency characteristic of the integrator to an original state. Thereafter, it is checked in #220 if the count value of the internal timer circuit of the CPU 801 reaches a value $T_{AE}$ corresponding to the shutter speed calculated in #202. If Y in #220, the flow advances to #221 to start the rearward shutter via the shutter driving means 815. Since a high-frequency signal shown in FIG. 18E is also generated in response to the rearward shutter driving operation, the output INTLVL from the CPU 801 is set at H level in #222, thereby shifting the frequency characteristic of the integrator to the high-frequency side. In #223, the count value of the internal timer circuit of the CPU 801 is reset again, and it is checked in #224 as in the case of the forward shutter if the time of the internal timer reaches the predetermined time $T_{SR}$. If Y in #224, the output INTLVL is set at L level again in #225, thereby restoring the characteristic of the integrator to an original state. Further, a predetermined time $T_{SR}$ is set as a time which is considered to need so as to come into a state such as an influence of the running of rearward shutter curtain does not effect. After an elapse of a predetermined period of time, energization to the forward and rearward shutters is stopped in #226, and the mirror driving motor 822 is energized via the mirror driving means 821 in #227 so as to start a mirror down driving operation of the mirror 811 shown in FIG. 13 in turn. In #228, the internal timer of the CPU 801 is reset again. In this case, as in the above-mentioned case, the output INTLVL is set at H level in #229 to temporarily shift the characteristic of the integrator to the high-frequency side. When the end of the mirror down driving operation is detected by determining in #230 that the count value of the timer has reached $T_m$, energization to the mirror driving motor 822 is stopped in #231, and finally, the output INTLVL is set at L level again in #232, thereby restoring the characteristic of the integrator to an original level. Further, a predetermined time $T_m$ is set as a time which is considered to need so as to come into a state such as an influence of mirror down does not effect.

As described above, in this embodiment, the frequency characteristic of the integrator is switched in accordance with the mirror up and down driving timings, and the forward and rearward shutter driving timings. The characteristic of the integrator may be switched among two or more levels in accordance with the sensor output. Since the above-mentioned shock influences an actual picture during only the shutter control period, the switching operation of the integrator during the mirror up/down driving operation may be omitted, and the switching operation of the integrator may be performed during only the forward and rearward shutter driving operations.

Figure 16B:
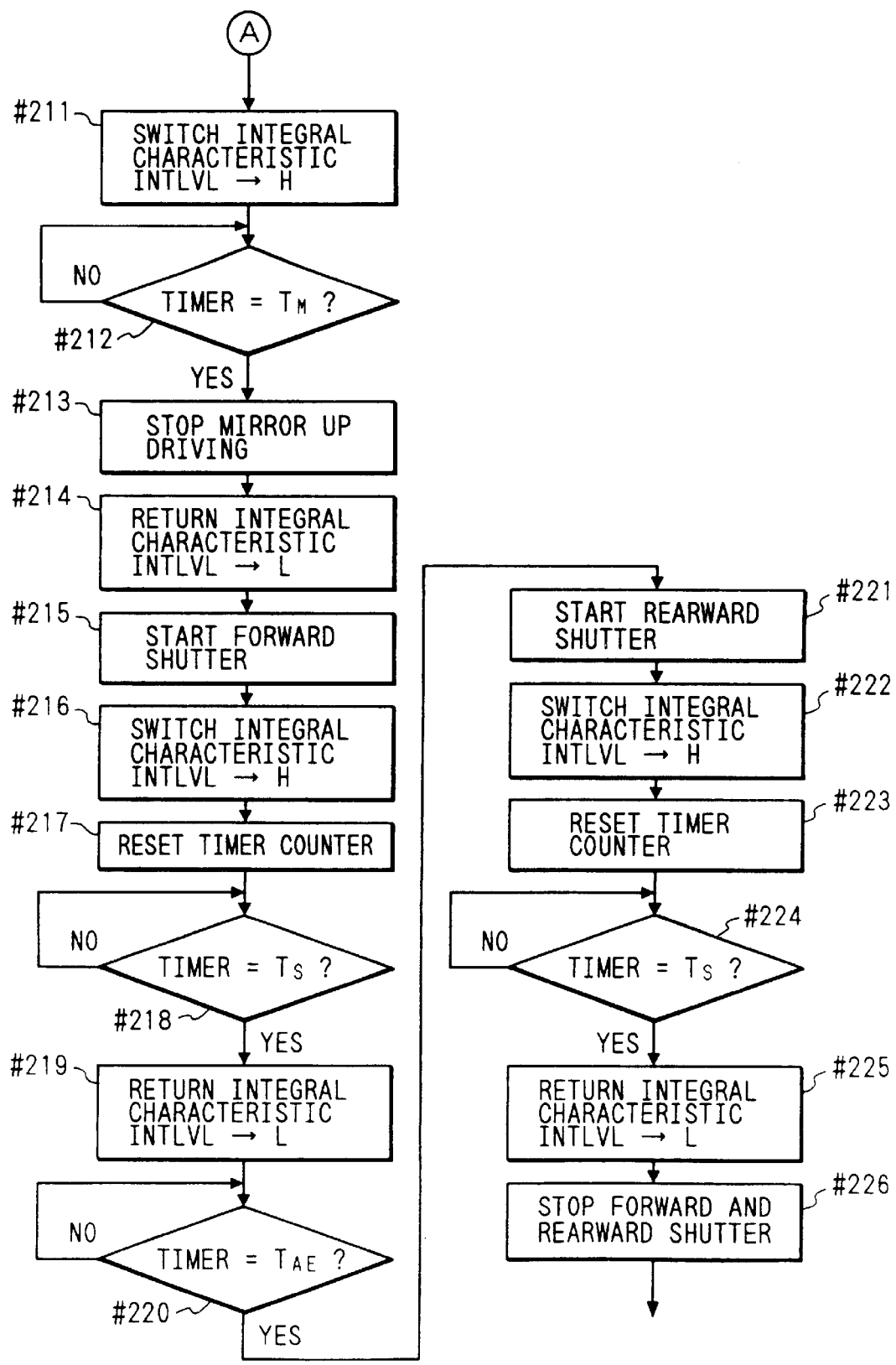
FIG. 16, which consists of FIGS. 16A and 16B, is a flow chart showing an operation of the image blur prevention apparatus of FIG. 13.

In FIGS. 16A and 16B, #211 may be performed before #209, and #229 may be performed before #227. Similarly, #213 and #214, #215 and #216, #221 and #222, #225 and #226, and #231 and #232 may be replaced with each other.

Also, a detection means for directly detecting the status of the mirror may be arranged, and when the detection means detects in #211 or #229 that the mirror up or down driving operation is started, the characteristic of the integral circuit may be changed.

Similarly, detection means for directly detecting the status of the forward and rearward shutters may be arranged, and when the detection means detect in #216 or #227 in FIGS. 16A and 16B that the driving operation of the forward or rearward shutter is started, the characteristic of the integral circuit may be changed.

In #211, #216, and #222 in FIGS. 16A and 16B, the integral characteristic may be switched to different characteristics.

Furthermore, in #214 in FIGS. 16A and 16B, the integral characteristic is restored to a characteristic before #211. In this case, the integral characteristic may be switched to an intermediate characteristic between the characteristic before switching in #211 and the characteristic after switching. The same applies to #219 and #225 in FIGS. 16A and 16B.

In place of switching the integral characteristic, the characteristic of the high-pass filter comprising the capacitor 854, and the resistors 855, 856, and 857 in FIG. 14 may be changed by changing its time constant.

Figure 17:
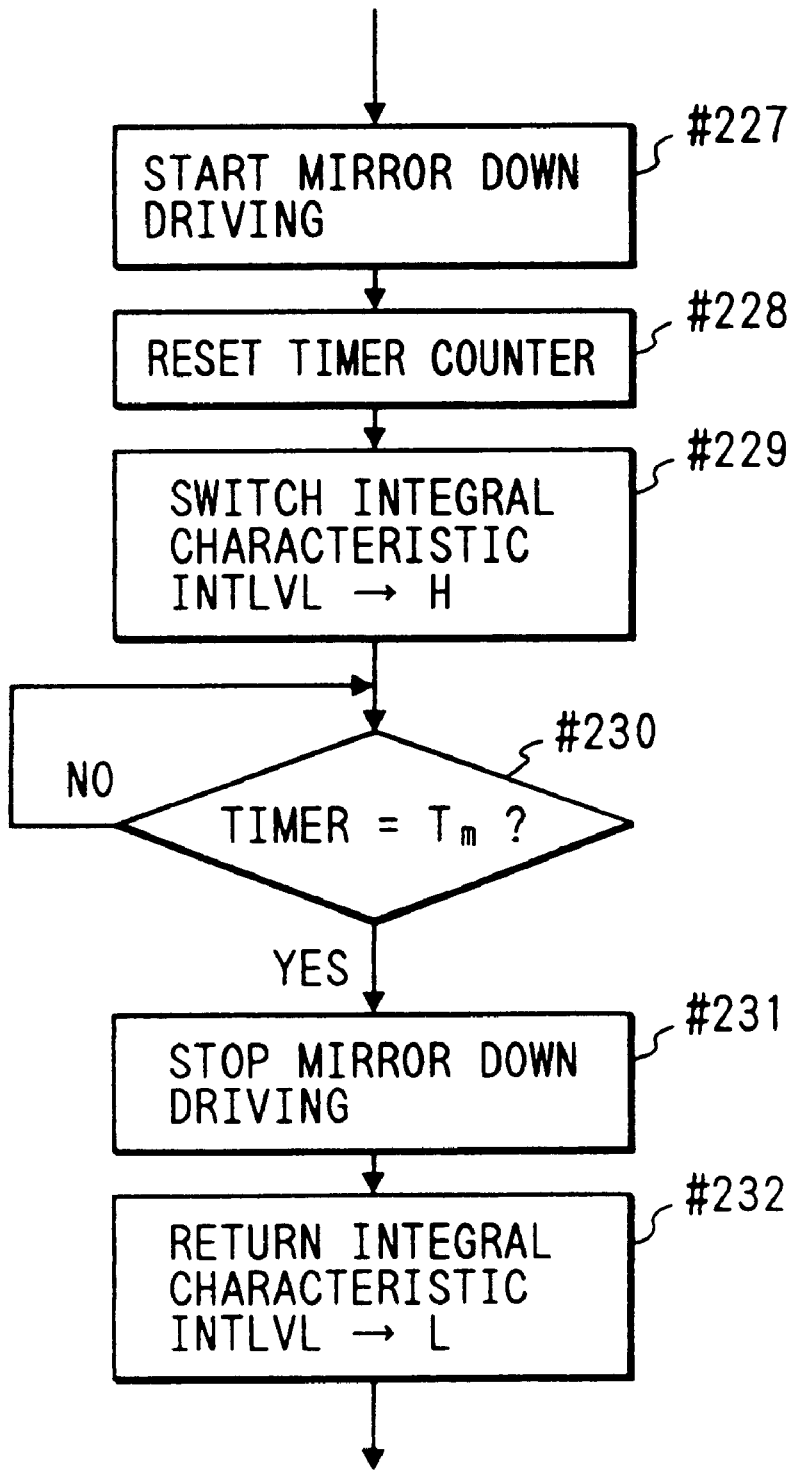
FIG. 17 is also a flow chart showing an operation of the image blur prevention apparatus of FIG. 13.

The integral characteristic to be changed in #211, #214, #216, #219, #222, #225, #229, and #232 in FIGS. 16A to 17 may be changed in accordance with photographing conditions such as the focal distance, shutter speed, and the like.

Further, above flow charts of FIGS. 16A, 16B and 17 correspond to a case in which shutter time is relatively long. For example, it is applied to such a following case when a shutter time is shorter than a predetermined value, an image blur prevention is not performed since a hand vibration does not effect a photographing result, and when the shutter time is longer than the predetermined value, the image prevention is performed.

However, in a case such as the image blur prevention is performed for a relatively short shutter time, an exposure time is inappropriate when the shutter time is short ($T_{AE} < T_{SF}$) in the flow charts of FIGS. 16A, 16B and 17. Accordingly, a following modification is considered for the relatively short shutter time.

Figure 20A:
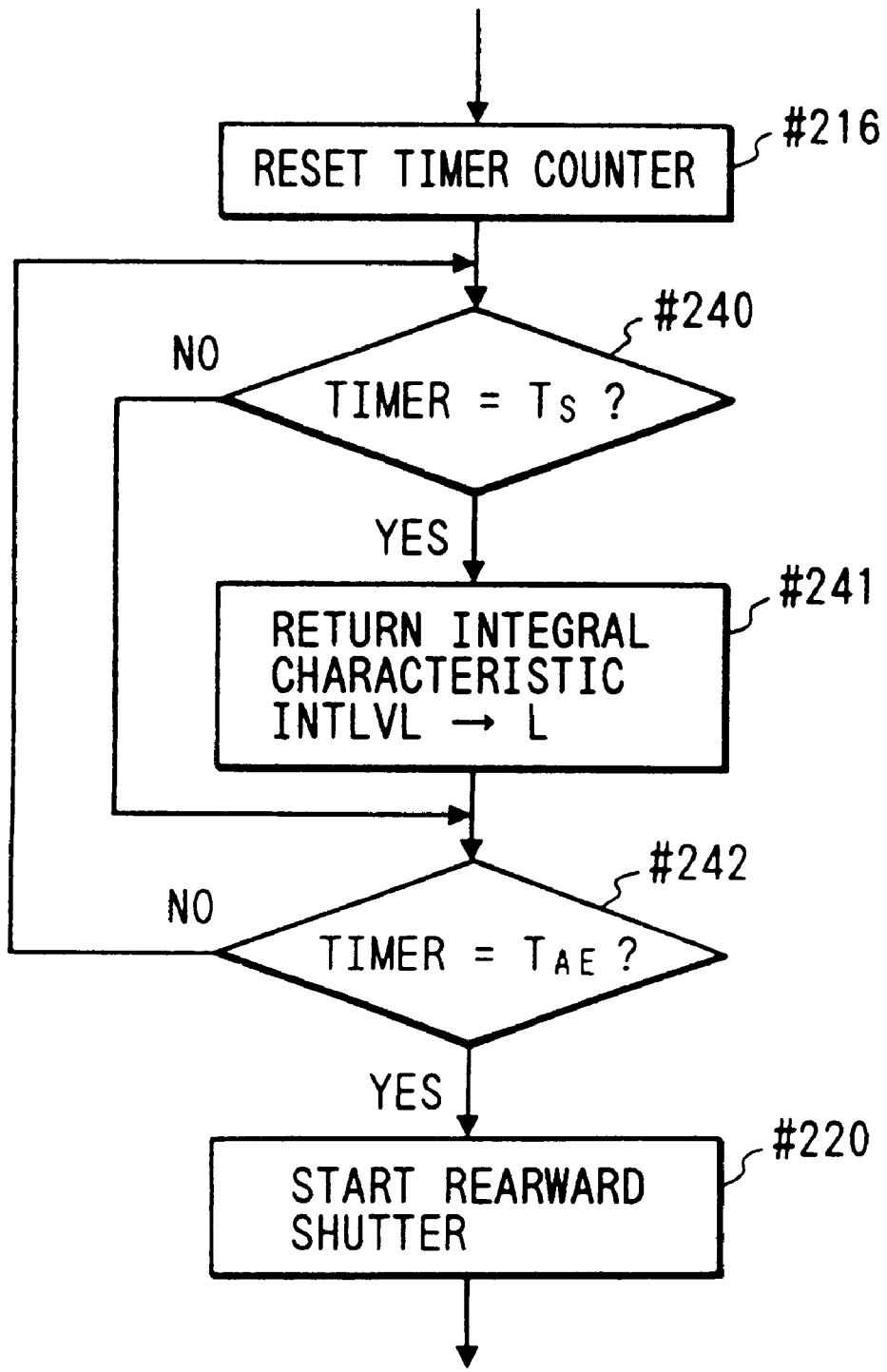
FIG. 20A is a flow chart showing a part of operation of the image blur prevention apparatus of modification of the sixth embodiment.

Furthermore, as a modification of the sixth embodiment, #217 to #219 in FIGS. 16A and 16B may be replaced by #240 to #242 in FIG. 20A. This modification considers a case wherein the count value $T_{AE}$ of the timer corresponding to the shutter speed is smaller than the count value $T_S$ in #240. This modification will be described below with reference to FIG. 20A. If it is determined in #240 that the count value has reached $T_{SF}$, the flow advances to #241 to return the integral characteristic, and the flow then advances to #242. However, if it is determined in #240 that the count value has not reached $T_{SF}$, the flow jumps to #242. If it is determined in #242 that the count value has reached $T_{AE}$, the flow advances to #243. If it is determined in #242 that the count value has not reached $T_{AE}$, the flow returns to #240.

More specifically, according to the flow chart in FIG. 20A, when $T_S > T_{AE}$, the rearward shutter driving operation is started when the count value reaches $T_{AE}$ even before it reaches $T_{SF}$, and then, the integral time constant is retained in a value for a shock until #225.

Further, it is also considered that since a shock of running of a forward and rearward shutter curtains slightly effect the photographing result when the shutter time is relatively short, in such a case a characteristic changing is not performed as a modification of the sixth embodiment.

Figure 20B:
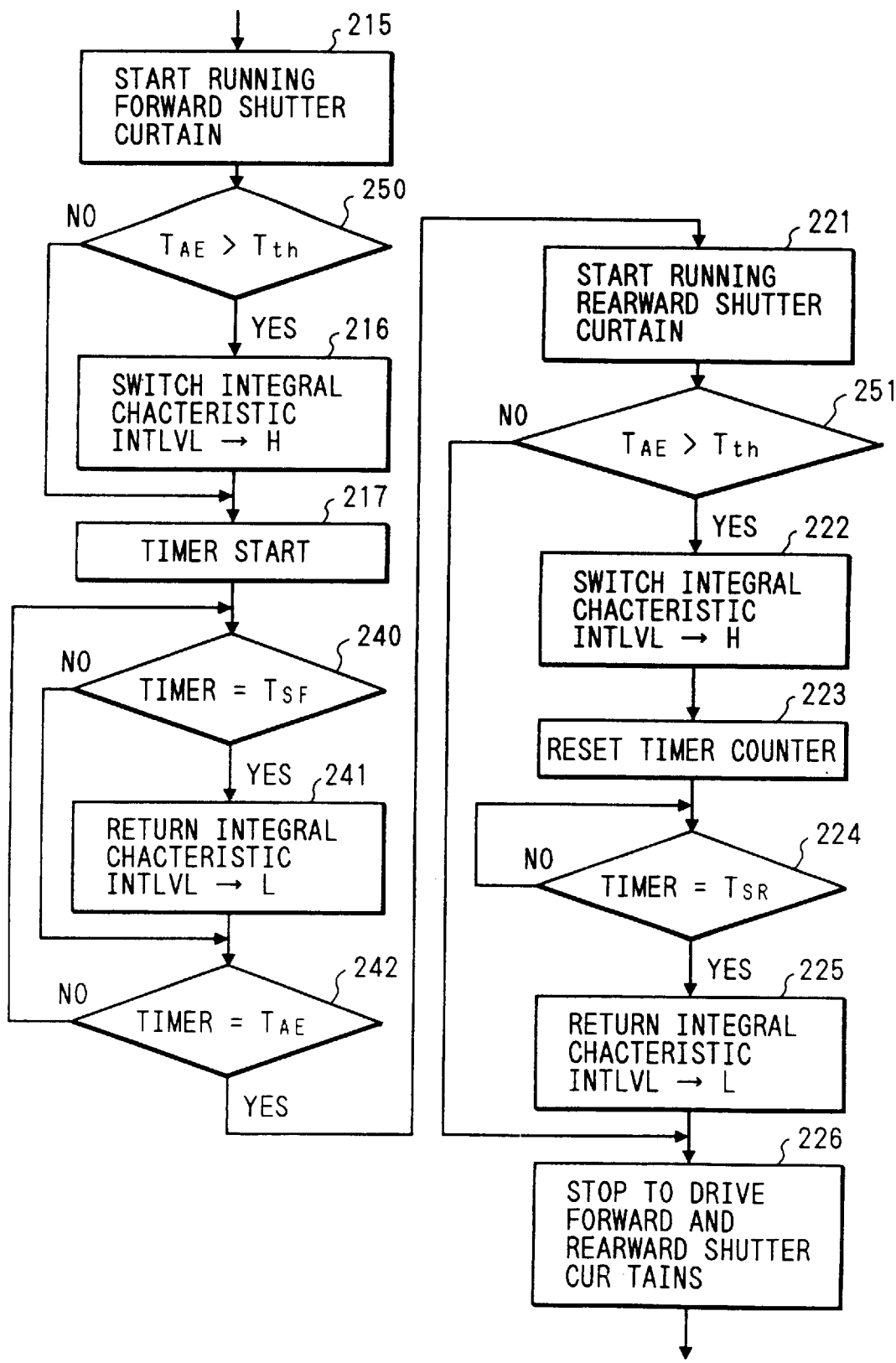
FIG. 20B is a flow chart showing a part of operation of the image blur prevention apparatus of modification of the sixth embodiment.

FIG. 20B shows a flow chart of the modification. #250 is provided between #215 and #216 of FIG. 16B, and #218 to #220 are changed into #240 to #242 (similar as FIG. 20A), further #251 is provided between #221 and #222.

According to FIG. 20B, an operation is as follows. When it is judged a shutter time $T_{AE}$ is longer than a predetermined value $T_{th}$ in #250, it proceeds to #216, and when it is judged the shutter time $T_{AE}$ is shorter than the predetermined value $T_{th}$, it proceeds to #217 without #216. The operation of #216, #217 and #221 are the same as FIG. 16B, and the operation of #240 to #242 are the same as FIG. 20A. Accordingly an explanation is omitted.

When it is judged the shutter time $T_{AE}$ is longer than the predetermined value $T_{th}$ in #251, it proceeds to #222, and it is judged shutter time $T_{AE}$ is longer than the predetermined value $T_{th}$, it proceeds to #226 without #222 to #225. The explanation is omitted since #222 to #226 is the same as FIG. 16B.

Further, the predetermined value $T_{th}$ is set as a time which is a limit of shutter speed not for effecting an influence of a hand vibration etc. to a photographing result.

(Seventh Embodiment)

Figure 21:
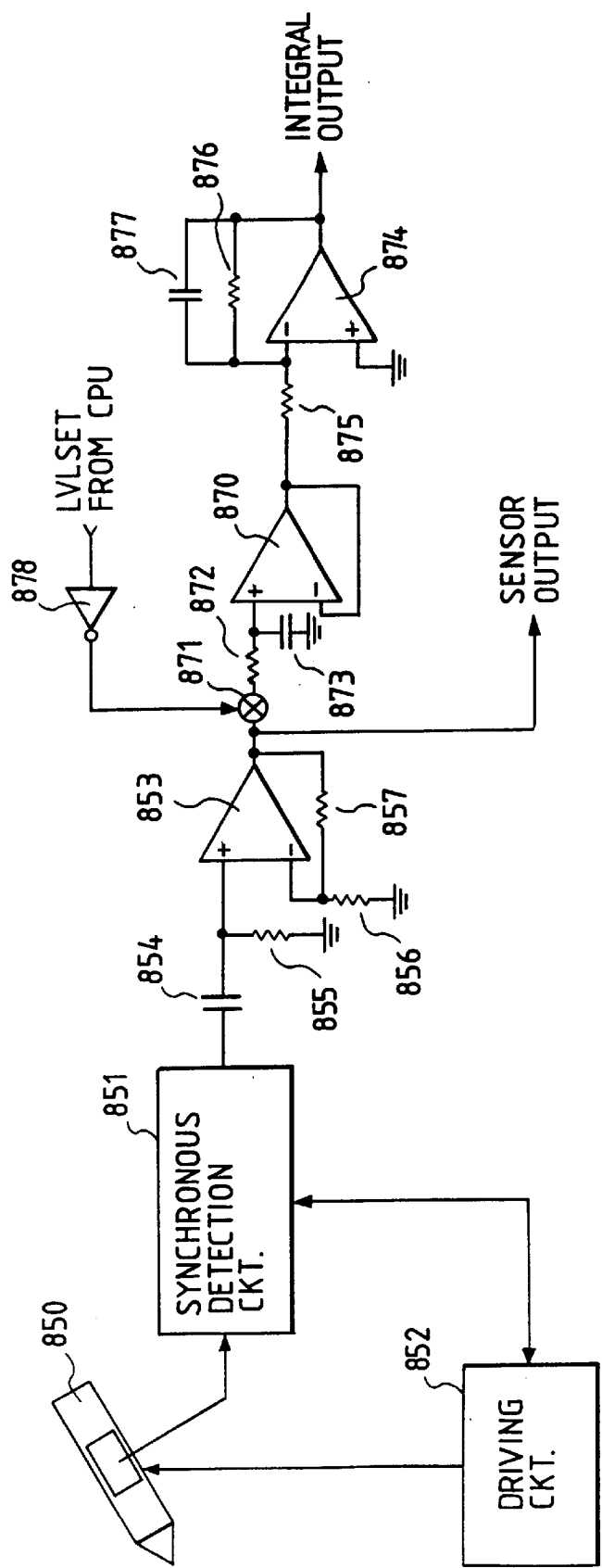
FIG. 21 is a graph showing a part of a circuit arrangement of the image blur prevention apparatus according to the seventh embodiment of the present invention.
Figure 22B:
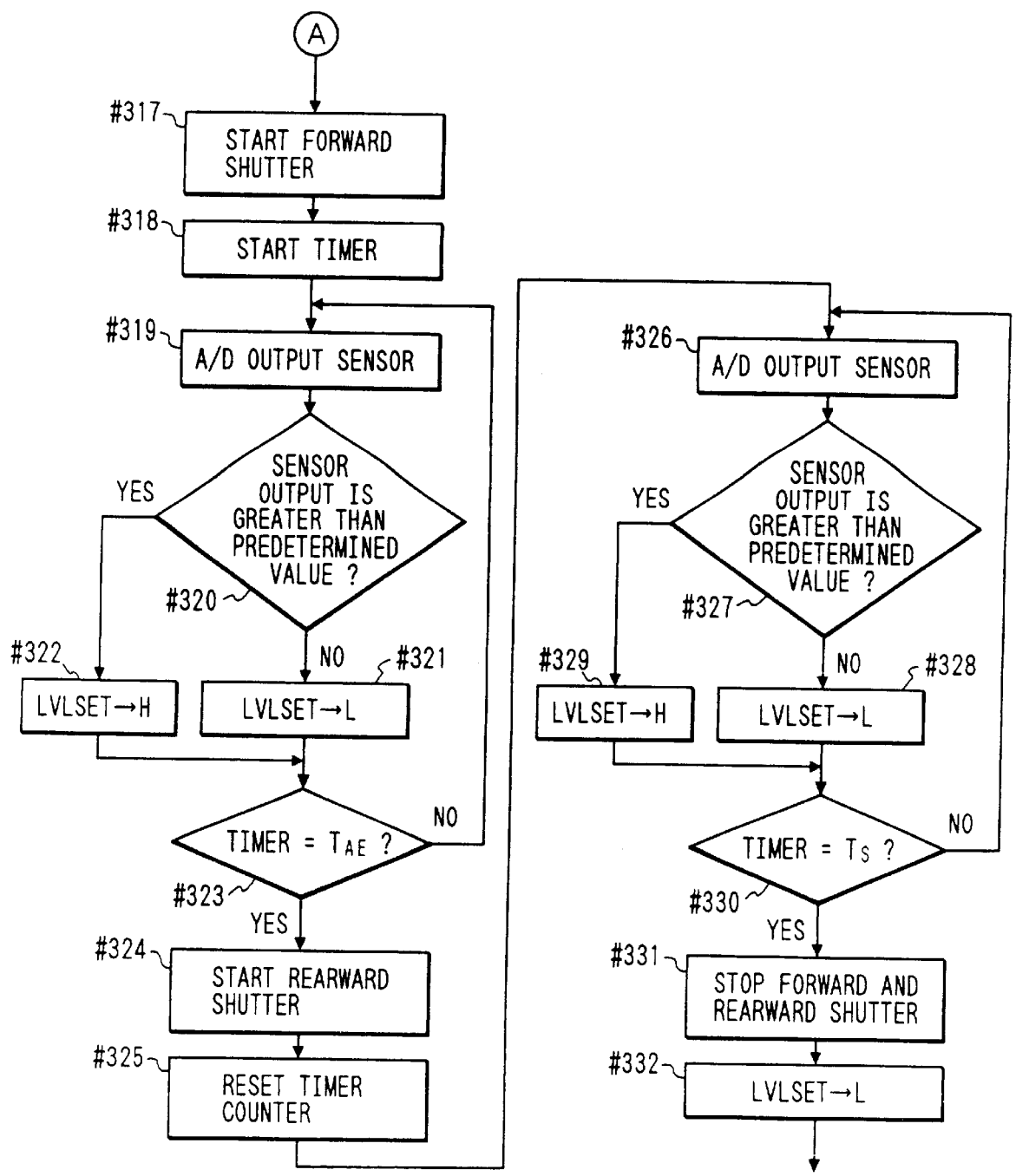
FIG. 22, which consists of FIGS. 22A and 22B, is a flow chart showing an operation of the image blur prevention apparatus according to the seventh embodiment of the present invention.
Figure 23:
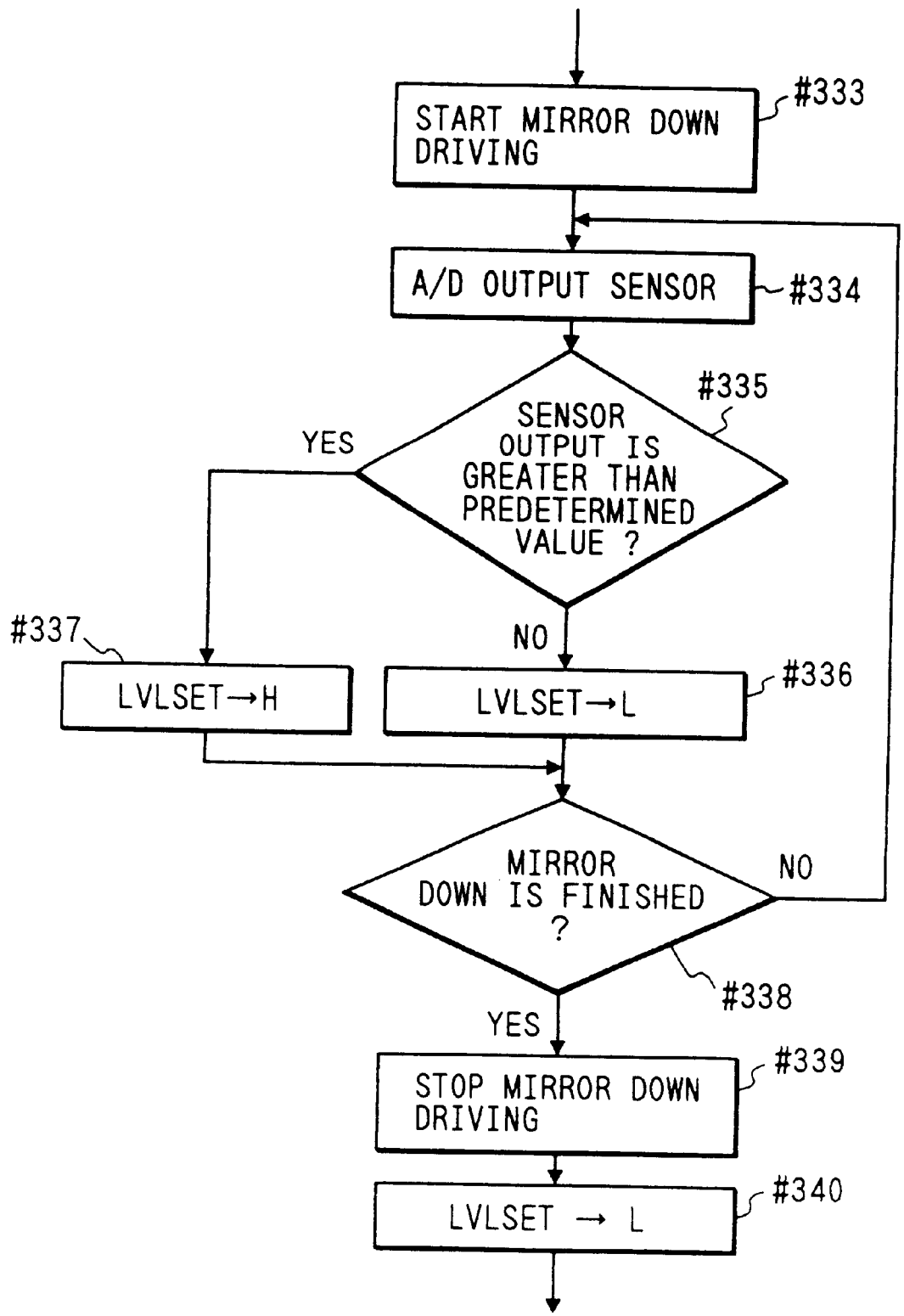
FIG. 23 is also a flow chart showing an operation of the image blur prevention apparatus according to the seventh embodiment of the present invention.
Figure 24:
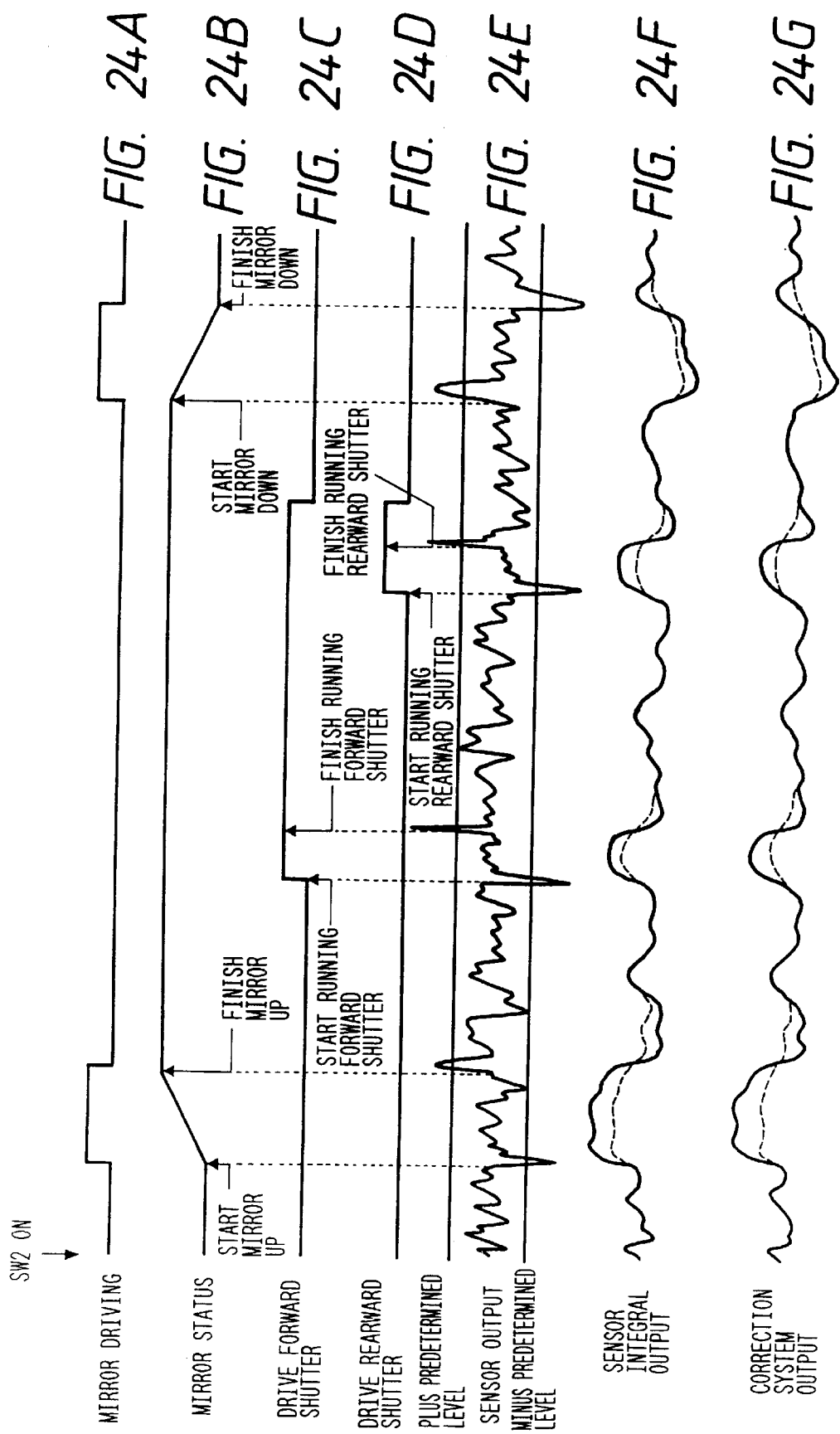
FIGS. 24A to 24G are timing charts showing an operation of the image blur prevention apparatus according to the seventh embodiment of the present invention.

The operation of an image blur prevention apparatus according to the seventh embodiment of the present invention will be described below with reference to FIGS. 21 to 24G. FIG. 21 is a diagram showing an arrangement in which a fluctuation detection sensor and some processing circuits therefor are different from those shown in FIG. 14. In FIG. 21, since an arrangement from the vibration gyro 850 as a fluctuation detection sensor to the feedback resistor 857 of the OP amplifier 853 is the same as that in FIG. 14, a detailed description thereof will be omitted. Referring to FIG. 21, the output from the OP amplifier 853 is connected to the input of an OP amplifier 870 via an analog switch 871 and a resistor 872, and a capacitor 873 is connected between the input terminal of the OP amplifier 870 and ground. The analog switch 871 is controlled by an inverted control signal obtained by inverting a control signal LVLSET from the CPU 801 by an inverter 878, and the above-mentioned circuit arrangement forms a sample & hold circuit. Furthermore, the output from the OP amplifier 870 is input to an integral circuit constituted by an OP amplifier 874, resistors 875 and 876, and a capacitor 877, and is converted into a predetermined fluctuation displacement output by the integral circuit. The flow of the control operation of the CPU 801 in this embodiment will be described below with reference to the flow charts in FIGS. 22A to 23 and the timing charts in FIGS. 24A to 24G. Since #300 to #309 in the flow chart in FIGS. 22A and 22B are the same as #200 to #209 in FIGS. 16A and 16B, a description thereof will be omitted. When the up driving operation of the mirror 811 of the camera main body is started in #309, A/D conversion of a sensor output as the output from the OP amplifier 853 in FIG. 21 is started in #310. It is checked in #311 if the sensor output is greater than a predetermined value. If N in #311, the signal LVLSET is set at L level in #312, thereby turning on the analog switch 871. Therefore, in this state, since the cutoff frequency of a low-pass filter constituted by the resistor 872 and the capacitor 873 is set to be a value sufficiently higher than the hand vibration frequency band, the output from the OP amplifier 870 is the same as the sensor output as the output from the OP amplifier 853, and is converted into a predetermined displacement output by the integral circuit at the output side of the OP amplifier 870. On the other hand, if it is determined in #311 that the sensor output is greater than the predetermined value, the flow advances to #313, and the signal LVLSET is set at H level, thereby turning off the analog switch 871. In this case, since the OP amplifier 870 holds the level of the OP amplifier 853 obtained immediately before the analog switch 871 is turned off upon operation of the capacitor 873, it outputs a constant signal level thereafter, and the constant signal level is converted into a predetermined displacement output by the integral circuit at the output side of the OP amplifier 870. The above-mentioned operation will be described in detail below with reference to FIGS. 24A to 24G. When the mirror up driving operation is started, a high-frequency, large-amplitude signal appears in the sensor output, as shown in FIG. 24E, and when this value falls outside the range between a plus predetermined level and a minus predetermined level shown in FIG. 24E, the signal LVLSET from the CPU 801 is set at H level, and the hold operation of the sample & hold circuit is performed, thus applying a predetermined limiter to the sensor output. As a result, since the sensor integral output changes, as indicated by a dotted curve in FIG. 24F, and the displacement from the correction system, which operates to follow the sensor integral output, changes as well, as indicated by a dotted curve in FIG. 24G, the influence of a sensor error caused by a mirror up shock or the like can be minimized. It is then checked in #314 if the mirror up driving operation is completed. If N in #314, the above-mentioned operations in #310 to #313 are repeated. Furthermore, if the end of the mirror up driving operation is detected in #314, energization to a mirror up driving system is immediately stopped in #315, and the control output LVLSET from the CPU 801 is forcibly set at L level in #316, thereby turning on the analog switch 871. Thereafter, a normal integral operation for the sensor output is restarted. The forward shutter driving operation is started in #317, and the timer is started in #318. Thereafter, in #319 to #322, the same discrimination operation as in #310 to #313 is performed for the sensor output, thereby applying a limiter to a sensor output falling outside the predetermined range. It is checked #323 if the timer time reaches a time $T_{AE}$ corresponding to a shutter speed calculated in #302. If Y in #323, the rearward shutter driving operation is started in turn in #324. The timer is temporarily reset in #325, and thereafter, the same discrimination operation as in #320 to #323 is performed in #326 to #329. Therefore, in this operation, discrimination for the sensor output is performed during the shutter exposure period. It is checked in #330 if the timer value reaches a predetermined time $T_{SR}$. If Y in #330, the driving operation of the forward and rearward shutters is stopped in #331, and the signal LVLSET is forcibly set at L level #332. In the flow shown in FIG. 23, an operation for a mirror down driving operation is performed. In #333, the mirror down driving operation is started, and in #334 to #337, processing for eliminating the influence of a sensor error signal generated by the mirror down driving operation is executed in the same manner as in #310 to #313 described above. It is checked in #338 if the mirror down driving operation is completed. If Y in #338, the mirror down driving operation is stopped in #339, and finally, the signal LVLSET is set at L level in #340, thus ending a series of operations. As described above, in this embodiment, a high-frequency, large-amplitude signal generated in the sensor output upon driving of the mirror or the shutter is detected, and a predetermined limiter is applied to this signal, thereby minimizing the influence of a sensor error.

As a modification of this embodiment, the time constant of a circuit (a high-pass filter, integral circuit, or the like) for processing the sensor output may be changed when the sensor output exceeds a predetermined value like in the sixth embodiment.

The predetermined value in #311, #320, and #327 in FIGS. 22A and 22B may set to have different values.

Similarly, the predetermined value in #311, #320, and #327 in FIGS. 22A and 22B may be changed to a proper value in accordance with photographing conditions such as a focal distance, shutter speed, and the like.

(Eighth Embodiment)

Figure 25:
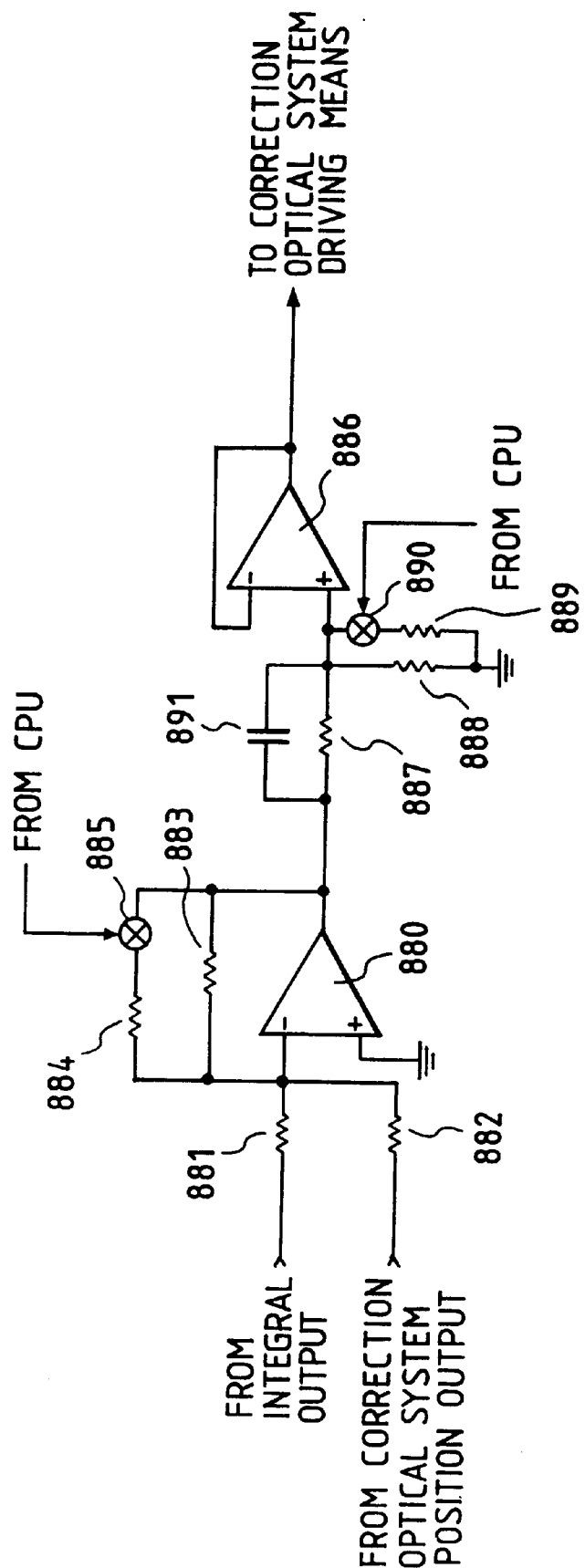
FIG. 25 is a graph showing a part of circuit arrangement of the image blur prevention apparatus according to the eighth embodiment of the present invention.
Figure 26:
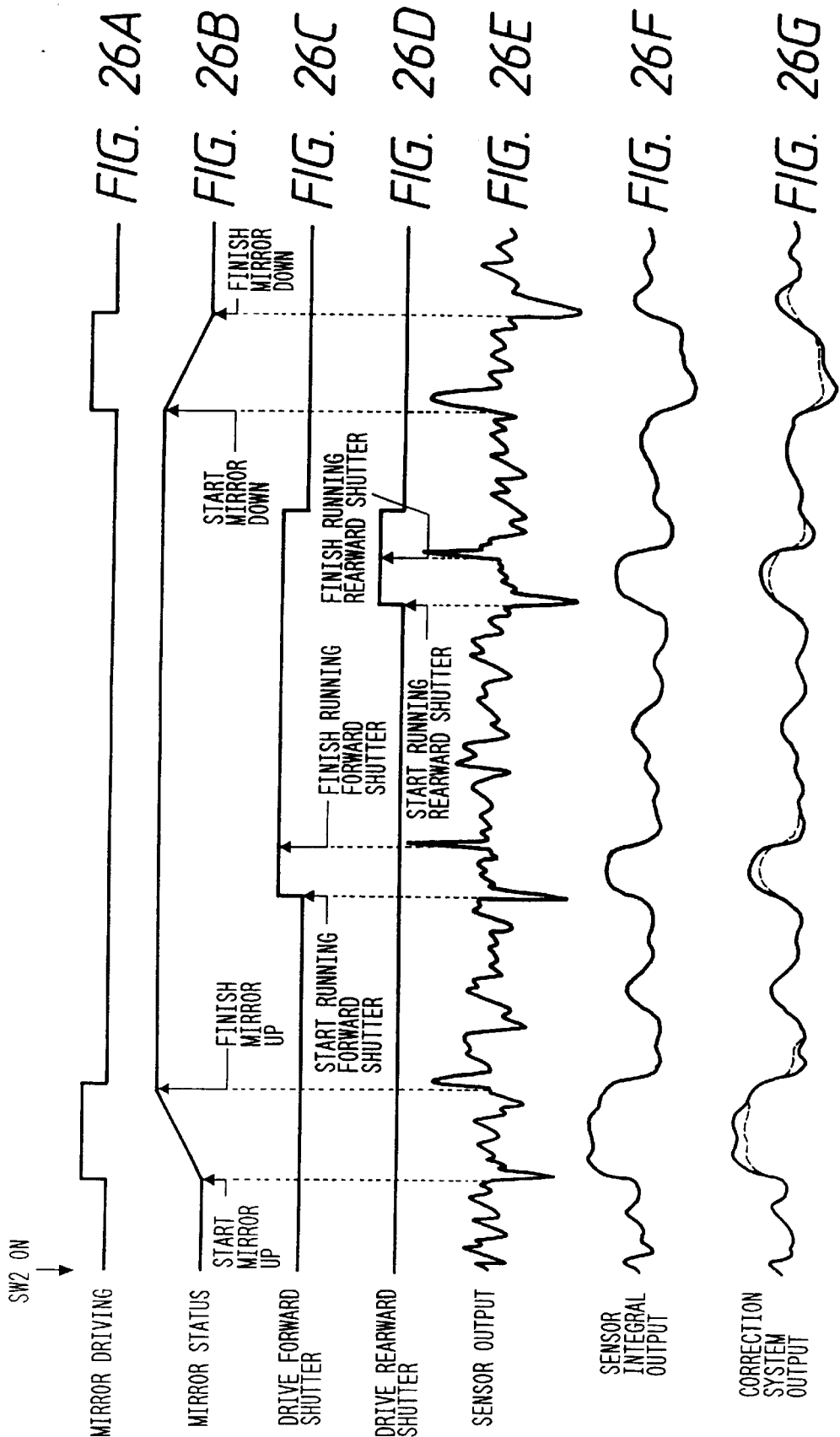
FIGS. 26A to 26G are timing charts showing an operation of the image blur prevention apparatus according to the eighth embodiment of the present invention.
Figure 27:
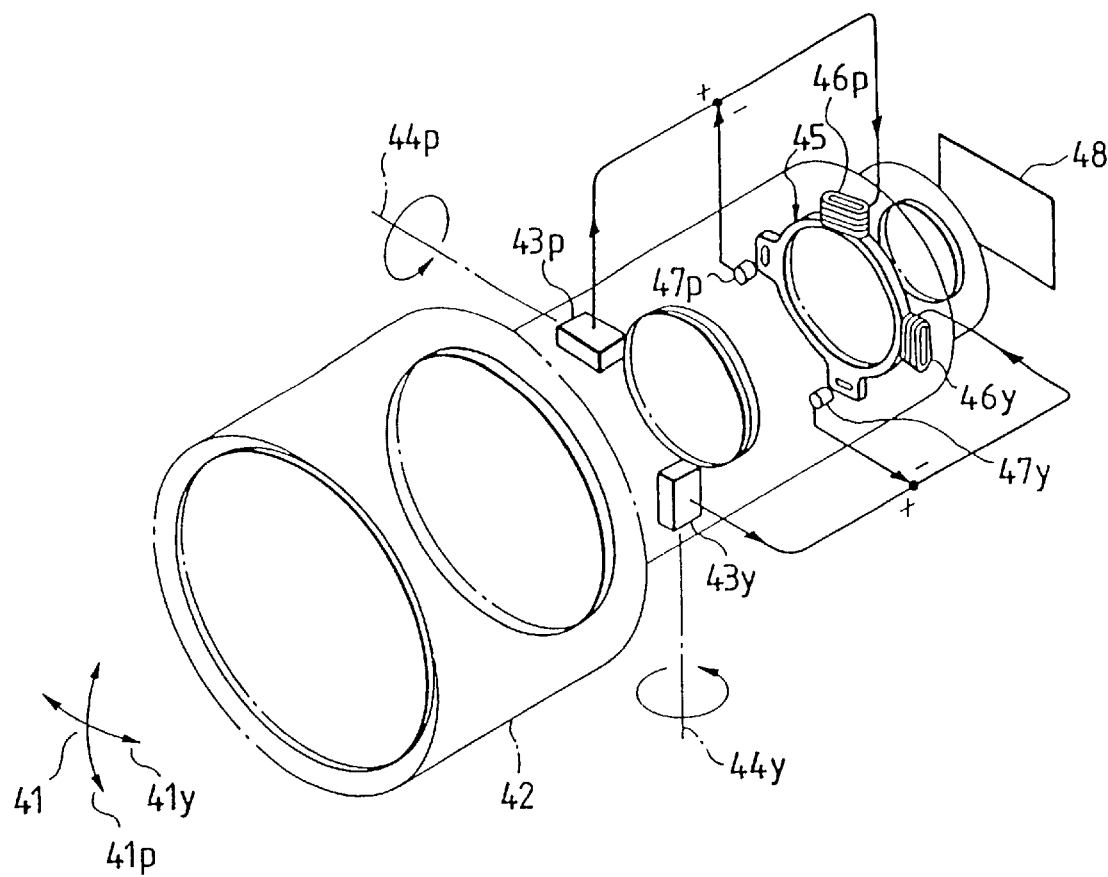
FIG. 27 is a schematic perspective view showing the arrangement of a conventional image blur prevention apparatus.

FIG. 25 is a diagram showing a control circuit of a correction optical system used in the eighth embodiment of the present invention. An OP amplifier 880 receives the output from the integral means 806 and the position output from the correction optical system position detection means shown in FIG. 13 respectively through resistors 881 and 882, and constitutes a differential amplifier circuit for the two inputs upon combination with a feedback resistor 883. Furthermore, a feedback portion of the OP amplifier 880 is connected to a resistor 884 and an analog switch 885. When the analog switch 885 is turned on in response to a control output from the CPU, since the resistors 883 and 884 are connected in parallel with each other, the gain itself of this control system changes. The output from the OP amplifier 880 is input to a phase compensation circuit constituted by resistors 887 and 888 and a capacitor 891. The potential of a portion as the node between these resistors 887 and 888 is buffered by an OP amplifier 886, and is output to the correction optical system driving means. Since the resistor 888 is connected in parallel with a resistor 889 and an analog switch 890, as shown in FIG. 25, when the analog switch 890 is turned on in response to a control signal from the CPU 801, the resistors 888 and 889 are connected in parallel with each other, and the phase compensation itself of the control system changes. In an actual release operation of a camera, as shown in the flow charts in FIGS. 16A to 17 in the sixth embodiment or in the flow charts in FIGS. 22A to 23 in the seventh embodiment, the control output from the CPU 801 is changed for a predetermined period of time or by detecting a sensor output exceeding a predetermined value at a predetermined timing such as mirror up/down driving timings, forward/rearward shutter driving timings, and the like, thereby changing the driving characteristic of the correction optical system. FIGS. 26A to 26G show timing waveforms at that time. The correction system output changes, as indicated by a dotted curve in FIG. 26G, in correspondence with the sensor integral output, and the influence of a sensor error caused by the operation of the mirror or shutter can be eliminated.

In each of the above-mentioned embodiments, a detection error of the image blur detection means, which is caused in accordance with the operation of the mirror or the forward or rearward shutter, is prevented. In addition, detection errors caused by other factors such as a film feed operation may be prevented.

The above embodiments may be combined. For example, as for discrimination of an operation which may generate a shock, the mirror up driving operation may be discriminated in accordance with an external operation like in the sixth embodiment, and the shutter driving operation may be discriminated in accordance with the output from an image blur sensor like in the seventh embodiment. Also, various combinations of methods for preventing the influence caused by a shock (changing the characteristic of the integral circuit or high-pass filter, applying a limiter to the sensor output, and the like) are available.

As an image blur detection sensor, a vibration gyro or the like as an example of an angular velocity sensor is used. However, other angular velocity sensors, displacement sensors, angular displacement sensors, acceleration sensors, angular velocity sensors, and the like may be used.

In each of the above embodiment, as an image blur prevention means, a means for performing image blur prevention by deflecting a light beam by moving an optical member in a plane perpendicular to the optical axis is used. For example, other light deflection means such as a variable apical angle prism, means utilizing an imaging element, or the like may be used.

The present invention can be applied to single-lens reflex cameras, lens shutter cameras, video cameras, and other optical apparatuses as long as they have factors for causing a detection error of the image blur detection means.

Further, when the present invention is applied to a lens shutter camera, operations for forward and rearward shutter curtains of each of embodiments are set to an operation for a shock caused when a shutter stops in a maximum open position at a time the shutter comes into an open state from a close state and set to an operation for a shock caused when a shutter stops in a predetermined position at a time the shutter comes into an open state to a close state.

Also, the image blur detection means and the image blur prevention means may be arranged in a single apparatus, or may be arranged in two or more apparatuses which form an image blur prevention system when they are attached to each other (for example, the image blur detection means may be arranged in a camera, and the image blur prevention means may be arranged in an exchangeable lens).

What is claimed is:

1. An image blur prevention apparatus comprising:

an image blur prevention device that prevents image blur;

a predicting portion that anticipates a movement of at least one camera component, the movement of which is responsive to operation of an operating portion of a camera and generates a shock fluctuation; and a control device that controls said image blur prevention device so as to limit a range of operation of said image blur prevention device at a time when said predicting portion anticipates a movement of the at least one camera component that generates a shock fluctuation.

2. A camera to which an image blur prevention apparatus is adapted, said camera comprising:

an operation portion;

at least one component moveable in response to operation of said operation portion, the movement of which generates a shock fluctuation;

a predicting portion that anticipates a movement of said at least one component; and a control portion that controls the image blur prevention apparatus so as to limit a range of operation of the image blur prevention apparatus at a time when said predicting portion anticipates a movement of the at least one component that generates a shock fluctuation.

3. An image blur prevention apparatus for use with a camera including a member and with a fluctuation detection sensor that generates an output signal having at least a first frequency component and a second frequency component, said apparatus comprising:

a control device that modifies the output signal by limiting the second frequency component when the member of the camera enters a state in which the member generates a shock fluctuation, and thereby forms a driving signal, different than the output signal;

an image blur prevention device for preventing image blur in accordance with the driving signal.

4. A camera for use with a fluctuation detection sensor that generates an output signal having at least a first frequency component and a second frequency component and with an image blur prevention apparatus that prevents image blur in accordance with a driving signal, said camera comprising:

a member capable of generating a fluctuation of said camera; and a control portion that modifies the output signal of the fluctuation detection sensor by limiting the second frequency component when said member generates a fluctuation and thereby forms a driving signal that is different than the output signal.

5. A camera to which an image blur prevention apparatus and an operating portion is adapted, said camera comprising:

a predicting portion that anticipates generation of a shock fluctuation in the camera in response to an operation of the operating portion that starts photography in said camera; and a control portion that controls operation of the image blur prevention apparatus so as to limit a range of operation of the image blur prevention apparatus during a time when the shock fluctuation is generated in the camera.

6. A fluctuation detection apparatus for use with a camera having an operating portion, comprising:

a fluctuation detection device that detects a fluctuation of a camera and generates an output signal, said fluctuation detection device having a changeable portion;

a predicting portion that anticipates generation of a shock fluctuation in the camera in response to an operation of the operating portion that starts photography in the camera; and a control device that controls the changeable portion of said fluctuation detection device in response to a prediction by said predicting portion, so that the fluctuation detection device suppresses an influence of the shock fluctuation on generation of the output signal by said fluctuation detection device.

7. A fluctuation detection apparatus according to claim 6, wherein the changeable portion generates an electromagnetic field.

8. A camera to which a fluctuation detection apparatus including a fluctuation detection device for detecting a fluctuation of the camera is adapted and to which an operating portion is adapted, the fluctuation detection device having a changeable portion and producing an output signal, said camera comprising:

a predicting portion that anticipates generation of a shock fluctuation in the camera in response to an operation of the operating portion that starts photography in said camera; and a control portion that controls the changeable portion of the fluctuation detection device in response to a prediction by said predicting portion, so that the fluctuation detection device suppresses an influence of the shock fluctuation on generation of the output signal by the fluctuation detection device.

9. A camera according to claim 8, wherein the changeable portion generates an electromagnetic field.

* * * * *

UNITED STATES PATENT AND TRADEMARK OFFICE
CERTIFICATE OF CORRECTION

PATENT NO. : 6,163,651
DATED : December 19, 2000
INVENTOR(S) : Koichi Washisu et al.

It is certified that error appears in the above-identified patent and that said Letters Patent is hereby corrected as shown below:

Sheet 2,
"DIFFIRENTIAL" should read -- DIFFERENTIAL --.

Sheet 4,
"SENSER" should read -- SENSOR --.

Sheet 6,
"SENSER" should read -- SENSOR --.

Sheet 22,
"CHACTERISTIC" (four occurrences) should read -- CHARACTERISTIC --; and "CUR TAINS" should read -- CURTAINS --.

Sheet 36,
"DETECTER" should read -- DETECTOR --.

Column 1,
Line 15, "arts" should read -- art --.

Column 5,
Line 22, "532b" should read -- 532b→ --.

Column 8,
Line 26, "detecter" should read -- detector --.

Column 13,
Line 1, "fl." should read -- $f_1$. --.
Line 25, "shot" should read -- short --.

Column 14,
Line 21, "is" should be deleted.

Column 15,
Line 48, "an" should read -- a --.

Column 20,
Line 11, "(output" should read -- (output= --.

Column 23,
Line 18, "for" should be deleted.

UNITED STATES PATENT AND TRADEMARK OFFICE
CERTIFICATE OF CORRECTION

PATENT NO. : 6,163,651
DATED : December 19, 2000
INVENTOR(S) : Koichi Washisu et al.

It is certified that error appears in the above-identified patent and that said Letters Patent is hereby corrected as shown below:

Column 30,
Line 5, "sensor output as the" should be deleted.

Column 31,
Line 13, "may" should read -- may be --.

Column 32,
Line 12, "angular velocity sensors" should be deleted.
Line 13, "embodiment," should read -- embodiments, --.

Signed and Sealed this

Twenty-ninth Day of January, 2002

Attest:

JAMES E. ROGAN
Attesting Officer   Director of the United States Patent and Trademark Office